(12) United States Patent
Johnson et al.

(10) Patent No.: US 7,212,519 B2
(45) Date of Patent: *May 1, 2007

(54) COMBINING NARROWBAND APPLICATIONS WITH BROADBAND TRANSPORT

(75) Inventors: Kent Johnson, Frisco, TX (US); Hans Gundersen, Richardson, TX (US); Flavijan Markovic, Zagreb (HR)

(73) Assignee: Ericsson Inc., Plano, TX (US)

( * ) Notice: Subject to any disclaimer, the term of this patent is extended or adjusted under 35 U.S.C. 154(b) by 908 days.

This patent is subject to a terminal disclaimer.

(21) Appl. No.: 10/029,361

(22) Filed: Dec. 21, 2001

(65) Prior Publication Data

US 2002/0126676 A1    Sep. 12, 2002

Related U.S. Application Data

(63) Continuation-in-part of application No. 09/764,953, filed on Jan. 17, 2001, which is a continuation-in-part of application No. 09/353,135, filed on Jul. 14, 1999.

(51) Int. Cl.
*H04L 12/66* (2006.01)

(52) U.S. Cl. .................. 370/352; 370/342; 370/441

(58) Field of Classification Search ................ 370/397, 370/400, 401, 402, 395.61, 385, 466
See application file for complete search history.

(56) References Cited

U.S. PATENT DOCUMENTS

| | | | |
|---|---|---|---|
| 4,974,256 A | 11/1990 | Cyr et al. | |
| 5,483,527 A | 1/1996 | Doshi et al. | 370/60.1 |
| 5,568,475 A | 10/1996 | Doshi et al. | 370/58.2 |
| 5,655,120 A | 8/1997 | Witte et al. | |
| 5,802,045 A * | 9/1998 | Kos et al. | 370/352 |
| 5,848,128 A * | 12/1998 | Frey | 379/9 |
| 6,041,109 A | 3/2000 | Cardy et al. | 379/201 |
| 6,061,363 A * | 5/2000 | Evans et al. | 370/467 |
| 6,128,295 A | 10/2000 | Larsson et al. | 370/389 |
| 6,765,903 B1 * | 7/2004 | Allen et al. | 370/356 |
| 6,914,911 B2 * | 7/2005 | Hallenstål et al. | 370/466 |
| 6,917,586 B1 * | 7/2005 | Mauger et al. | 370/230 |
| 2001/0030968 A1 | 10/2001 | Hallenstal et al. | |
| 2003/0012183 A1 * | 1/2003 | Butler et al. | 370/352 |
| 2003/0169751 A1 * | 9/2003 | Pulkka et al. | 370/401 |
| 2005/0141550 A1 * | 6/2005 | Mauger et al. | 370/465 |

FOREIGN PATENT DOCUMENTS

| | | |
|---|---|---|
| WO | WO 98/28884 | 7/1998 |
| WO | WO 99/13679 | 3/1999 |
| WO | WO 01 05108 A | 1/2001 |

* cited by examiner

*Primary Examiner*—Chi Pham
*Assistant Examiner*—Phuc Tran
(74) *Attorney, Agent, or Firm*—Michael Cameron, Esq.

(57) ABSTRACT

The combination of narrowband applications with broadband transport may be enabled with a tri-level nodal architecture including a call control node having switching intelligence and narrowband switching fabric, at least one connection control node having broadband switching fabric and an intermediate node for interworking between the call control node and the connection control node. The call control node further includes a load distribution function for distributing the load amongst a plurality of call processors within the intermediate node. In certain embodiments, the load distribution function assigns the call processors on a per call basis. The assigned call processor is used for encoding all messages transmitted from the call control node to a selected connection control node for the call.

22 Claims, 34 Drawing Sheets

——— The part of a signalling link configured by TN commands (A)
——— The part of a signalling link configured by ATM Management System (B)
− − − The part of a signalling line configured by TN commands
- - - The part of a leased line configured by ATM Management System (C) & (D)

COMBINING NARROWBAND APPLICATIONS WITH BROADBAND TRANSPORT

CROSS-REFERENCES TO RELATED APPLICATIONS

This U.S. Nonprovisional Application for Patent is a Continuation-in-Part of U.S. Nonprovisional application for patent Ser. No. 09/764,953, which was filed on Jan. 17, 2001, which is a Continuation-in-Part of U.S. Nonprovisional application for patent Ser. No. 09/353,135, which was filed on Jul. 14, 1999. U.S. Nonprovisional applications for patent Ser. Nos. 09/764,953 and 09/353,135 are also hereby incorporated by reference in their entirety herein.

This U.S. Nonprovisional application for patent is related by subject matter to U.S. Nonprovisional applications for patent Ser. Nos. 10/010,832, filed Dec. 6, 2001, 10/025,354, filed Dec. 18, 2001, 10/021,940, filed Dec. 12, 2001, and 10/028,176 filed Dec. 21, 2001. These U.S. Nonprovisional applications for patent Ser. Nos. 10/010,832, 10/025,354, 10/021,940 and 10/028,176 are hereby incorporated by reference in their entirety herein.

This U.S. Nonprovisional Application for Patent is further related by subject matter to U.S. Nonprovisional applications for patent Ser. Nos. 09/764,622, filed Jan. 17, 2001, 09/765,119, filed Jan. 17, 2001, 09/764,960, filed Jan. 17, 2001 and 09/866,135, filed May 25, 2001. These U.S. Nonprovisional applications for patent Ser. Nos. 09/764,622, 09/765,119, 09/764,960 and 09/866,135 are hereby incorporated by reference in their entirety herein.

BACKGROUND OF THE INVENTION

1. Technical Field of the Invention

The present invention relates in general to the field of communications, and in particular, by way of example but not limitation, to using broadband transport for narrowband telephony and data communications.

2. Description of Related Art

The increasing interest for high band services such as multimedia applications, video on demand, video telephone, and teleconferencing has motivated development of the Broadband Integrated Service Digital Network (B-ISDN). B-ISDN is based on a technology known as Asynchronous Transfer Mode (ATM) and offers considerable extension of telecommunications capabilities.

ATM is a packet-oriented transfer mode which uses asynchronous time division multiplexing techniques. The packets are called cells and traditionally have a fixed size. A standard ATM cell comprises 53 octets, five of which form a header and 48 of which constitute a "payload" or information portion of the cell. The header of the ATM cell includes two quantities that are used to identify a connection in an ATM network over which the cell is to travel. These two quantities include the Virtual Path Identifier (VPI) and the Virtual Channel Identifier (VCI). In general, a virtual path is a principal path defined between two switching nodes of the network; a virtual channel is one specific connection on the respective principal path.

At its termination points, an ATM network is connected to terminal equipment, e.g., ATM network users. In between ATM network termination points, there are typically multiple switching nodes. The switching nodes have ports which are connected together by physical transmission paths or links. Thus, in traveling from an originating terminal equipment to a destination terminal equipment, ATM cells forming a message may travel through several switching nodes and the ports thereof.

Of the multiple ports of a given switching node, each may be connected via a link circuit and a link to another node. The link circuit performs packaging of the cells according to the particular protocol in use on the link. A cell that is incoming to a switching node may enter the switching node at a first port and exit from a second port via a link circuit onto a link connected to another node. Each link can carry cells for multiple connections, with each connection being, e.g., a transmission between a calling subscriber or party and a called subscriber or party.

The switching nodes each typically have several functional parts, a primary of which is a switch core. The switch core essentially functions like a cross-connect between ports of the switch. Paths internal to the switch core are selectively controlled so that particular ports of the switch are connected together to allow a message to travel from an ingress side/port of the switch to an egress side/port of the switch. The message can therefore ultimately travel from the originating terminal equipment to the destination terminal equipment.

While ATM, because of the high speed and bandwidth that it offers, is envisioned as the transport mechanism for more advanced services such as B-ISDN, it nevertheless must be recognized that the current narrowband networks (e.g., Public Switched Telephone Networks (PSTN), ISDN, etc.) will remain in use (at least in part) for quite some time. It has taken decades for the present voice switched telephony networks (e.g., PSTN, ISDN, etc.) to reach their present advanced functionalities. While ATM networks are being built, the ATM networks will likely not easily acquire all the functionalities of advanced voice communication. Therefore, at least initially, ATM networks/nodes will in some instances be added to parts or will replace parts of circuit switched telephony networks. In such instances, ATM will be used for transport and switching. ATM can actually be used as a single transport and switching mechanism for multiple other networks, including multiple other different types of networks. For example, a single ATM network can be used to transport and switch communications from mobile networks (e.g., Public Land Mobile Networks (PLMNs)), Internet protocol (IP)-based networks (e.g., the Internet), etc., as well as landline networks such as PSTNs and ISDNs.

U.S. Pat. Nos. 5,568,475 and 5,483,527 to Doshi et al., for example, incorporate ATM switches for routing telephony voice signals between Synchronous Transfer Mode (STM) nodes. The ATM switches use a signaling system No. 7 (SS#7) network to establish a virtual connection, rather than a circuit switched connection, as would be the case in a pure STM network. The signaling system No. 7 (SS#7) network of U.S. Pat. Nos. 5,568,475 and 5,483,527 includes signal transfer points (STPs) that are connected by special physical links to each of the ATM switch nodes. For call setup, for example, signaling messages are relayed through the signaling system No. 7 (SS#7) network. In such relaying, a non-ATM STP receives the signaling message and advises its associated ATM node of the call setup. The associated ATM node may then identify idle resources to be used for forwarding voice signals to the next ATM node once the call has been setup, and it may prepare its own signaling message to be used in the relay.

The signaling message for the relay that is prepared by the ATM node is returned to its associated STP, which forwards the signaling message via the signaling system No. 7 (SS#7)

network to another STP associated with the next ATM node. Such relaying continues until the signaling message reaches an STP of an STM local exchange carrier (LEC). Once the call has been set up, the ensuing speech (or voice-band data) is transported via the ATM nodes. STM/ATM terminal adapters are situated between the STM network and the ATM network for packing samples of voice signals as received from the STM network into ATM cells for application to the ATM network, and for unpacking ATM cell payloads to obtain voice signals for application to the STM network from the ATM network. The incorporation of ATM into an STM network in the particular manner as described above thus involves a non-ATM signaling network alongside the ATM nodes. Furthermore, each STP node associated with an ATM node performs only call control functions in the network of Doshi et al. Otherwise and in general, call control and connection control is traditionally combined in conventional communication nodes.

With reference now to FIG. 1A, a conventional unified communications node is illustrated at 100. The conventional unified communications node 100 may represent any general purpose switching node in a telecommunications network such as a PSTN. Within the conventional communications node 100, the call control 105 functions and the connection control 110 functions are united. The call control 105 and the connection control 110 functions together encompass the entire seven (7) layers of the Open System Interconnection (OSI) protocol. These seven (7) layers are denoted as the physical, data link, network, transport, session, presentation, and application layers. Accordingly, the conventional communications node 100 may perform all functions related to both switching intelligence and switching fabric. Conventional communication nodes 100 are not, however, capable of handling the interworking between (i) narrowband telephony and data communications and (ii) broadband communications using faster and higher bandwidth networks, such as ATM networks.

With reference now to FIG. 1B, a conventional approach to separating functions of the conventional unified communications node of FIG. 1A is illustrated generally at 150. Conventional approaches attempt to meet the stringent demands of interworking narrowband telephony and data communications with broadband networks using ATM by separating control functions. Specifically, call control 155 functions are separated from connection control 160 functions. The call control 155 functions are thereby made independent of any particular set of connection control 160 functions. This separation is typically accomplished by utilizing a conventional communications node (such as the conventional communications node 100 of FIG. 1A) that is stripped of its switching intelligence, leaving only the connection control 160. In effect, a conventional communications node 100 is modified by removing or rendering inoperative the call control 105 functions, thus leaving only the connection control 110 functions. This modified conventional communications node is substituted as the connection control 160 part. The call control 155 part, on the other hand, is typically designed and created without relying on traditional telecommunications hardware or software.

With reference now to FIG. 2, an existing scheme for utilizing a broadband network in conjunction with nodes corresponding to separated functions of a conventional unified communications node is illustrated generally at 200. Switching intelligence 205A,205B parts are connected to switching fabric 210A,210B parts. The switching fabric 210A,210B parts are connected to the ATM network 215, and they effect required emulation and cell packing for interworking a narrowband network (not shown) with the ATM network 215. The switching intelligence 205A,205B parts are usually realized with a UNIX-based server. The switching intelligence 205A,205B parts are intended to provide the advanced calling services and features (e.g., those traditionally provided by the Intelligence Network (IN)). The switching intelligence 205A,205B parts do not include any switching fabric resources, so they must rely on the switching fabric 210A,210B parts for these resources.

Because the switching intelligence 205A,205B parts do not have any of their own switching fabric resources, they are not directly connected to any transport mechanisms, nor do they include the requisite interface(s) for doing so. Incoming calls are therefore received at a switching fabric 210 part and managed by the associated switching intelligence 205 part. When an incoming call is received at a switching fabric 210 part, call signaling information is sent to the switching intelligence 205 part. The switching intelligence 205 part performs the appropriate call control functions and sends instructions (e.g., in the form of call signaling information) to the switching fabric 210 part. The switching fabric 210 part follows the instructions by making the appropriate connections (e.g., to/through the ATM network 215, to/through a narrowband network (not shown), etc.) for forwarding the call data information for the incoming call. As such, no call data information is (or can be) sent to the switching intelligence 205 part, including from the switching fabric 210 part.

Furthermore, while UNIX-based servers, which realize the switching intelligence 205 parts, may be designed to operate at high speeds, they suffer from a number of deficiencies. First, significant research, design, and testing is required to produce appropriate software code to run the UNIX-based servers as switching intelligence 205 parts. Existing circuit-switched voice telephony networks include many advanced features that require many lines of code that have been gradually developed, tested, and implemented over many years. Duplicating the diverse number and types of features while maintaining the required level of reliability and service using newly written code on a UNIX server is not only a daunting task, but it is also virtually impossible to achieve quickly. Second, it is extraordinarily difficult to migrate gradually from traditional network architectures (e.g., those using the conventional unified communications node 100 of FIG. 1A) to next generation networks that rely on broadband transport mechanisms when deploying nodes with only the switching intelligence 205 part. System operators are essentially forced to simultaneously replace whole portions of their networks in large chunks. The consequential large capital expenditures are naturally undesirable to system operators.

SUMMARY OF THE INVENTION

The deficiencies of the prior art are overcome by the methods, systems, and arrangements of the present invention. For example, as heretofore unrecognized, it would be beneficial to re-use and/or extend the life of existing/legacy switches when combining narrowband networks with broadband transport mechanisms. In fact, it would be beneficial to utilize existing switches to enable a gradual migration from narrowband networks to broadband transport mechanisms via the implementation of hybrid switches.

The present invention is directed to a tri-level nodal architecture including a call control node having switching intelligence and narrowband switching fabric, at least one connection control node having broadband switching fabric and an intermediate node for interworking between the call control node and connection control node. The call control node further includes a load distribution function for distributing the load amongst a plurality of call processors.

In certain embodiments, the load distribution function assigns the call processors on a per call basis. The assigned call processor is used for encoding all messages transmitted from the call control node to a selected connection control node for the call. In further embodiments, a linked call processor has a transport link towards the selected connection control node, and all messages encoded by the assigned call processor are transmitted to the selected connection control node through the linked call processor. In still further embodiments, all messages transmitted from the selected connection control node to the call control node are received and decoded at the linked call processor before being transmitted to the call control node through the assigned call processor.

In one embodiment, the call control node may be realized by a legacy switch (LS), the intermediate node may be realized by mediation logic (ML) and the LS and ML combined form a media gateway controller (MGC). In addition, the connection control node may be realized by one or more media gateways (MGs).

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the methods, systems, and arrangements of the present invention may be had by reference to the following detailed description when taken in conjunction with the accompanying drawings wherein:

FIG. 3I illustrates an exemplary schematic view showing a multi-switch hybrid node according to yet another embodiment of the invention;

DETAILED DESCRIPTION OF THE DRAWINGS

Figure 1A:
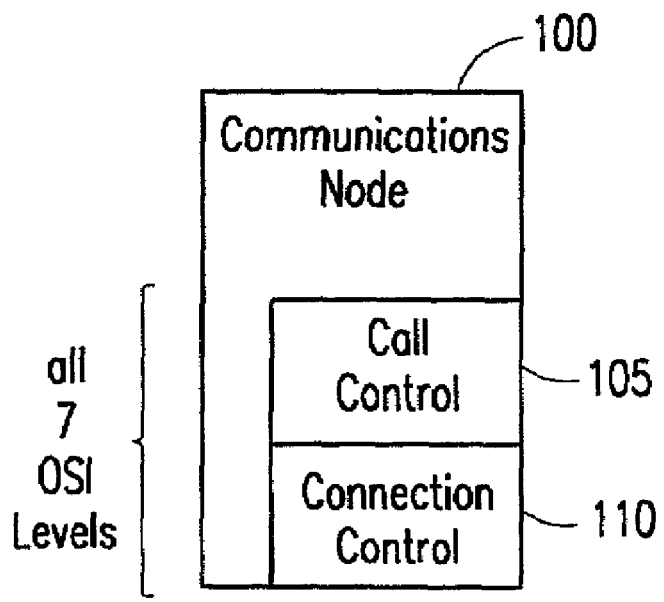
FIG. 1A illustrates a conventional unified communications node.
Figure 1B:
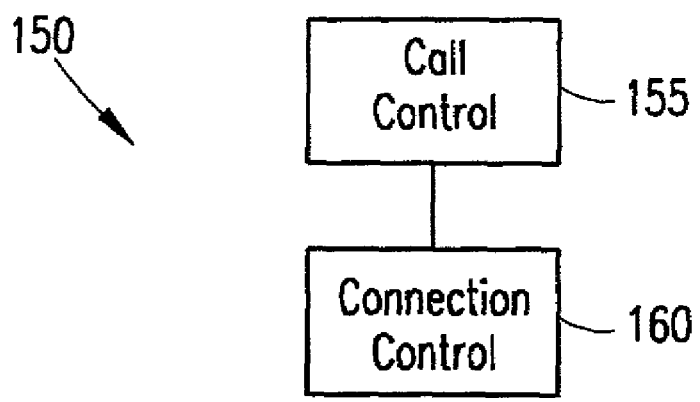
FIG. 1B illustrates a conventional approach to separating functions of the conventional unified communications node of FIG. 1A.
Figure 2:
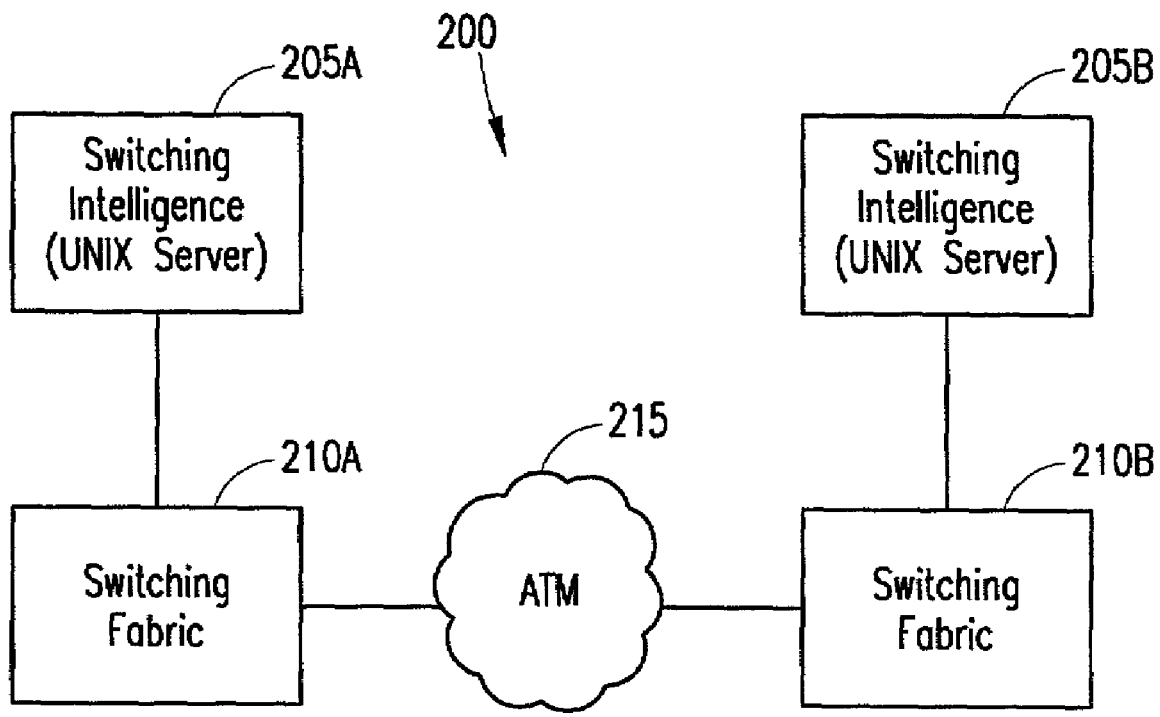
FIG. 2 illustrates an existing scheme for utilizing a broadband network in conjunction with nodes corresponding to separated functions of a conventional unified communications node.

In the following description, for purposes of explanation and not limitation, specific details are set forth, such as particular architectures, interfaces, circuits, information exchanges, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail. It should be understood that the terms "module" and "logic module" as used herein embrace, subsume, and include, inter alia, object oriented programming techniques as well as so-called traditional programming techniques such as, for example, custom-developed applications.

Embodiment(s) of the present invention and advantages thereof are best understood by referring to FIGS. 1A–26 of the drawings, like numerals being used for like and corresponding parts of the various drawings.

In certain embodiments in accordance with the invention (e.g., including embodiment(s) of the invention of the parent applications), ATM is used as a transport and switching mechanism in a hybrid STM/ATM network, while the signaling remains normal narrowband signaling. The narrowband signaling may be transported on permanent paths over ATM connections (e.g., permanent virtual connections (PVCs)), and the narrowband speech channels may be transported on ATM and switched on a "per call basis" (e.g., on-demand) through an ATM switch (e.g., a switched virtual connection (SVC)).

The hybrid STM/ATM network has an access node which services narrowband terminals and which generates a signaling message in connection with call setup. A translator formats the first signaling message into ATM cells so that the first signaling message can be routed through an ATM switch to a circuit switched (e.g., STM) node. The circuit switched node (e.g., PSTN/ISDN) sets up a physical connection for the call and generates a further signaling message for the call, the further signaling message pertaining to the physical connection. The ATM switch routes an ATM-cell-formatted version of the further signaling message to another ATM switch over an ATM physical interface. Thus, the ATM switch switches both narrowband traffic and signaling for the call over the ATM physical interface. The ATM physical interface thus carries an ATM-cell-formatted version of the further signaling message amidst ATM traffic cells.

In view of the fact that the circuit switched node and the ATM switch employ different parameters (e.g., b-channel, etc., for the STM node and VP/VC for the ATM switch), in one embodiment the STM node obtains global position numbers (GPN) for use in setting a path for the further signaling message through the ATM switch. In this regard, at the circuit switched node a translation is made from STM to GPN using an STM/GPN translation table; at the ATM node a translation is made from GPN to VP/VC/port using a GPN/ATM translation table.

The ATM-cell-formatted version of the further signaling message is transported over the ATM physical link and ultimately reaches a destination access node which serves a destination terminal. A destination translator unpacks ATM cells carrying the ATM-cell-formatted version of the further signaling message to obtain the STM signaling information for use by the destination access node. The translators may be situated at the access node, for example. In illustrated embodiment(s), the ATM switches are situated at nodes distinct from the PSTN/ISDN nodes, but such need not be the case in other embodiment(s). The signaling messages can be in accordance with the signaling system no. 7 (SS#7) convention, and the further signaling message can be one of an ISUP or a TUP message, for example.

Figure 3:
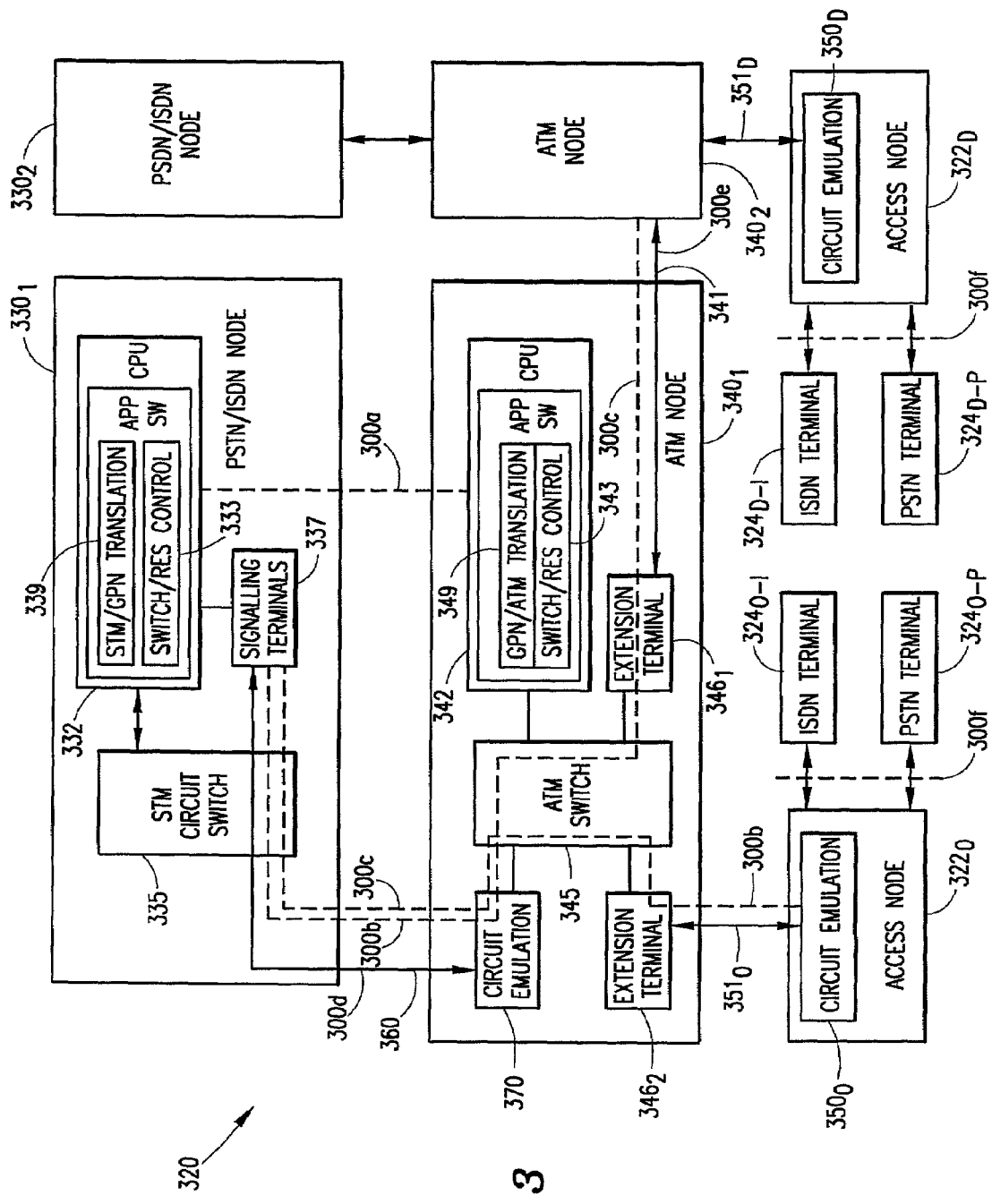
FIG. 3 illustrates an exemplary schematic view of a hybrid STM/ATM network according to an embodiment of the invention.

Referring now to FIG. 3, an exemplary hybrid STM/ATM network 320 according to an embodiment of the invention is illustrated. Narrowband terminal devices communicate with hybrid STM/ATM network 320 through access nodes, such as access node 322$_O$ and access node 322$_D$. For example, FIG. 3 shows terminals 324$_O$ connected to access node 322$_O$, particularly ISDN terminal 324$_{O-I}$ and PSTN terminal 324$_{O-P}$. Similarly, access node 322$_D$ has access terminals 324$_D$ connected thereto, namely ISDN terminal 324$_{D-I}$ and PSTN terminal 324$_{D-P}$. Of course, a differing (and most likely greater) number of terminals can be connected to each access node 322, but for simplicity only two such terminals are shown for exemplary purposes in FIG. 3. It should be noted that, as used herein, the term "access node" is not limited to a simple node used merely for connecting subscriber lines, for it may encompass other nodes such as a local exchange (LE) node, for example.

The hybrid STM/ATM network 320 of FIG. 3 comprises one or more STM nodes, also known as PSTN/ISDN nodes 330. While only two such PSTN/ISDN nodes 330$_1$ and 330$_2$ are shown in FIG. 3 for sake of illustration, it should be understood that the invention is not limited to only two such nodes. The structure and operation of conventional PSTN/ISDN nodes 330 are well known; such as those typified by utilization of Ericsson AXE switches, for example. Therefore, only selected pertinent portions of conventional PSTN/

ISDN nodes 330 are described herein with reference to PSTN/ISDN node $330_1$. For example, PSTN/ISDN node $330_1$ has processor(s) 332 which execute, e.g., node application software including switch and resource control software 333. Such software is used to control STM circuit switch 335 as well as signaling terminals 337 which comprise PSTN/ISDN node $330_1$. Other details of the structure and operation of a conventional PSTN/ISDN node are understood, for example, from U.S. patent application Ser. No. 08/601,964 for "Telecommunications Switching Exchange", which is hereby incorporated by reference in its entirety herein.

The STM/ATM network 320 of certain embodiment(s) of the invention is considered a hybrid network in view of the fact that ATM nodes 340 are also included therein. As explained hereinafter, the ATM nodes 340 are used not only to route narrowband traffic between access nodes 322, but also for transport of signaling in ATM cells over an ATM physical interface. In the illustrated example, the ATM network aspect includes two exemplary ATM nodes, particularly ATM node $340_1$ and ATM node $340_2$, which are connected by ATM physical interface or link 341. Again, it should be understood that the ATM component can (and typically does) comprise a greater number of ATM nodes, with the nodes being connected by ATM physical links.

In hybrid network 320, a PSTN/ISDN node 330 and a ATM node 340 can be paired together in the manner illustrated in FIG. 3. With such a pair, the PSTN/ISDN node 330 and ATM node 340 are collectively referred to as hybrid node pair 330/340. The network 320 of certain embodiment(s) of the invention thus can comprise any number of hybrid node pairs 330/340. An ATM node such as ATM node 340 takes on differing configurations, but commonly has a main processor 342 or the like which executes application software including switch and resource control software as generally depicted by 343 in FIG. 3. The heart of an ATM node is usually the ATM switch core or switch fabric, which for the illustrated embodiment is shown as ATM cell switch 345 in FIG. 3. Further information regarding an exemplary ATM switch is provided by U.S. patent application Ser. No. 08/188,101, entitled "Asynchronous Transfer Mode Switch", filed Nov. 9, 1998, which is hereby incorporated by reference in its entirety herein. ATM cell switch 345 has plural ingress ports and plural egress ports, with at least some of such ports having a device board attached thereto.

Each device board at ATM node 340 can have one or more different functions performed thereby or one or more different devices mounted thereon. For example, one of the device boards attached to a port of ATM cell switch 345 can, in one embodiment, have the main processor 342 mounted thereon. Other device boards may have other processors, known as "board processors". Some device boards serve as extension terminals (ETs) 346 which may be used to connect the ATM node to other nodes. For example, the ATM physical link 341 shown in FIG. 3 has a first end connected to an extension terminal ET $346_1$ of ATM node $340_1$, while a second end of ATM physical link 341 is connected to an unillustrated extension terminal ET of ATM node $340_2$. The device boards connected to ATM cell switch 345 of ATM node 340 are not specifically illustrated in detail in FIG. 3, but the structure and operation of such device boards is understood with reference to (for example) the following United States patent applications, all of which are hereby incorporated by reference in their entirety herein: U.S. patent application Ser. No. 08/893,507 for "Augmentation of ATM Cell With Buffering Data"; U.S. patent application Ser. No. 08/893,677 for "Buffering of Point-to-Point and/or Point-to-Multipoint ATM Cells"; U.S. patent application Ser. No. 08/893,479 for "VPNC Look-Up Function"; U.S. patent application Ser. No. 09/188,097 for "Centralized Queuing For ATM Node", filed Nov. 9, 1998.

As explained hereinafter, signaling (e.g., for call setup) is routed from an access node 322 through an ATM node 340 to an appropriate one of the PSTN/ISDN nodes 330. Such being the case, a circuit emulation or translator 350 is provided for each access node 322 which communicates with an ATM node 340. The translators 350 serve, e.g., to encapsulate signaling information from the access node 322 into ATM cells for signaling directed toward an ATM node 340, and conversely unpack ATM payloads received from an ATM node 340 to extract signaling information for use by the access node 322. In this particular illustrated embodiment, the translators 350 are preferably provided at or proximate to their associated access nodes 322. That is, translator $350_O$ may be situated at or included in access node $322_O$; translator $350_D$ may be situated at or included in access node $322_D$. A pair of physical links, shown as links 351, are provided for connecting each access node 322 to a corresponding one of the ATM nodes 340.

ATM node 340 is connected to a PSTN/ISDN node 330 by a physical link 360. With reference to ATM node $340_1$, for example, a pair of switch-to-switch links 360 is employed to connect ATM cell switch 345 (through its circuit emulation board 370) to STM circuit switch 335 of PSTN/ISDN node 330, for the carrying of signaling messages. One of the links in pair 360 carries messages from ATM cell switch 345 (after translation at circuit emulation board 370) to STM circuit switch 335; the other link of the pair 360 carries messages in the reverse direction.

In the illustrated embodiment, a dedicated VPI, VCI internal to ATM cell switch 345 is used for signaling. Thus, with reference to ATM node $340_1$, for example, link $351_O$ is connected to extension terminal (ET) $346_2$, which in turn is connected to a first pair of dedicated ports of ATM cell switch 345. Signaling messages received at ATM node $340_1$ which are destined to PSTN/ISDN node $330_1$ are routed on the dedicated internal VPI/VCI to a port of ATM cell switch 345 which ultimately connects (via circuit emulator 370) to switch-to-switch links 360. However, since the signaling routed through ATM cell switch 345 is encapsulated in ATM cells, a translation to the STM signaling must be performed prior to transmitting the signaling information on switch-to-switch links 360. For this reason, a device board connected to switch-to-switch links 360 has the circuit emulation (CE) or translator 370 mounted thereon.

The circuit emulation (CE) or translator 370 serves to unpack signaling information which is destined to PSTN/ISDN node 330, but contained in ATM cells, so that the signaling information can be extracted from the ATM cells prior to application on switch-to-switch links 360. Conversely, signaling information received from PSTN/ISDN node $330_1$ on switch-to-switch links 360 at translator 370 is encapsulated into ATM cells for routing through ATM node $340_1$. From FIG. 3 it can also be seen that a plurality of interfaces 300a–300f are utilized in the hybrid STM/ATM network 320 of certain embodiment(s) of the invention. These interfaces are described below, primarily with reference to the exemplary nodes (e.g., PSTN/ISDN node $330_1$ and ATM node $340_1$).

Interface 300a is a logical interface which exists between processor(s) 332 of PSTN/ISDN node $330_1$ and main processor(s) 342 of ATM node $340_1$. Interface 300a enables PSTN/ISDN node 330 to control the ATM node 340 connected thereto. That is, with the signaling carried by interface 300a, PSTN/ISDN node $330_1$ can order physical connections which are to be set up in ATM node $340_1$. Interface 300a can be a proprietary interface or an open interface (such as a General Switch Management Protocol (GSMP) interface [see Request For Comments (RFC) 1987]). Logical interface 300a can be carried on any physical interface, such as interface 360 described below. Alternatively, interface 300a can be carried by a separate link (e.g., between processors 332 and 342), or carried on top of IP/Ethernet links.

Interface 300b is the signaling between the PSTN/ISDN nodes 330 and the access node 322 connected thereto. Interface 300b is carried on one or more semipermanent connections through the STM circuit switch 335; through the interworking unit with circuit emulation 370 into ATM cell switch 345; and over permanent virtual connections to access node 322 (particularly to translator 350 in access node 322, where it is emulated back and terminated). As mentioned above, translator 350 is employed to encapsulate the narrowband signaling from an access node 322 in ATM cells for use by an ATM node 340, and conversely for unpacking ATM cells with signaling information for use by an access node 322. Each STM channel on the user side may have a corresponding VPI/VCI on interface 300b.

Interface 300c is the non-broadband signaling that is carried through and between the nodes. Interface 300c thus carries the normal signaling system No. 7 (SS#7) interface (e.g., TUP or ISUP) which is transparently carried in ATM-cell-formatted versions of signaling messages over ATM physical link 341. In PSTN/ISDN node 330, the signaling terminals 337 are used for common channel signaling. In at least one embodiment, signaling terminals 337 can be pooled devices situated at STM circuit switch 335. Alternatively, the signaling terminals 337 can be connected directly to the interfaces between the STM and ATM switches.

Interface 300d is the physical interface provided by switch-to-switch link 360. Interface 300d can be used to carry speech for a call to and from an STM network, and also to carry the signaling of interface 300b and interface 300c as described herein. In addition, interface 300d can also be used to link-in special equipment that is to be connected to a normal circuit switch (e.g., conference equipment, answering machines, etc.). Interface 300d can be realized by any standard physical media, such as E1, for example; it being understood that STM-1 or similar speeds may be suitable. The physical interface 300d can also carry the voice data for a conversation between any of the terminals shown in FIG. 3 and an unillustrated terminal connected to the circuit switched network, in which situation the hybrid node pair 330/340 acts as a gateway.

Interface 300e is the ATM physical link 341 to other ATM nodes. Any standard link for ATM may be employed for interface 300e. A dedicated VP/VC is employed to transparently transfer the signaling system No. 7 (SS#7) signaling between PSTN/ISDN nodes 330 over interface 300e. Interface 300f, shown in FIG. 3 as connecting each access node 322 with its terminals, is a typical user-network interface (e.g., ISDN, BA/BRA, PRA/FRI, two-wire PSTN, etc.).

For two traditional circuit switched PSTN/ISDN nodes to communicate with one another using protocols such as ISUP or TUP, it is preferable that ISUP entities in both PSTN/ISDN nodes have coordinated data tables. In this regard, each of the two PSTN/ISDN nodes has a table which translates a CIC value onto a same timeslot in a same physical interface connecting the two PSTN/ISDN nodes. Thus, a CIC value (together with a point code) represents a particular timeslot on a particular physical link. One specific CIC preferably points out the same time slot in the tables of both PSTN/ISDN nodes. In other words, the data tables of the two PSTN/ISDN nodes are preferably coordinated.

The need to coordinate the data tables of PSTN/ISDN node $330_1$ and PSTN/ISDN node $330_2$ for ISUP/TUP similarly exists in certain embodiment(s) of the invention. If two hybrid nodes $330_1/340_1$ and $330_2/340_2$ have a communication channel set up between them, by means of a semipermanent connection carrying SS#7 signaling for example, the translation tables 339 in both hybrid nodes are preferably coordinated from the standpoint of using CIC. This typically means that in both hybrid nodes $330_1/340_1$ and $330_2/340_2$ a certain CIC points at the same VP and VC (and possibly AAL2 pointer) identifying cells on a certain physical link (e.g., link 341) connecting the two hybrid nodes. Alternatively, the same objective may be accomplished by other suitable means such as a cross-connected-ATM switch positioned between the hybrid nodes that switches packets and gives the packets the VP and VC value understood by the other node.

Figure 3A:
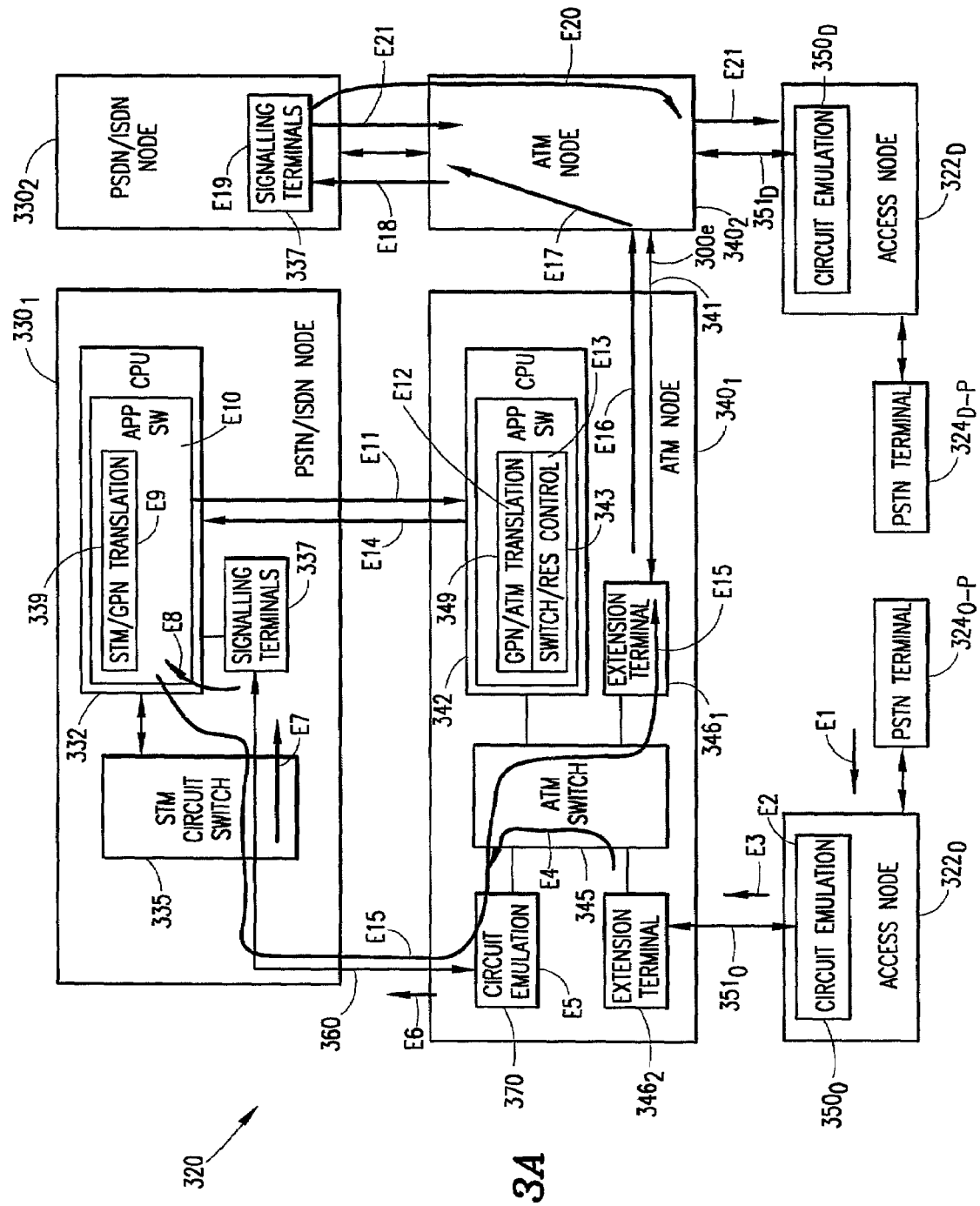
FIG. 3A illustrates an exemplary schematic view of selected portions of the hybrid STM/ATM network of FIG. 3, and further showing various operational events.

Referring now to FIG. 3A, an exemplary structure of hybrid STM/ATM network 320, having omitted therefrom various items including the interfaces, is illustrated. FIG. 3A also provides an example of signal processing for a call originating at terminal $324_{O-P}$ for which the called party number (destination) is terminal $324_{D-P}$. As shown by the arrow labeled E-1, at event E-1 a SETUP message is sent from terminal $324_{O-P}$ to access node $322_O$. In the illustrated embodiment, the SETUP message is an IAM message for an ISUP network interface, and is for a 30B+D PRA and for VS.x carried on a 64 kb/s bit stream in a circuit switched timeslot.

At the translator $350_O$ associated with the access node $322_O$, at event E-2 the signaling from terminal $324_{O-P}$ is converted from STM to ATM by packing the signaling information into ATM cell(s) In this regard, after the circuit emulation a table is employed to translate from a 64 kb/s speech channel from terminal $324_{O-P}$ to a corresponding ATM address (VP/VC). The signaling of the SETUP message, now encapsulated in ATM cell(s), is applied to link $351_O$ and transmitted to ATM cell switch 345 of ATM node $340_1$ as indicated by event E-3. As further indicated by event E-4, the ATM cell(s) containing the SETUP message signaling is routed through the ATM cell switch 345 in accordance with a switch internal VP/VC dedicated for STM-originated signaling. Upon egress from ATM cell switch 345, the signaling information for the SETUP message is retrieved from the ATM cell(s) by translator 370 (event E-5), and it is reconverted at translator 370 from ATM to STM format, so that the SETUP message signaling information can be applied in STM format at event E-6 to switch-to-switch link 360. The SETUP message, now again in STM format, is routed through STM circuit switch 335 (as indicated by event E-7) to an appropriate one of the signaling terminals 337. Upon receipt of the SETUP message signaling information at the appropriate signaling terminal 337, the signaling information is forwarded to processor(s) 332 of PSTN/ISDN node 330, which engage in STM traffic handling (as indicated by event E-8).

In its traffic handling, the processor 332 of PSTN/ISDN node 330 realizes that the incoming side of the call and the outgoing side of the call have physical connections through an ATM node. In this regard, when the access points of the connection were defined (subscriber or network interface), a bearer type was associated with the connection and stored in application software. In the present scenario, when the SETUP message (e.g., an IAM message in the case of an ISUP network interface) was received at PSTN/ISDN node 330, the stored bearer type data was checked in order to determine what switch was on the incoming side to PSTN/ISDN node 330. Further, the bearer type data stored for the outgoing point (e.g., based on B-Subscriber number) is similarly checked, and if the stored data indicates that both incoming and outgoing sides have an ATM bearer, the PSTN/ISDN node 330 can conclude that ATM node 340 is to be operated (e.g., utilized). In addition, data received in the SETUP message (particularly the B-subscriber number) is analyzed to determine that the called party (destination) terminal $324_{D-P}$ can be reached by contacting PSTN/ISDN node $330_2$. The PSTN/ISDN node $330_1$ realizes that it has an SS#7 signaling interface 300c to PSTN/ISDN node $330_2$, and therefore selects a free CIC (e.g., a CIC not used by any other call) for use toward PSTN/ISDN node $330_2$.

If, on the other hand, the stored bearer type data had indicated an STM bearer, both PSTN/ISDN node 330 and ATM node 340 have to be operated. Thus, PSTN/ISDN node 330 and ATM node 340 collectively function as a gateway between the STM and ATM worlds. Upon realizing that further signaling for the call will be routed through ATM nodes, in the embodiment(s) of the invention shown in FIG. 3 and FIG. 3A, the PSTN/ISDN node $330_1$ makes reference to an STM/GPN translation table 339 maintained by processor(s) 332 (see event E-9). Two translations are performed using the STM/GPN translation table 339. As a first translation, the information (e.g., b-channel and access information in the case of ISDN or CIC plus signaling system #7 point codes in the case of PSTN) contained in the SETUP message is translated to a global position number (GPN). As a second translation, the CIC and destination point code for a circuit leading to hybrid node pair 330/340 is translated to another global position number (GPN).

In connection with the foregoing, the global position number (GPN) is a common way to identify the connection points, and as such is understood by the pair of nodes (PSTN/ISDN node 330 and ATM node 340). In other words, the GPN is an address, or reference, or system internal pointer known by both PSTN/ISDN node 330 and ATM node 340, and used to translate between port/VP/VC and circuit switch address. Usage of GPN in the embodiment of FIG. 3 and FIG. 3A thereby obviates the sending of real addresses between PSTN/ISDN node 330 and ATM node 340. Advantageously, GPN can be shorter, meaning that there is less data to send. For traditional PSTN, the GPN uniquely corresponds to the 64 kbit voice on a two-wire line, but for ISDN, the GPN corresponds to a b-channel (which may be used by several subscribers).

Then, as event E-10, the PSTN/ISDN node 330 generates an ATM switch control message intended to setup a physical connection in ATM node 340. This message of event E-10 contains the two global position numbers (GPNs) obtained from STM/GPN translation table 339 at event E-9, together with an order for the ATM node 340 to connect the two GPN addresses in ATM switch fabric 345. The PSTN/ISDN node 330 sends the switch control message generated at event E-10 to processor 342 of ATM node 340 over interface 300a, as shown by event E-11.

Upon reception of the switch control message sent as event E-11 to ATM node $340_1$, as indicated by event E-12, main processor 342 consults GPN/ATM translation table 349 in order to translate the two global position numbers (GPNs) contained in the event E-10 switch control message into VP/VC/port information understood by ATM node $340_1$. That is, the two global position numbers (GPNs) are used to obtain VP/VC/port information for ultimately reaching both the origination terminal ($324_{O-P}$) and the destination terminal ($324_{D-P}$). Upon successful translation of GPN to ATM, and assuming sufficient resources, processor 342 of ATM node $340_1$ sets up a path through ATM Switch 345 and reserves resources on the port (trunk or link 341) for the call from terminal $324_{O-P}$ to terminal $324_{D-P}$. The path set up and resource reservation activities are accomplished using switch/reservation control 343 and are collectively illustrated as event E-13 in FIG. 3.

Since PSTN/ISDN node 330 preferably knows whether ATM node $340_1$ was successful in performing a GPN/ATM translation, a successful translation message is sent over interface 300a as event E-14 from ATM node $340_1$ to PSTN/ISDN node $330_1$. If the GPN/ATM translation is not successful at ATM node $340_1$, or if there are no available resources at ATM node $340_1$, a call rejection message is sent back to the originating terminal. After PSTN/ISDN node 330 receives the confirmatory message of event E-14 (that ATM switch 345 has been setup and link reservations made (in accordance with event E-13)), at event E-15 the PSTN/ISDN node $330_1$ prepares and sends its further signaling message (e.g., ISUP or TUP) toward the PSTN/ISDN node at the other end (e.g., PSTN/ISDN node $330_2$). This further signaling message is shown as event E-15 in FIG. 3A. The signaling of event E-15 (e.g., an ISUP or TUP message) includes a message transfer part (MTP), and can be sent out on a timeslot (e.g., 64 kb/s) which carries the SS#7 signaling.

As the signaling of event E-15 arrives at ATM node $340_1$, the ATM node $340_1$ prepares its ATM cell-formatted version of the signaling. In particular, the translator 370 puts the signaling information of the signaling of event E-15 into the payload of one or more ATM cells. For example, the translator 370 is configured to take the 64 kb/s signaling information bit stream and to pack it into ATM cells with a predefined VP, VC, and a physical port. As also indicated as event E-15, the ATM cell-formatted version of the further signaling message is routed through ATM cell switch 345 and onto a link indicated by the VP/VC/port information obtained from the translation. In particular, in FIG. 3A the ATM cell-formatted version of the further signaling message is transported on ATM physical link 341, as shown by event E-16.

Upon reaching ATM node $340_2$, the ATM cell-formatted version of the further signaling messages obtains a new internal VPI/VCI for the ATM cell switch 345 of ATM node $340_2$, and is routed (as indicated by event E-17) through ATM cell switch 345 of ATM node $340_2$ to a circuit emulator (not explicitly shown) in ATM node $340_2$, which is analogous to circuit emulator 370 in ATM node $340_1$. The circuit emulator of ATM node $340_2$ performs the conversion from ATM to STM format in like manner as circuit emulator 370 in ATM node $340_1$, and then passes the signaling message to PSTN/ISDN node $330_2$ as event E-18.

In PSTN/ISDN node $330_2$, the ISUP message is received together with the CIC value (from the message transfer part (MTP)) and the B-subscriber number (which is included in the ISUP message). As indicated by event E-19, the second hybrid node $330_2/340_2$ also performs an analysis of the B-subscriber number and concludes that the B-subscriber number is associated with terminal $324_{D-P}$, which involves B channels. The PSTN/ISDN node $330_2$ then selects a B-channel which can be used to reach terminal $324_{D-P}$, or negotiates with the terminal $324_{D-P}$ as to which B-channel to use (depending on the terminal type and protocol type ISDN or PSTN). The PSTN/ISDN node $330_2$ also signals terminal $324_{D-P}$ to activate a ringing signal (as indicated by event E-20). When an answer is received from terminal $324_{D-P}$ (or during or before receiving an answer), the PSTN/ISDN node $330_2$ consults its STM/GPN translation table 339 (not explicitly shown) using a CIC value and a B-channel. The PSTN/ISDN node $330_2$ then operates the ATM switch 345 (not explicitly shown) of ATM node $340_2$ in the same manner as described for ATM node $340_1$, as indicated by event E-21.

Operation of ATM switch 345 of ATM node $340_2$ allows in-band data (e.g., voice data) carried in ATM packets to be passed through the ATM switch. Such operation is accomplished in like manner as described previously hereinabove (e.g., by consulting a table such as table 339, by sending an ATM switch control message, by consulting a table such as table 349, and by setting up of a path in the ATM switch). When an ATM switch is operated as described above, the resulting path through both ATM switches (carrying in-band information) has to be set up in the same way at both ends. This implies that encapsulation of in-band information (which is controlled by circuit emulation (e.g., circuit emulation 370)) at the two end points of the path is preferably set up in the same way. To minimize delay, AAL2 is preferably utilized by circuit emulation 370 for the encapsulation, although other types of protocols may be alternatively used.

As noted hereinabove, a bearer type is associated with a connection and stored in the application software of the PSTN/ISDN node 330. It is presumed that the PSTN/ISDN node 330 already is able to handle traditional access points (subscriber or network interfaces) connected to STM circuit switches. In so doing, the PSTN/ISDN node 330 has logical representations of these existing access points in a static data structure of the PSTN/ISDN node 330. In accordance with certain embodiment(s) of the invention, the PSTN/ISDN node 330 additionally handles access points connected to the ATM switch. In this regard, see (for example) interface 341 of FIG. 3C (hereinafter described). Thus, for certain embodiment(s) of the invention, the PSTN/ISDN node 330 has logical representations of these additional access points in its static data structure. Therefore, the bearer type data may be employed in the prior discussion as a way of distinguishing the logical representation of the additional access points (e.g., ATM-related access points) in the static data structure from the logical representation of the traditional access points.

It was also noted hereinabove that encapsulation of in-band information is preferably set up the same way at both ends. More specifically, a same type of cell filling is preferably employed by two circuit emulation devices that are connected together. For example, if on a link connecting two circuit emulation devices an ATM cell is packed with only one voice sample by a first of the circuit emulation devices, the second of the circuit emulation devices preferably packs ATM cells in a similar manner. Alternatively, another emulation and/or bridging mechanism or scheme may be employed.

In the above regard, filling only part of an ATM cell with information is a technique for reducing delays, although it may increase overhead. Another way of reducing delay is employment of the AAL2 protocol. As understood by those skilled in the art, AAL2 is a protocol layer on top of ATM, and it allows transport of mini-cells within ATM cells. Usage of the smaller AAL2 cells helps address bandwidth and delay problems in the air interface. Certain embodiment(s) of the invention may be utilized with AAL2 switching as an alternative to ATM switching. If one implements AAL2 in certain embodiment(s) of the invention, the switch 345 operates as an AAL2 switch and GPN/ATM translation table 349 in ATM node 340 preferably also includes an AAL2 pointer. Whenever the ingress and egress point is referenced, it can alternately include an AAL2 pointer. Thus, as used herein and in the appended claims, ATM encompasses ATM-related protocols on top of ATM, such as AAL1, AAL2, AAL5, etc. It should also be understood that the term "broadband", as used herein and in the appended claims, embraces and encompasses packet-switched technologies in general (e.g., IP, VoIP, Frame-relay, ATM, etc.).

Figure 3B:
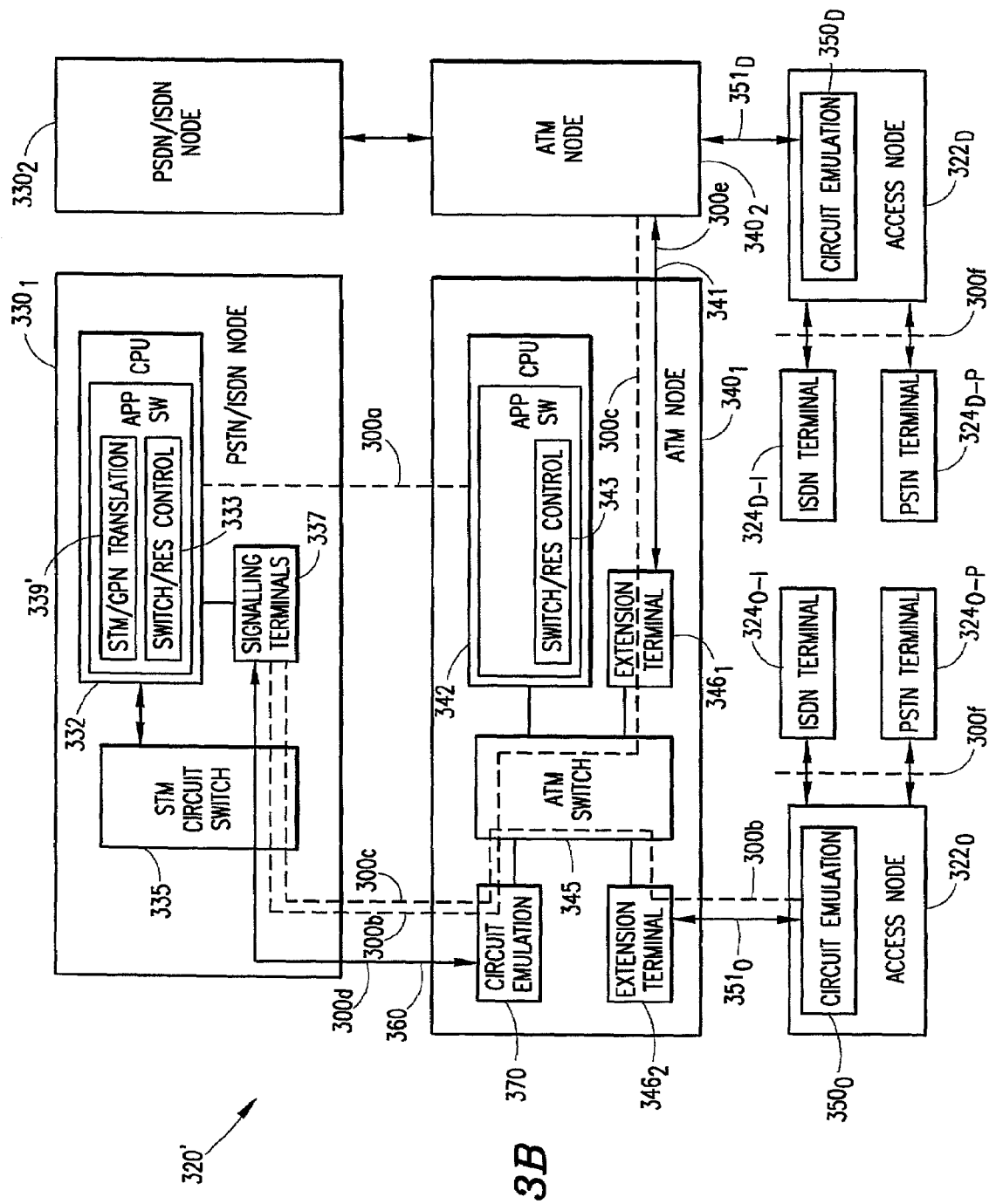
FIG. 3B illustrates an exemplary schematic view of a hybrid STM/ATM network according to another embodiment of the invention.

Referring now to FIG. 3B, an exemplary hybrid STM/ATM network 320' according to another embodiment of the invention is illustrated. The embodiment of FIG. 3B primarily differs from the embodiment of FIG. 3 in that the embodiment of FIG. 3B does not employ global position numbers (GPNs). Rather, the embodiment of FIG. 3B uses an ATM/STM translation table 339' in processor 332 of PSTN/ISDN node $330_1$ instead of an GPN/ATM translation table. In the embodiment of FIG. 3B, the translation tables in the circuit emulation $350_0$ translate the SETUP message from a 64 kb/s speech channel to an ATM address (VP and VC) in a manner similar to that of event E-2 in the embodiment(s) of FIG. 3 and FIG. 3A. After routing of the translated SETUP message through ATM switch $345_1$, the circuit emulation 370 translates the SETUP message to the STM format as occurred at event E-5 of the embodiment(s) of FIG. 3 and FIG. 3A.

The embodiment of FIG. 3B also differs from that of the embodiment(s) of FIG. 3 and FIG. 3A in that processor 332 of PSTN/ISDN node 330 terminates the narrowband signaling by translating a narrowband reference point (e.g., b-channel if an ISDN connection) to a corresponding ATM address for use by ATM node 340. Thus, for the FIG. 3B embodiment, the switch control message of event E-11 sends the ATM VP/VC/port information understood by ATM node $340_1$. Thus, the translation of event E-12 of the FIG. 3/FIG. 3A embodiment is unnecessary in the FIG. 3B embodiment. Rather, upon receiving the ATM VP/VC/port information in the switch control message of event E-11, the embodiment of FIG. 3B proceeds to the path set up and resource reservation operations denoted as event E-13.

The principles as illustrated in the embodiments hereof are also applicable to the carrying of other types of signaling messages in ATM cells. Included among such other types of signaling messages are those destined for the originating terminal (e.g., a call completion signaling message), in which case some of the events described herein are performed essentially in reverse order.

Figure 3C:
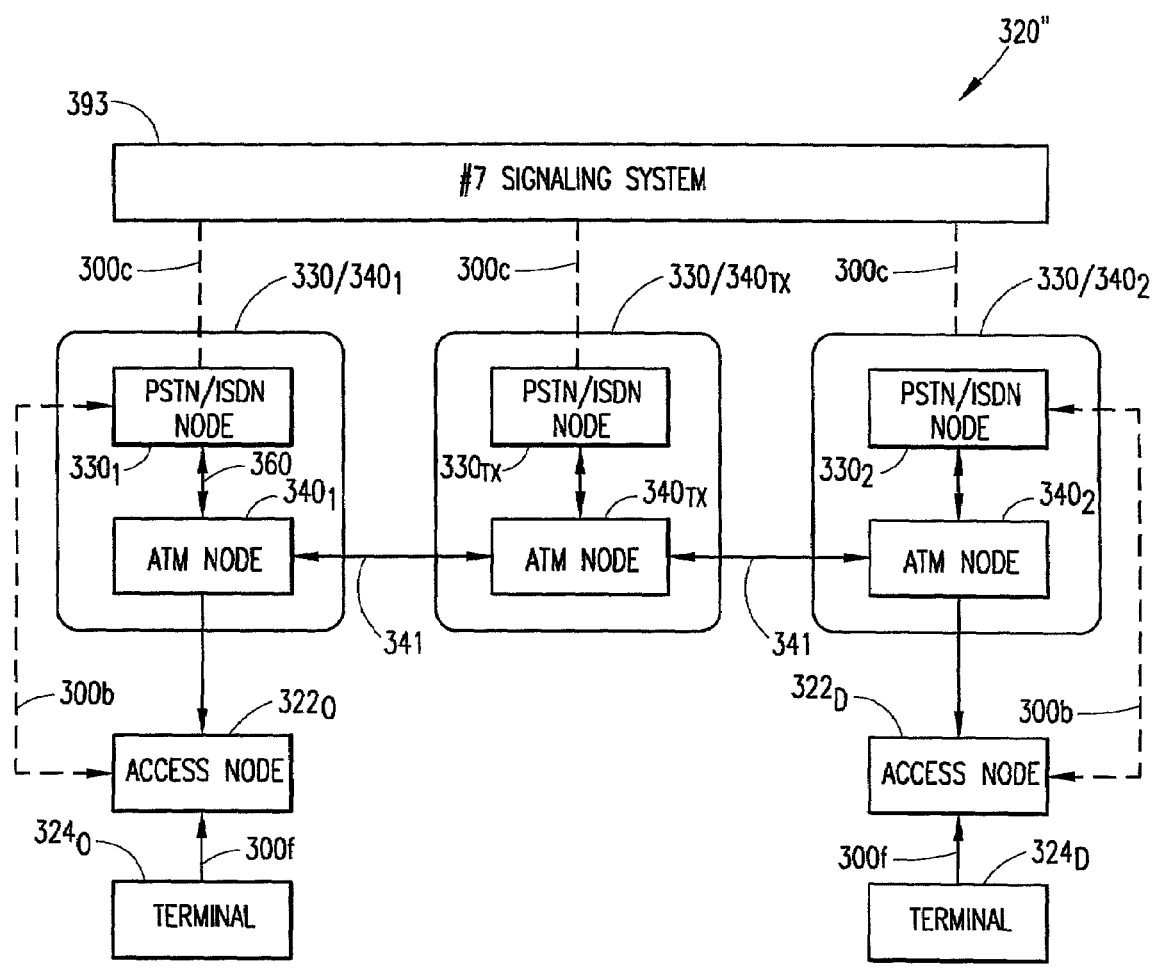
FIG. 3C illustrates an exemplary schematic view showing a transit hybrid node pair of the invention connected between two local exchange hybrid node pairs of the invention.

Referring now to FIG. 3C, an exemplary illustration of how hybrid node pairs 330/340 of the invention may be arranged in an exemplary hybrid STM/ATM network 320" is presented. Network 320" has three node pairs 330/340, including a transit exchange hybrid node pair $330/340_{TX}$ between two local exchange hybrid node pairs $330/340_1$ and $330/340_2$. FIG. 3C shows provision of a "#7 signaling system" 393, which is a logical system carried in the ATM network on an ATM AAL layer as described above. As an alternative embodiment, the "#7 signaling system" 393 may be provided with its own physical network.

Figure 3D:
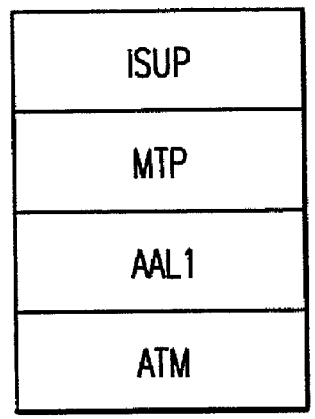
FIG. 3D illustrates a diagrammatic view of an exemplary protocol between two elements of the network of the embodiment(s) of the invention that include hybrid node pairs.

Referring now to FIG. 3D, a diagrammatic view of an exemplary protocol usable between two elements of a network in accordance with embodiment(s) of the invention that include hybrid node pairs is illustrated. The ATM node 340 with its ATM switch 345 terminates the ATM and AAL1 (circuit emulation part) layers; the PSTN/ISDN node 330 terminates the MTP and ISUP layers.

Figure 3E:
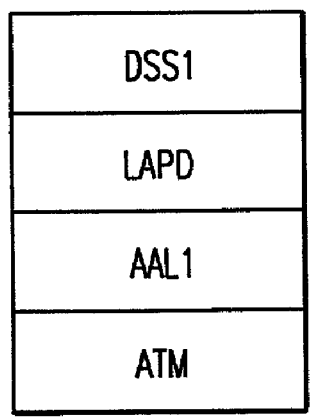
FIGS. 3E, 3F, and 3G illustrate diagrammatic views of alternate exemplary protocols between two elements, a first of the network elements having a hybrid node pair in accordance with embodiment(s) of the invention and a second of the network elements being an access node with an additional ATM interface having circuit emulation.
Figure 3F:
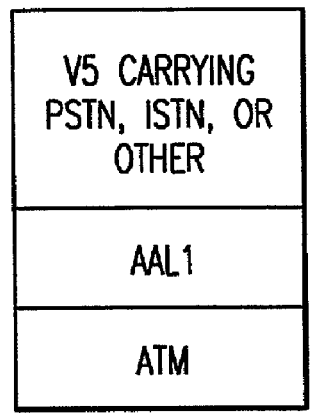
Figure 3G:
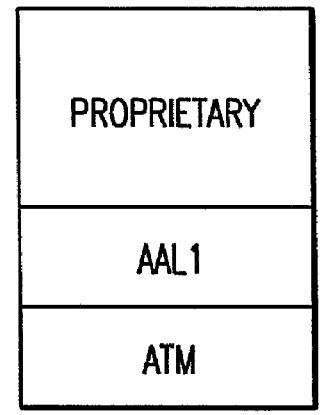

Referring now to FIGS. 3E, 3F, and 3G, diagrammatic views of alternate exemplary protocols between two elements, a first of the network elements having a hybrid node pair in accordance with embodiment(s) of the invention, and a second of the network elements being an access node with an additional ATM interface with circuit emulation is illustrated. In the first network element, the ATM switch 345 terminates the ATM and AAL1 (circuit emulation part) layers, while the layers above are terminated by the PSTN/ISDN node 330. In the second network element, the ATM interface and circuit emulation addition to the access node terminates the ATM and AAL1 layers, while the layers above are terminated by the connected terminal and the access node part. The exemplary protocols of FIGS. 3E, 3F, and 3G can be used, for example, on the interface 300b.

Figure 3H:
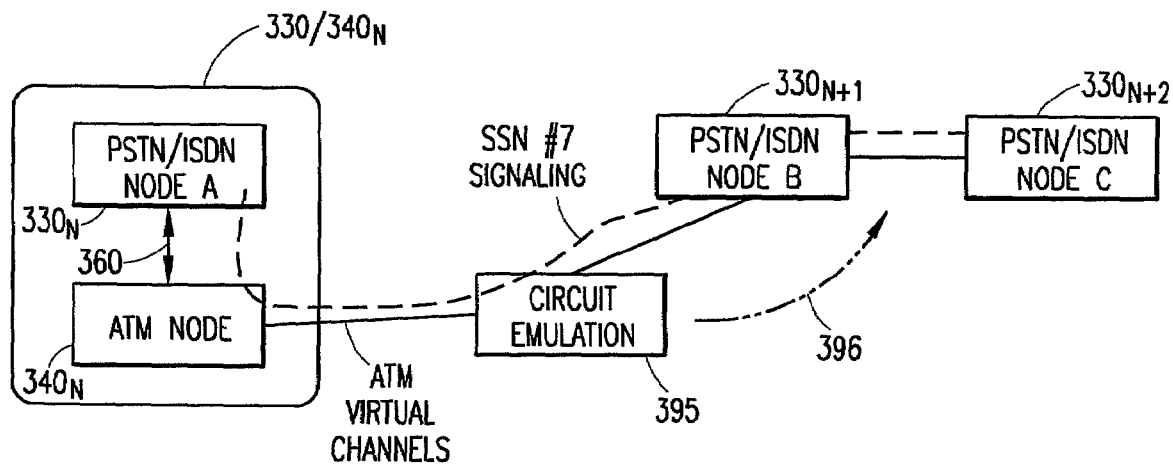
FIG. 3H illustrates an exemplary diagrammatic view showing gradual upgrading of a network from a traditional narrowband STM-transported-and-switched environment into an environment with a hybrid STM/ATM network in accordance with embodiment(s) of the invention.
Figure 31:
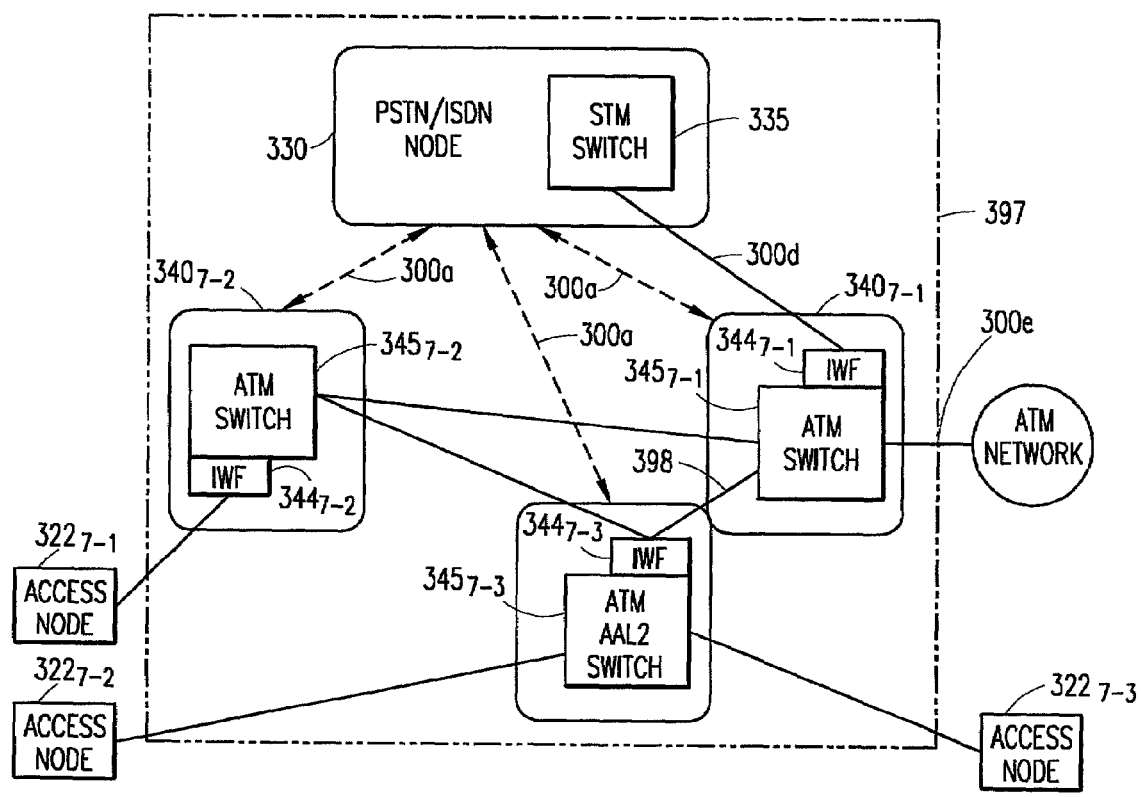

Referring now to FIG. 3H, an exemplary gradual upgrade of a network from a traditional narrowband STM-transported-and-switched environment into the environment (e.g., hybrid STM/ATM network 320) of certain embodiment(s) of the invention is illustrated. In FIG. 3H, the circuit emulation equipment (translator) 395 separates the hybrid environment from the pure STM environment. If node B (PSTN/ISDN node $330_{N+1}$) is upgraded with ATM switching and (signaling and traffic) transport according to certain embodiment(s) of the invention, the node C (PSTN/ISDN node $330_{N+2}$) is not disturbed if the circuit emulation equipment (translator) 395 is moved in between nodes B and C in the manner illustrated by the dotted-dashed line 396 as shown in FIG. 3H.

Referring now to FIG. 3I, certain embodiment(s) of the invention permit the possibility of one logical node to include many switches, with switching logic within the node coordinating the setting up of paths through the switches. This logic also inserts interworking functions (IWFs) between switches (if needed), and makes it possible to use resources independent on which switch they are allocated to. For example, the multi-switch node 397 of certain embodiment(s) of the invention includes the PSTN/ISDN node 330 with its STM switch 335, connected by interface 300d to ATM node $340_{7-1}$. Specifically, connection is made through IWF $344_{7-1}$ to ATM switch $345_{7-1}$ of ATM node $340_{7-1}$. The ATM switch $345_{7-1}$ of ATM node $340_{7-1}$ is connected by interface 300e to an ATM network, as well as to ATM node $340_{7-2}$ and ATM node $340_{7-3}$ included in the multi-switch node 397. The ATM node $340_{7-2}$ has a switch $345_{7-2}$ and an IWF $344_{7-2}$, through which connection can be made with access node $322_{7-1}$. The ATM node $340_{7-3}$ has an ATM AAL2 switch $345_{7-3}$, which connects to ATM nodes $340_{7-1}$ and $340_{7-2}$ through IWF $344_{7-3}$ of ATM node $340_{7-3}$. Access nodes $322_{7-2}$ and $322_{7-3}$ are connected to ATM AAL2 switch $345_{7-3}$ of ATM node $340_{7-3}$.

Certain embodiment(s) of the invention advantageously reuse PSTN and ISDN software in the PSTN/ISDN nodes 330 in a fairly simple way. That is, already-developed narrowband application software residing in the PSTN/ISDN nodes 330 can be utilized, while on-demand ATM connections are used as traffic bearers. The invention thus allows a PSTN/ISDN node such as PSTN/ISDN node 330 to control the call, which facilitates use of well-proven software for various services and functions (e.g., subscriber services, intelligent network (IN) services, Centrex, Charging Customer Care systems, etc.).

ATM is thus used as a transport and switching mechanism in certain embodiment(s) of the invention, while the signaling remains normal narrowband signaling. The narrowband signaling is transported on permanent paths over ATM connections, and the narrowband speech channels are transported on ATM, and switched on a "per call basis" (e.g., on-demand) through an ATM switch.

The narrowband application software executed by processor(s) 332 of PSTN/ISDN nodes 330 thus acts as if operating on its STM circuit switched transport, when in fact it is actually operating on an ATM cell switch. It should be understood that the ATM switch may reside in a separate ATM node or may be integrated in the same node as the STM switch. On a "per call basis", the switching logic in the PSTN/ISDN nodes 330 requests the switching mechanism in the ATM nodes 340 to be set up and disconnected through an ATM cell switch.

It should be understood that variations of the foregoing are within the scope of the embodiments of the invention. For example, the circuit emulation 370 is shown (e.g., in FIG. 3) as being provided on a device board of ATM node 340. Alternatively, circuit emulation 370 may be located elsewhere, such as (for example) on link 360 between PSTN/ISDN node 330 and ATM node 340, or even included in PSTN/ISDN node 330 (e.g., at either end of interface 300d). While various processors, such as processors 332 and 342, have been illustrated as single processors, it should be understood that the functionality of such processors may be situated or distributed in different ways (e.g., distributed over several processors to achieve, e.g., scalability in respect to processing capacity and reliability), for example.

In the foregoing examples, the SETUP message (received at the STM node in STM format) is routed through STM circuit switch 335 as indicated by the event E-8 to signaling terminals 337. It should be understood, however, that depending upon implementation in an PSTN/ISDN node, signaling may take another way to reach a signaling terminal (e.g., other than through a switch). The invention also describes a system with one STM switch and one ATM switch associated with one another. This particular configuration is advantageous in that resources which take care of certain kinds of signals (e.g., in-band signals) may be situated in the STM switch and be used also for the ATM transported calls. This is also a way of reusing the installed base, if such exists. Also, certain embodiment(s) of the invention can perform switching on various levels, such as the AAL2 level and with mini-cells, which tends to reduce any delay/echo problems.

The invention thus pertains to the telecommunications world and an attempt to introduce ATM to a telecommunications network. The invention addresses the situation in which a circuit switched telephony network pre-exists, and it is to be augmented or partially replaced by parts that employ ATM for transport and switching. Certain embodiment(s) of the invention need not employ broadband signaling, but rather narrowband signaling with the bearer part of the call following the signaling to the same extent as in a traditional narrowband circuit switched network.

As described herein, ATM may be used as a transport and switching mechanism in a hybrid STM/ATM network, while the signaling remains normal narrowband signaling. The narrowband signaling may be transported on permanent paths over ATM connections, and the narrowband speech channels may be transported on ATM and switched on a "per call basis" (e.g., on-demand) through an ATM switch. The hybrid STM/ATM network may include an access node that services narrowband terminals and which generates a signaling message in connection with call setup. A translator formats the first signaling message into ATM cells so that the first signaling message may be routed through an ATM switch to a circuit switched (e.g., STM) node. The circuit switched node (e.g., PSTN/ISDN) sets up a physical connection for the call and generates a further signaling message for the call, the further signaling message pertaining to the physical connection. The ATM switch routes an ATM cell-formatted version of the further signaling message to another ATM switch over an ATM physical interface. Thus, the ATM switch switches both narrowband traffic and signaling for the call over the ATM physical interface.

Figure 4:
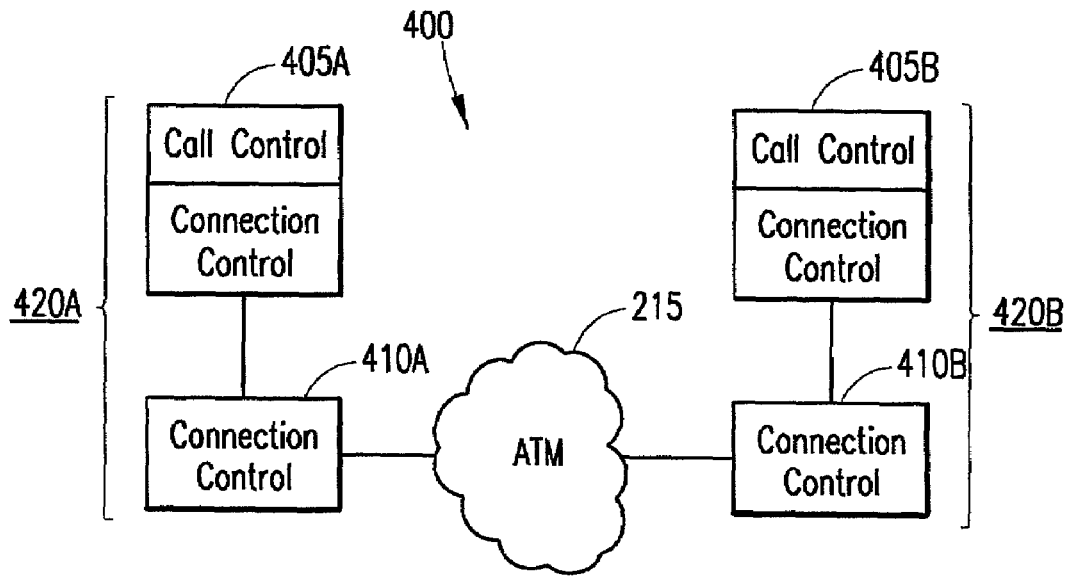
FIG. 4 illustrates another exemplary scheme for utilizing a broadband network in conjunction with nodes having partially separated functions in accordance with the present invention.

Referring now to FIG. 4, another exemplary scheme for utilizing a broadband network in conjunction with nodes having partially separated functions in accordance with the present invention is illustrated generally at 400. The nodes 405A,405B are connected to the nodes 410A, 410B. The nodes 405A,405B each include both call control functions and connection control functions. In effect, each of the nodes 405A,405B (e.g., which may correspond to, for example, PSTN/ISDN nodes 330 of the embodiment(s) of FIG. 3 et seq.) include both switching intelligence (e.g., which may correspond to, for example, one or more of processor(s) 332, switch and resource control software 333, signaling terminals 337, and STM/GPN translation table 339 of the embodiment(s) of FIG. 3 et seq.) and switching fabric (e.g., which may correspond to, for example, an STM circuit switch 335 of the embodiment(s) of FIG. 3 et seq.). While the nodes 410A,410B include connection control functions, they rely on the call control functions of the nodes 405A,405B to which they are respectively connected. In effect, each of the nodes 410A,410B (e.g., which may correspond to, for example, ATM nodes 340 of the embodiment(s) of FIG. 3 et seq.) include switching fabric (e.g., which may correspond to, for example, an ATM cell switch 345 of the embodiment(s) of FIG. 3 et seq.). The nodes 410A,410B, which are also connected to an ATM network 215, effect required emulation and cell packing for interworking a narrowband network (not shown) with the ATM network 215.

Generally, and in certain embodiment(s), call control involves features, functions, responsibilities, etc. pertaining to one or more of the following: routing a call; signaling between narrowband nodes; providing subscriber services; implementing charging; determining the connection and/or activation of tone senders, answering machines (e.g., voice mail), echo cancelers, and other types of telephony resources and/or equipment; ascertaining the desirability and/or necessity of utilizing an IN service; etc. Connection control, on the other hand, involves features, functions, responsibilities, etc. pertaining to setting up/establishing a connection between two (or among/across multiple) physical points within a switch and/or over a network responsive to call control, for example. The connection control, to effectuate such a connection, may rely on some type of signaling of the bearer network (e.g., UNI, PNNI, B-ISUP, etc.)

In accordance with certain embodiment(s) of the present invention, the nodes 405A,405B may be advantageously realized using, at least partly, a modified version of an existing/legacy telecommunications switch. Using an existing telecommunications switch advantageously obviates any need to create code "from scratch" for the myriad of advanced calling features that are already supported by the existing telecommunications switch. Furthermore, in accordance with certain principles of the present invention, using an existing telecommunications switch enables a gradual migration to a broadband transport mechanism such as ATM. A call/connection control node 405A,405B and a respective connection control node 410A,410B pair together form a hybrid switch 420A/420B.

Figure 5:
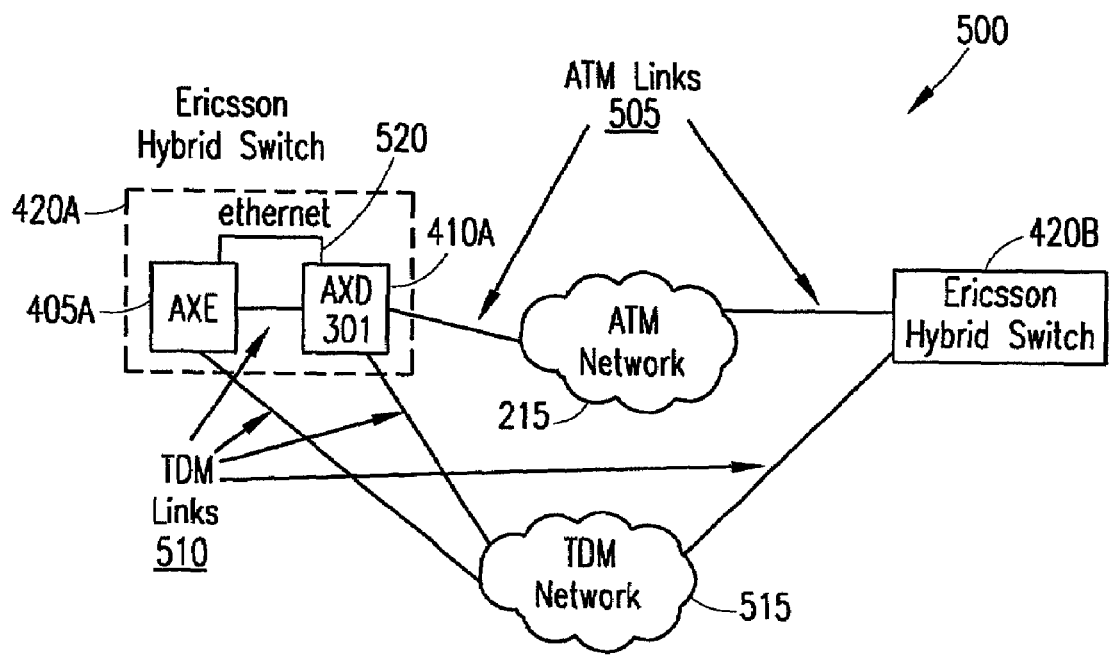
FIG. 5 illustrates yet another exemplary scheme for utilizing a broadband network in conjunction with nodes having partially separated functions in accordance with the present invention.

Referring now to FIG. 5, yet another exemplary scheme for utilizing a broadband network in conjunction with nodes having partially separated functions in accordance with the present invention is illustrated generally at 500. The two hybrid switches 420A,420B are illustrated as being connected to the ATM network 215 by ATM links 505 (e.g., which may correspond to, for example, one or more of interface 300c, interface 300e, and ATM physical link 341 of the embodiment(s) of FIG. 3 et seq.), e.g., via a connection control node 410. Each of the call/connection control node 405A and the connection control node 410A are connected to a Time Division Multiplexed (TDM) network 515 by TDM links 510 (e.g., which may correspond to, for example, interface 300d of embodiment(s) of FIGS. 3 et seq. [including alternative embodiment(s) of FIGS. 3 et seq. as described hereinabove with reference to the interface 300d of FIG. 3]; as well as interface 300b/link 351, interfaces 300b, 300c, and/or interface 300d/switch-to-switch link 360). The TDM network 515 may correspond to any of many so-called narrowband networks such as PSTN, PLMN, ISDN, etc. As indicated within the hybrid switch 420A, the call/connection control node 405A is connected to the connection control node 410A via a TDM link 510 (e.g., which may correspond to, for example, interface 300b, interface 300c, interface 300d, switch-to-switch link 360, etc. of FIG. 3 et seq.) and an ethernet link 520 (e.g., which may correspond to, for example, interface 300a, interface 300b, interface 300c, switch-to-switch link 360, etc. of FIG. 3 et seq.).

The hybrid switch 420 advantageously enables an existing switch in conjunction with an associated switch to facilitate the transport of call connections at least partly across a broadband network, such as the ATM network 215. As illustrated in the scheme 500, the existing switch may be realized using, for example, an AXE switch (available from Ericsson Inc.), and the associated switch may be realized using, for example, an AXD 301 switch (also available from Ericsson Inc.). Thus, the hybrid switches 420A,420B may be realized using, for example, an Ericsson Hybrid Switch (also available from Ericsson Inc.).

Figure 6:
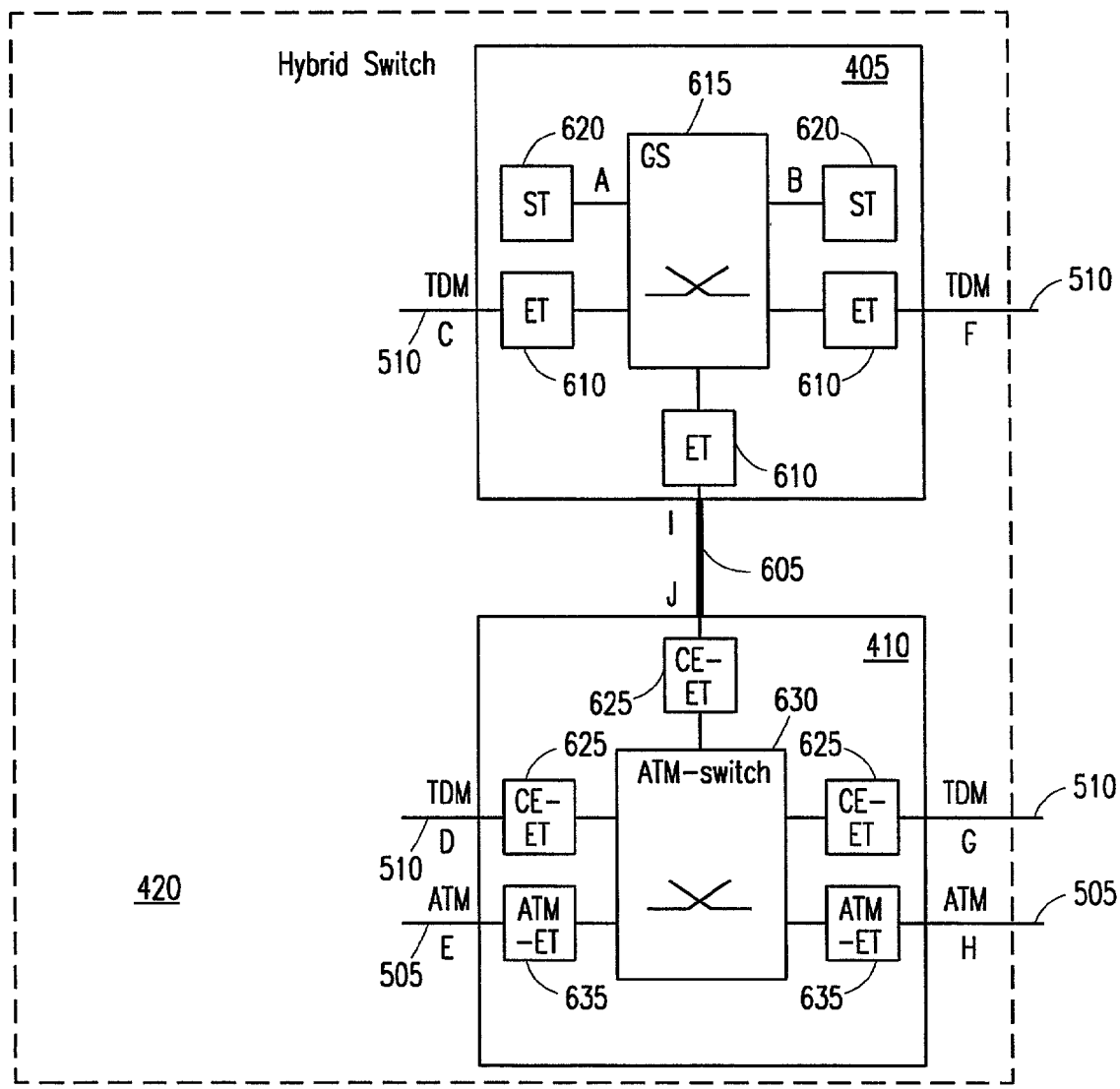
FIG. 6 illustrates another exemplary hybrid switch with multiple ports for switching a connection in accordance with the present invention.

Referring now to FIG. 6, another exemplary hybrid switch with multiple ports for switching a connection in accordance with the present invention is illustrated generally at 420. The hybrid switch 420 includes a call/connection control node 405 and a connection control node 410 that are connected by linkage 605 (e.g., which may correspond to, for example, one or more of interface 300a, interface 300b, interface 300c, interface 300d, and switch-to-switch link 360 of the embodiment(s) of FIGS. 3 et seq.). It should be noted that the thick line representing the linkage 605 indicates that the linkage 605 may be composed of more than one link. Information exchange across linkage 605 permits the call/connection control node 405 to switch narrowband calls across the switching fabric of the connection control node 410. Such information exchange enables 64 kbit/sec, narrowband calls originating and terminating in narrowband networks (e.g., one or more TDM networks 515) to be trunked over broadband networks (e.g., one or more ATM networks 215) between hybrid switches 420. It should be noted that TDM as used herein, including the claims, encompasses and embraces time-division multiplexed protocols in general, and it is not limited to any particular TDM protocol.

The call/connection control node 405 includes input/outputs (I/Os) for two TDM links 510. Each TDM link 510 terminates at exchange termination (ET) equipment 610. Each ET equipment 610 is connected to a group switch (GS) 615 (e.g., which may correspond to, for example, the STM circuit switch 335 of the embodiment(s) of FIGS. 3 et seq.). Each ET equipment 610 receives from the GS 615 data samples taken from multiple calls and multiplexes this data into a stream of data sent out over a TDM link 510 that connects the hybrid switch 420 to another node. The ET equipment 610 also receives data from other nodes over the TDM link 510 and de-multiplexes this data into samples from separate calls to be transferred to the GS 615. The GS 615 is also connected to one or more signaling terminals (STs) 620 (e.g., which may correspond to, for example, the signaling terminals 337 of the embodiment(s) of FIG. 3 et seq.). The linkage 605 may include a TDM link 510 (not explicitly shown in FIG. 6) that connects an ET equipment 610 of the call/connection control node 405 with a circuit emulation-ET (CE-ET) equipment 625 (e.g., which may correspond to, for example, the circuit emulation/translator 370 of the embodiment(s) of FIG. 3 et seq.) of the connection control node 410.

The connection control node 410 includes I/Os for two TDM links 510. Each TDM link 510 terminates at CE-ET equipment 625 (e.g., which may correspond to, for example, the extension terminal ET $346_2$ (optionally in conjunction with the circuit emulation/translator 350) of the embodiment(s) of FIG. 3 et seq.). Each CE-ET equipment 625 is connected to an ATM switch 630 (e.g., which may correspond to, for example, the ATM switch 345 of the embodiment(s) of FIG. 3 et seq.). The CE-ET equipment 625 terminates a TDM link 510 for the ATM switching fabric of the connection control node 410 by using circuit emulation. The circuit emulation, e.g., hardware on a CE-ET equipment 625 maps time slots from an E1 line into, for example, single streams of ATM adaptation layer 1 (AAL1) cells. The CE-ET equipment 625 maps successive octets from a single time slot to a single stream of AAL1 cells. The ATM switch 630 is also connected to one or more ATM-ET equipments 635 (e.g., which may correspond to, for example, the extension terminal ET $346_1$ of the embodiment(s) of FIG. 3 et seq.). Each ATM-ET equipment 635 terminates an ATM link 505 to the ATM switching fabric of the connection control node 410.

The various ports/interfaces of the call/connection control node 405 and the connection control node 410 enable the establishment of various connection paths in the hybrid switch 420. Connection paths may be established across the following exemplary points as enumerated in Table 1:

TABLE 1

| Connection Paths Establishable for FIG. 6 |
| --- |
| (1) point A - (I, J) - G |
| (2) point A - (I, J) - H |
| (3) point D - (J, I) - B |
| (4) point E - (J, I) - B |
| (5) point C - (I, J) - G |
| (6) point C - (I, J) - H |
| (7) point D - (J, I) - F |
| (8) point D - G |
| (9) point D - H |
| (10) point E - (J, I) - F |
| (11) point E - G |
| (12) point E - H |

Taking connection path "(6) point C-(I, J)-H", for example, a connection may be established from point "C" at the TDM link 510, through two ET equipments 610 and the GS 615, to point "I". The connection continues from point "I" across the linkage 605 to point "J". The connection continues further from point "J" through a CE-ET equipment 625, the ATM switch 630, and the ATM-ET equipment 635 to point "H" at the ATM link 505.

Figure 7:
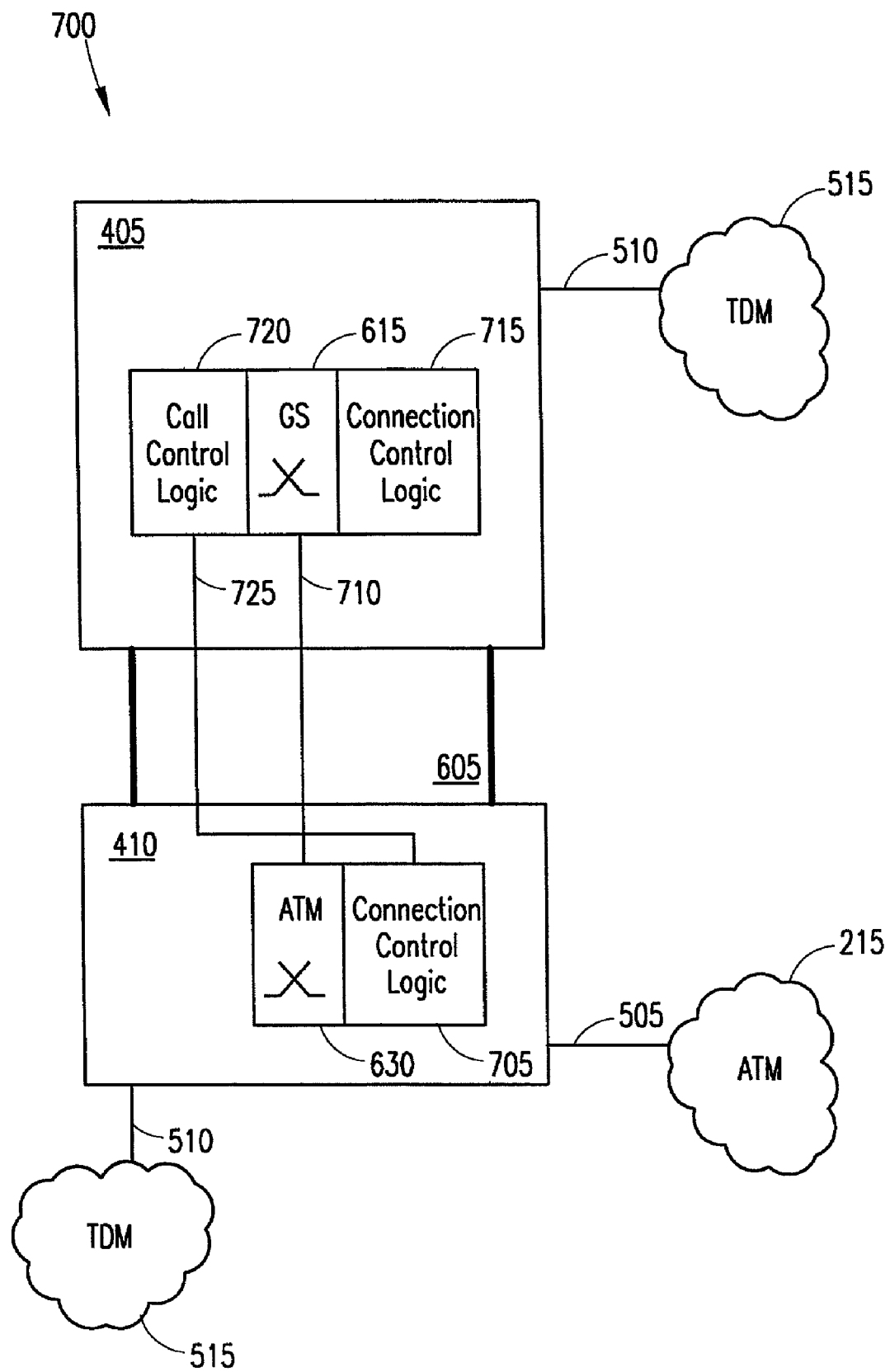
FIG. 7 illustrates a simplified block diagram of an exemplary hybrid switch in accordance with the present invention.

Referring now to FIG. 7, a simplified block diagram of an exemplary hybrid switch in accordance with the present invention is illustrated generally at 700. The hybrid switch at 700 includes a call/connection control node 405, which is shown connected to a TDM network 515 via a TDM link 510, and a connection control node 410, which is shown connected to a TDM network 515 via a TDM link 510 and an ATM network 215 via an ATM link 505. The call/connection control node 405 is connected to the connection control node 410 via the linkage 605, which may include one or more links. The connection control node 410 includes connection control logic 705 and the ATM switch 630. The connection control logic 705 may be composed of, for example, hardware, software, firmware, some combination thereof, etc.

The ATM switch 630 is connected via link 710 to the GS 615 of the call/connection control node 405. The link 710 may be utilized to transfer data information between the ATM switch 630 and the GS 615. The call/connection control node 405 also includes connection control logic 715 to enable the call/connection control node 405 to switch calls (e.g., to or through the TDM network 515 directly connected thereto via the TDM link 510) without the aid of the connection control node 410. The connection control logic 715 may also be composed of, for example, hardware, software, firmware, some combination thereof, etc. The call/connection control node 405 further includes call control logic 720, which provides call control functions for the connection control node 410 as well as the call/connection control node 405. The call control logic 720 may also be composed of, for example, hardware, software, firmware, some combination thereof, etc.

The call control logic 720 may provide call control functions to the connection control node 410 by exchanging signaling information over a link 725. (It should be noted that either or both of the links 710 and 725 may be composed of more than one link.) For example, for a call incoming to the connection control node 410 over the TDM link 510 from the TDM network 515, signaling information may be forwarded to the call control logic 720 from the connection control logic 705 over the link 725. The switching intelligence of the call control logic 720 executes applicable call control functions and ascertains relevant call control information (e.g., as explained further hereinabove with reference to FIG. 3 et seq.). This signaling information is sent from the call control logic 720 over the link 725 to the connection control logic 705, which may thereafter switch the call data information of the incoming call to/through the appropriate network (e.g., the ATM network 215). The call control functions of existing (e.g., STM) switches can therefore be advantageously utilized by newer and faster (e.g., ATM) switches to thereby avoid needing to completely reprogram call control functionality for the newer switches.

It should be emphasized that the call/connection control node 405 is capable of connecting directly to the TDM network 515 over the TDM link 510 via the GS 615. Consequently, a hybrid switch architecture in accordance with the present invention, by combining a call/connection control node 405 with a connection control node 410, enables this logical node to communicate (i) with an existing TDM network 515 (e.g., a PSTN network) using the GS 615 (e.g., an STM switch) and (ii) with a broadband network (e.g., the ATM network 215) over a broadband link (e.g., the ATM link 505) using a broadband switch (e.g., the ATM switch 630). Providing such dual connectivity advantageously enables a network to gradually migrate from a first network protocol (e.g., a narrowband network protocol) to a second network protocol (e.g., a broadband network protocol) while utilizing both existing call control logic (e.g., software, etc.) and existing connections to and within the first network (e.g., a narrowband network).

Figure 8:
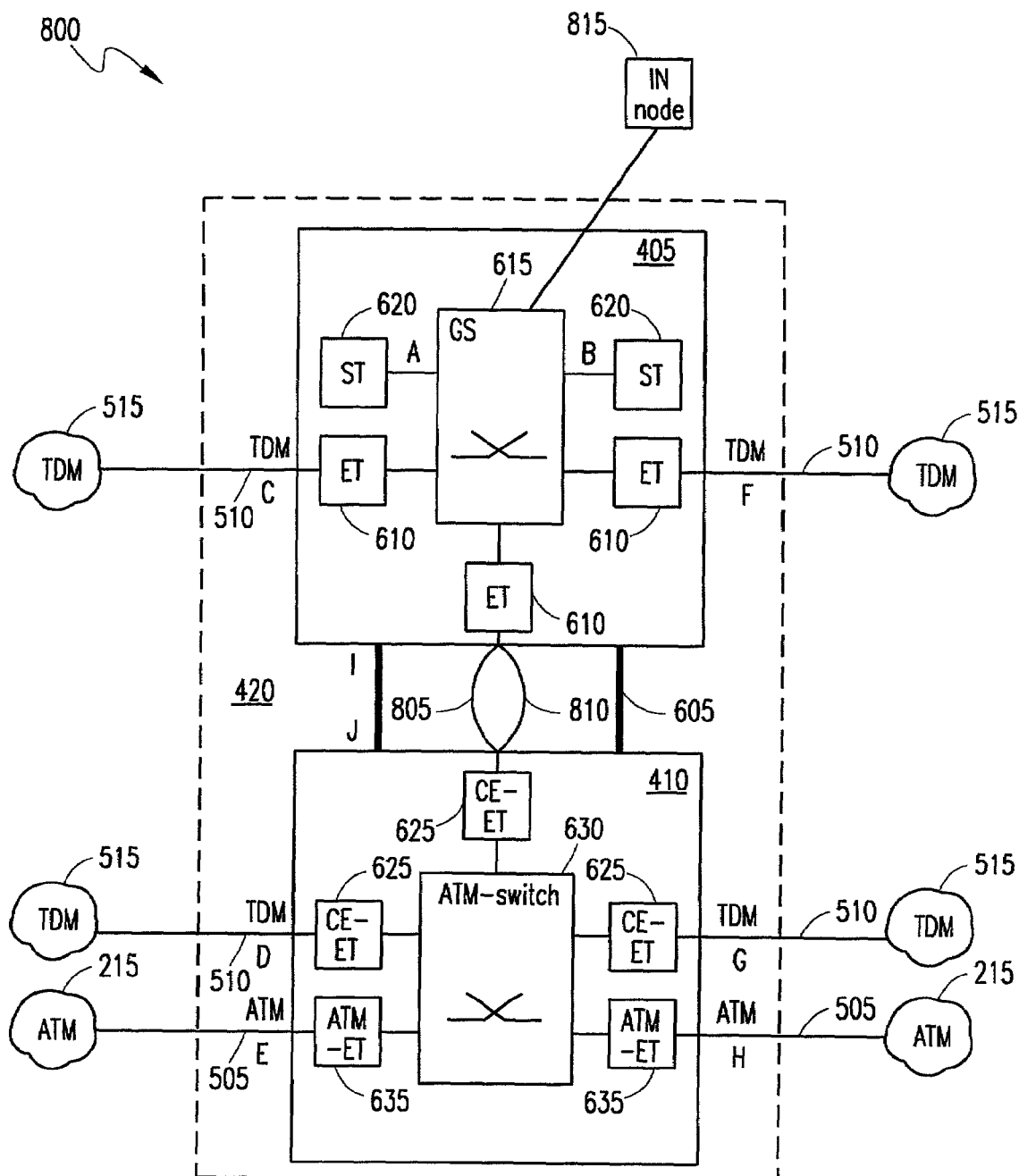
FIG. 8 illustrates exemplary communications and connections between nodes in another simplified block diagram of an exemplary hybrid switch in accordance with the present invention.

Referring now to FIG. 8, exemplary communications and connections between nodes in another simplified block diagram of an exemplary hybrid switch in accordance with the present invention are illustrated generally at 800. In the exemplary hybrid switch 420, the call/connection control node 405 is connected to the connection control node 410 via the linkage 605 at points I and J. The linkage 605 may be composed of multiple links. In this exemplary embodiment 800, a signaling information link 805 (e.g., which may correspond to, for example, interface 300a, interface 300b, interface 300c, switch-to-switch link 360, etc. of FIG. 3 et seq.) and a data information link 810 (e.g., which may correspond to, for example, interface 300b, interface 300c, interface 300d, switch-to-switch link 360, etc. of FIG. 3 et seq.) are illustrated as connecting the call/connection control node 405 to the connection control node 410. The signaling information link 805 may carry signaling communications between the call/connection control node 405 and the connection control node 410, and the data information link 810 may carry data communications between the call/connection control node 405 and the connection control node 410. Such data communications may include voice or data calls, for example.

In an exemplary embodiment, the signaling information link 805 is realized using two ethernet links. One ethernet link may be used for transmitting signaling information from the call/connection control node 405 to the connection control node 410 while the other ethernet link may be used for transmitting signaling information from the connection control node 410 to the call/connection control node 405. It should be understood that ethernet links are typically duplex in nature and that any ethernet links employed in any particular embodiment(s) in accordance with the present invention may also be duplex. The data information link 810 may be realized using a TDM link. For example, the data information link 810 may be composed of one or more E1 lines. Communications necessary and/or beneficial to establishing the various connections described hereinabove with reference to FIGS. 6 and 7, for example, may be effectuated across the signaling information link 805 and the data information link 810. Advantageously, because separate links are employed between the nodes 405 and 410, signaling information and data information may be transferred therebetween across links 805 and 810, respectively, without needing to specify whether the transmitted information pertains to signaling or to data.

As illustrated generally at 800, the call/connection control node 405 is connected to two TDM networks 515, and the connection control node 410 is connected to two TDM networks 515 as well as two ATM networks 215. It should be noted that the number of networks to which the nodes 405 and 410 are connected is exemplary only. The flexibility of the hybrid node 420 advantageously enables calls to be incoming at either of the nodes 405 and 410 and to be forwarded via a connection of either of the nodes 405 and 410. In other words, a narrowband call incoming to the connection control node 410 (at point D) or a broadband call (e.g., a narrowband call being carried by a broadband transport mechanism, etc.) incoming to the connection control node 410 (at point E) may be forwarded from the connection control node 410 (as a narrowband or broadband call at point G or point H, respectively) or from the call/connection control node 405 as a narrowband call (e.g., at point F). Furthermore, a narrowband call incoming to the call/connection control node 405 (at point C) may be forwarded from the call/connection control node 405 as a narrowband call (at point F) or from the connection control node 410 (e.g., as a narrowband or broadband call at point G or point H, respectively). It should be noted that other combinations of ingress and egress (e.g., other connection paths) are possible.

By way of a first example but not limitation, assume that a call (or, more generally, a communication) is incoming to the connection control node 410 from a TDM network 515 at point D. The signaling information related to the call (e.g., an ISUP Initial Address Message (IAM)) is encapsulated into ATM cells (e.g., at the CE-ET equipment 625 at point D) and passed to the ATM switch 630. Advantageously, the signaling information may therefore be piped through the connection control node 410 and over the signaling information link 805 without reformatting after being de-packaged from ATM cells (e.g., at the CE-ET equipment 625 at point J). The signaling information therefore need not be modified inasmuch as it may be transported through "transparent" pipes across the ATM switching fabric of the connection control node 410 (e.g., using a permanent virtual path connection (PVPC) pipe or similar, etc.).

When the GS 615 and associated call control logic (not explicitly shown in FIG. 8) receive the signaling information of the incoming call, the signaling information is analyzed (e.g., by an ST 620 at point A or point B). The traffic call handling is performed by, for example, performing a B-number analysis, accessing an interactive voice response system, contacting an Intelligence Network (IN) node 815 (e.g., for "(800)" call routing, etc.), consulting a database of bearer capabilities for destination and/or transit nodes, etc. If, in contradistinction to the example described hereinabove with reference to FIG. 3A, the call/connection control node 405 determines that the call should not or can not be routed through a broadband ATM transport mechanism, then the call/connection control node 405 instructs the connection control node 410 (e.g., over the signaling information link 805) to route the data information of the call to (and through) the call/connection control node 405.

The data information of the call is routed through the connection control node 410 from point D to point J (e.g., by piping the data information via a semi-permanent connection through the switching fabric of the ATM switch 630). It should be noted that the data information may be propagated through the connection control node 410 without reformatting by, for example, encapsulating the data information in ATM cells. Thereafter, the data information is forwarded from point J to point I over the data information link 810 in, for example, a TDM format. The ET equipment 610 receives the data information of the call, and the GS 615 switches it toward the appropriate TDM network 515 (e.g., through an ET equipment 610 to a point C or a point F) in accordance with the earlier traffic call analysis.

By way of a second example but not limitation, assume that a call is incoming to the call/connection control node 405 from a TDM network 515 at point C. The call/connection control node 405 performs a traffic call analysis based on signaling information of the call. If the analysis indicates that the call can (and optionally should) be sent over a broadband transport mechanism, the call/connection control node 405 can direct the incoming call through the connection control node 410 and then to an ATM network 215, instead of directing the call to a TDM node in a TDM network 515 (e.g., through the ET equipment 610 at the point F). In this regard, the GS 615 may switch the call signaling information to the ATM switch 630 via the signaling information link 805 and the call data information to the ATM switch 630 via the data information link 810 (and appropriate ET equipment 610 and CE-ET equipment 625 at point I and point J, respectively). The ATM switch 630 may thereafter send the signaling information of the call over permanent connections set up in the broadband ATM network 215 and the data information of the call over, e.g., call-specific connections in the broadband ATM network 215 (via an ATM-ET equipment 635 at point E or point H).

Figure 9:
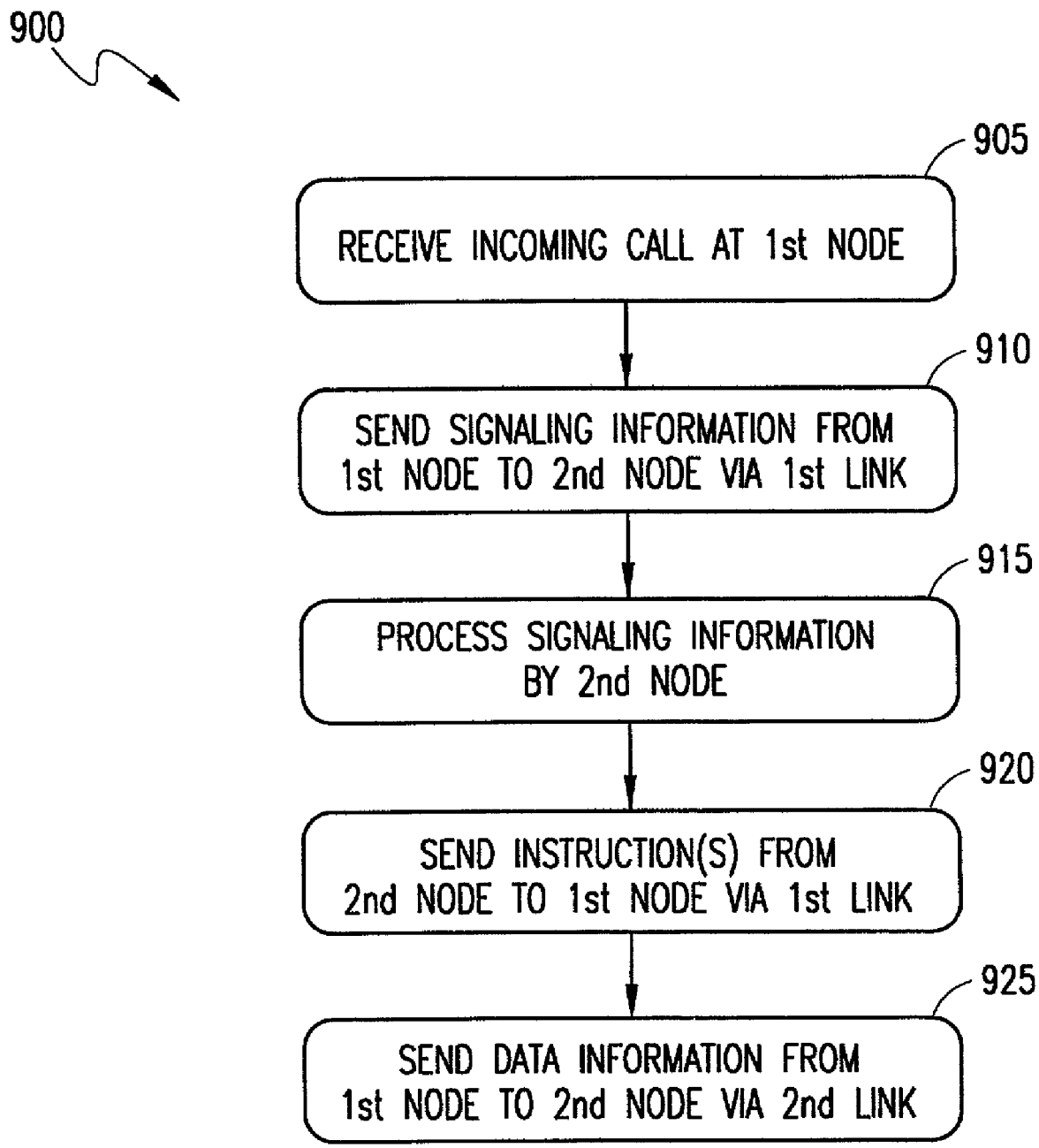
FIG. 9 illustrates an exemplary method in flowchart form for communicating between nodes in a hybrid switch in accordance with the present invention.

Referring now to FIG. 9, an exemplary method in flowchart form for communicating between nodes in a hybrid switch in accordance with the present invention is illustrated generally at 900. In the exemplary method of flowchart 900, an incoming call is initially received at a first node (step 905). The first node sends signaling information related to the incoming call to a second node via a first link (step 910). The second node, which may provide call control for the first node, processes the signaling information (step 915) to determine how and to where the incoming call is to be routed. The second node sends instructions to the first node (e.g., via the first link) (step 920) directing the first node on how/where to route the incoming call. Assuming that the second node determined that the incoming call should be routed as an outgoing call from the second node (at step 915) and that the instructions sent to the first node (at step 920) so indicated, data information related to the incoming call is sent from the first node to the second node via a second link (step 925).

Alternatively, an incoming call can be received at a node capable of processing the corresponding signaling information. Accordingly, both signaling information and data information corresponding to the incoming call may be sent to an associated node via first and second links, respectively, if the node receiving the incoming call determines that it is appropriate to do so (e.g., as described hereinabove in the second example referencing FIG. 8). The call control functions of existing (e.g., STM) switches can therefore be advantageously utilized by newer and faster (e.g., ATM) switches to thereby avoid needing to completely reprogram the call control functionality for the newer switches. Furthermore, hybrid switches including both narrowband and broadband switches enable greater versatility for switching communications between broadband and narrowband transport mechanisms. For example, a hybrid switch may receive a communication that is being transported in a narrowband format and forward the communication in a broadband format, or vice versa. This ability is particularly advantageous for enabling a gradual migration in a network from being primarily or entirely narrowband to being primarily or entirely broadband.

Figure 10A:
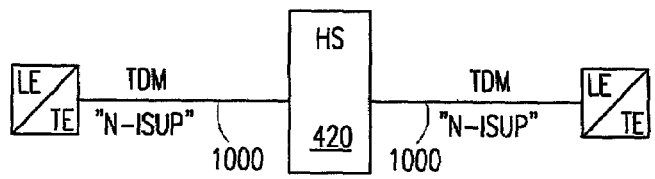
FIGS. 10A–10E illustrate a first set of exemplary traffic scenarios for a hybrid switch in accordance with the present invention.

Referring now to FIGS. 10A–10E, a first set of exemplary traffic scenarios for a hybrid switch in accordance with the present invention is illustrated. In FIG. 10A, a hybrid switch 420 is illustrated as being connected to two local exchange/transit exchange (LE/TE) nodes via TDM links, which may operate using an "N-ISUP" protocol, for example. The hybrid switch 420 is illustrated as receiving and forwarding a communication 1000. It should be understood that the detailed traffic scenarios illustrated in FIGS. 10B–10E are also applicable to other instances besides when a hybrid switch 420 is directly connected to a local exchange/transit exchange node on both sides of a communication 1000. For instance, the traffic scenarios of FIGS. 10B–10E are applicable whenever both the incoming and the outgoing side of a communication are transported on a narrowband transport mechanism such as TDM.

Figure 10B:
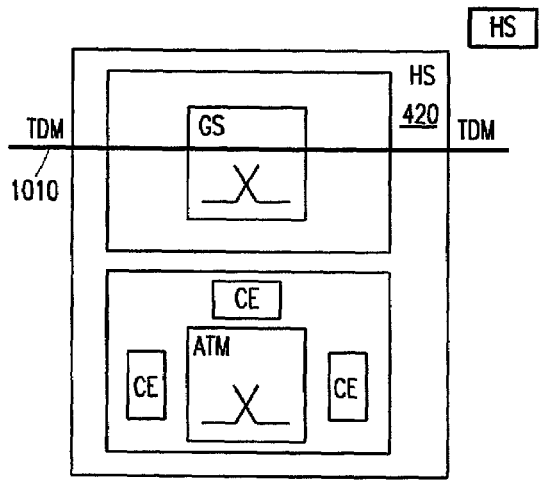
Figure 10C:
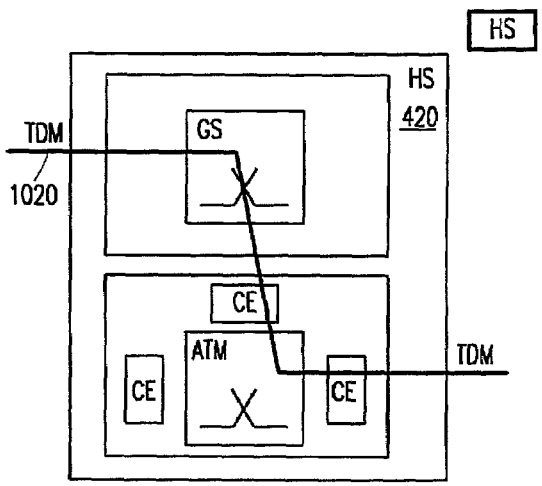
Figure 10D:
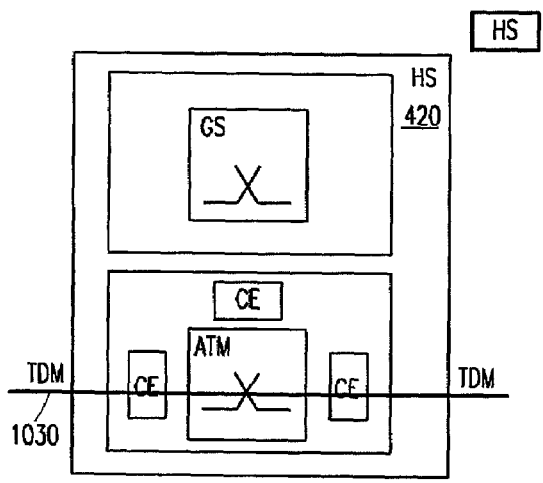
Figure 10E:
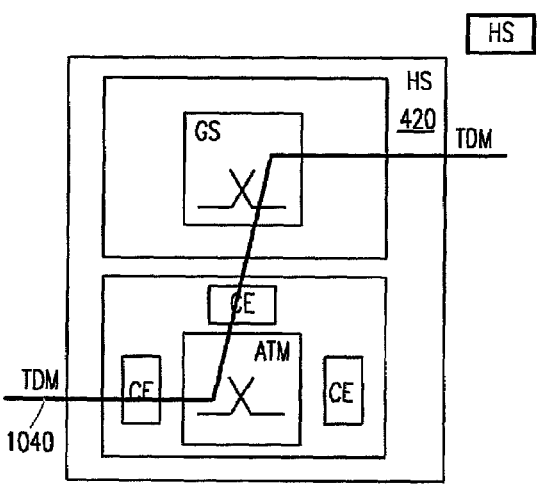

In FIG. 10B, the communication 1010 (which represents a particular traffic scenario and/or portion of the communication 1000) may be terminated and switched entirely within the narrowband portion of the hybrid switch 420. In FIG. 10C, the incoming side of a communication 1020 is terminated in the narrowband portion of the hybrid switch 420 while the outgoing side is terminated at the broadband portion (e.g., using a circuit emulation (CE) board). The switching occurs partly within the narrowband portion and partly within the broadband portion of the hybrid switch. In FIG. 10D, both of the incoming and the outgoing sides of a communication 1030 are terminated in the broadband portion of the hybrid switch 420. In this scenario, a, e.g., circuit emulation board is utilized on both the ingress and the egress sides of the, e.g., TDM connection. The switching may be effectuated entirely within the switching fabric of the broadband portion. In FIG. 10E, the incoming side of a communication 1040 is terminated by the broadband portion of the hybrid switch 420 whereas the outgoing side is terminated at the narrowband portion. Switching of the communication 1040 is therefore effectuated partly within the broadband portion (e.g., using an ATM switch 630) and partly within the narrowband portion (e.g., using a GS 615) of the hybrid switch 420.

Figure 10F:
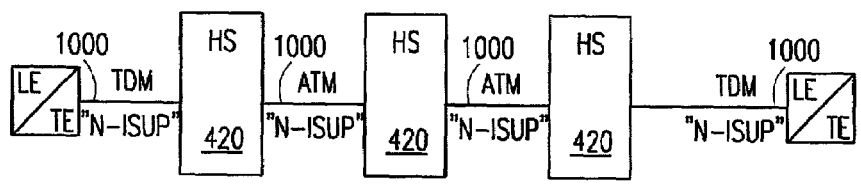
FIGS. 10F–10K illustrate a second set of exemplary traffic scenarios for a hybrid switch in accordance with the present invention.

Referring now to FIGS. 10F–10K, a second set of exemplary traffic scenarios for a hybrid switch in accordance with the present invention is illustrated. In FIG. 10F, multiple hybrid switches 420 are illustrated as being connected to each other and ultimately to two local exchange/transit exchange nodes. The hybrid switches 420 are illustrated as receiving and forwarding a communication 1000. A connection between two hybrid switches 420 may be realized using an ATM link, which may carry an "N-ISUP" protocol thereon, for example. A connection between a hybrid switch 420 and a local exchange/transit exchange may be realized using a TDM link, which may operate using an "N-ISUP" protocol, for example.

It should be understood that the detailed traffic scenarios illustrated in FIGS. 10G–10J are also applicable to other instances besides when a hybrid switch 420 is directly connected to a local exchange/transit exchange node on a single side of a communication 1000. For instance, the traffic scenarios of FIGS. 10G–10J are applicable whenever one side of a communication is transported on a narrowband transport mechanism such as TDM and the other side of the communication is transported on a broadband transport mechanism such as ATM. Likewise, it should be understood that the detailed traffic scenario illustrated in FIG. 10K is also applicable to other instances besides when a hybrid switch 420 is directly connected to hybrid switches 420 on both sides of a communication 1000. For instance, the traffic scenario of FIG. 10K is applicable whenever both sides of a communication are transported on a broadband transport mechanism such as ATM.

Figure 10G:
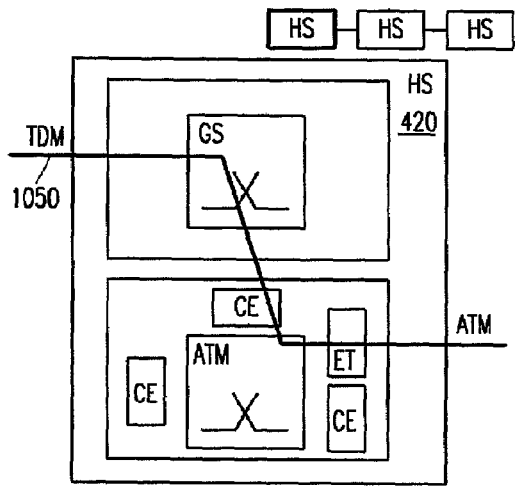
Figure 10H:
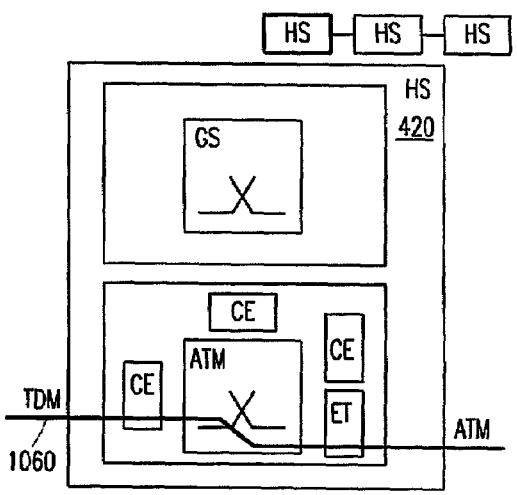

In FIG. 10G, a communication 1050 is terminated at the incoming (e.g., TDM) side by the narrowband portion of the hybrid switch 420. The switching of the communication 1050 may be performed by both the narrowband and the broadband portions after accommodation of the differing formats (e.g., by a circuit emulation board). The termination of the outgoing (e.g., ATM) side of the communication 1050 is effectuated (e.g., by an exchange termination (ET) board) at the broadband portion of the hybrid switch 420. In FIG. 10H, the incoming side of a communication 1060 is terminated (e.g., by a circuit emulation board for a narrowband transport format) at the broadband portion of the hybrid switch 420. Switching of the communication 1060 may be performed entirely within the switching fabric of the broadband portion of the hybrid switch, and termination (e.g., by an exchange termination board for a broadband transport format) of the outgoing side of the communication 1060 may be accomplished by the broadband portion as well.

Figure 10I:
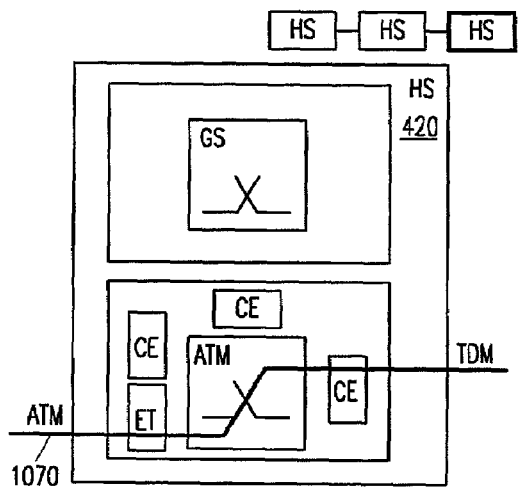
Figure 10J:
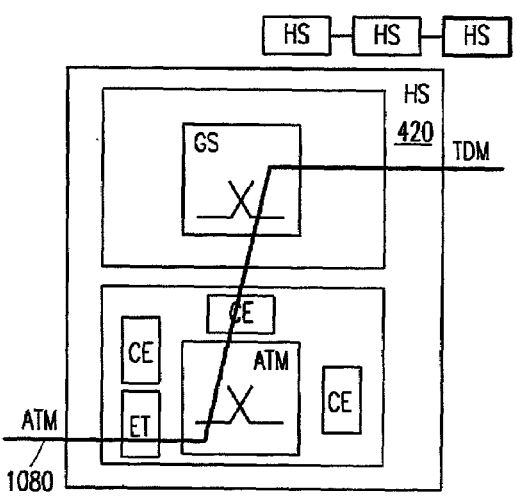
Figure 10K:
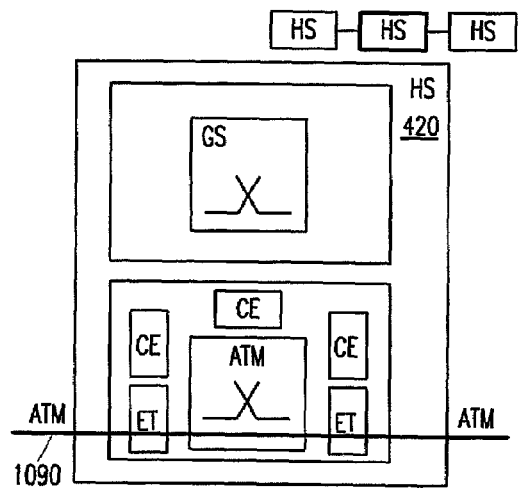

In FIG. 10I, the incoming side of a communication 1070 is terminated (e.g., by an exchange termination board for a broadband transport format) at the broadband portion of the hybrid switch 420. Switching of the communication 1070 may be performed entirely within the switching fabric of the broadband portion of the hybrid switch 420, and termination (e.g., by a circuit emulation board for a narrowband transport format) of the outgoing side of the communication 1070 may be accomplished by the broadband portion as well. In FIG. 10J, a communication 1080 is terminated at the incoming (e.g., ATM) side by the broadband portion of the hybrid switch 420 (e.g., using an exchange termination board). The switching of the communication 1080 may be performed by both the narrowband and the broadband portions after accommodation of the differing formats (e.g., by a circuit emulation board). The termination of the outgoing (e.g., TDM) side of the communication 1080 is effectuated at the narrowband portion of the hybrid switch 420.

In FIG. 10K, the hybrid switch may act as a "pure transit node" for ATM connections, such as the illustrated portion of the communication 1000, which is denoted as a communication 1090. Both of the incoming and the outgoing sides of the communication 1090 are terminated by the broadband portion of the hybrid switch 420 (e.g., by two exchange termination boards). Also, the communication 1090 may be switched entirely by the switching fabric (e.g., as realized by an ATM switch 630) of the broadband portion of the hybrid switch 420. As also described and alluded to with reference to, for example, FIG. 6 hereinabove, a hybrid switch 420 may establish various connection paths within to thereby enable a myriad of combinations of external ingress points and external egress points for different types of communications. The hybrid switch 420 may thus receive and forward communications 1000 in any combination of incoming and outgoing narrowband and broadband formats to accommodate, for example, the next node along the communication path, a node that is proximal to the final destination of the communication 1000, etc.

Figure 11:
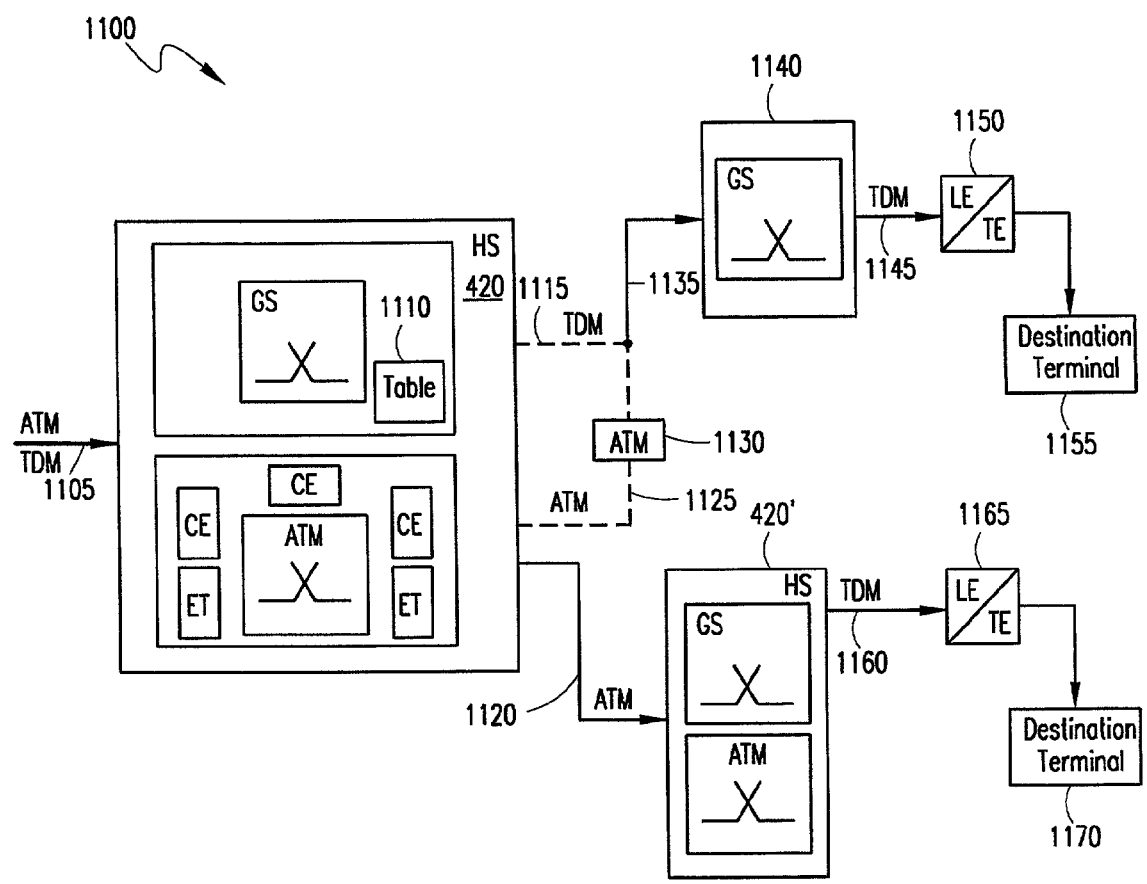
FIG. 11 illustrates an exemplary outgoing communication format selection for a hybrid switch in accordance with the present invention.

Referring now to FIG. 11, an exemplary outgoing communication format selection for a hybrid switch in accordance with the present invention is illustrated generally at 1100. An incoming communication 1105 is illustrated as being either broadband (e.g., ATM formatted) or narrowband (e.g., TDM formatted). The hybrid switch 420, as described hereinabove with reference to FIGS. 10A–10K, for example, may forward the communication 1105 as either an ATM communication or a TDM communication. (It should be understood that an outgoing TDM communication may be terminated by either the narrowband portion or the broadband portion of the hybrid switch 420. However, this detail is not directly addressed further in the context of FIG. 11.) The hybrid switch 420 may forward the communication on the outgoing side according to any of various algorithms. For example, the hybrid switch may forward all incoming communications 1105 as outgoing TDM communications 1115 (e.g., if the hybrid switch 420 is the first or one of the first hybrid switches to be installed in a traditionally narrowband network) or as outgoing ATM communications 1120 (e.g., if the hybrid switch 420 is the last or one of the last hybrid switches to be installed in a formally narrowband network). Refer also to the text hereinabove describing FIG. 3H.

Alternatively, the hybrid switch 420 may consult a table 1110 that provides an indication as to the viability and/or desirability of forwarding the communication 1105 in either a broadband or a narrowband format. For example, the table 1110 may indicate whether a node associated with the destination terminal 1155 or 1170 is capable of broadband transport. The table 1110 may also or in the alternative indicate whether any nodes between the hybrid switch 420 and the destination terminal 1155 and 1170 are capable of broadband transport. An exemplary embodiment for table 1110 is discussed hereinabove with reference to, for example, FIG. 3A, Events E8 and E9, and may involve the ascertainment of the bearer type (of either or both of the incoming side of the communication and the destination terminal). It should be noted that the table 1110 may be realized, instead of being part of the narrowband portion of the hybrid switch 420 but separate from the GS as illustrated, as part of the GS (e.g., the GS 615), as any part of the broadband portion (e.g., the ATM switch 630), as another part of the hybrid switch 420, or even at an external location (e.g., an IN node), etc.

Alternatively, instead of relying on information in a table 1110, the hybrid switch may query a node at or proximate to the destination node, may send a test signal/communication, etc. Regardless, if the hybrid switch 420 determines that there is a broadband node associated with the destination terminal, the hybrid switch 420 may elect to forward the incoming communication 1105 as a broadband (e.g., ATM) communication 1120. The hybrid switch 420' receives the incoming broadband communication 1120 and forwards an outgoing narrowband (e.g., TDM) communication 1160 to a local exchange node 1165 (e.g., which may correspond to, for example, an access node 322, etc. of FIG. 3 et seq.), which connects to the destination terminal 1170 (e.g., which may correspond to, for example, a terminal 324, etc. of FIGS. 3 et seq.).

If, on the other hand, the hybrid switch 420 determines that there is not a broadband node associated with the destination terminal, the hybrid switch 420 may elect to forward the incoming communication 1105 as a narrowband (e.g., TDM) communication 1115. However, the hybrid switch 420 may optionally include provisions for determining that one or more (e.g., a sufficiently high enough number of intervening nodes have broadband capability, a sufficiently shorter route may be defined across intervening broadband-enabled network nodes, etc.) intervening broadband nodes may be advantageously utilized along the overall communication path. If such a determination is made, the hybrid switch 420 may elect to forward the incoming communication 1105 as a broadband (e.g., ATM) communication 1125 through a broadband-enabled network portion 1130. Regardless, the communication is or ultimately becomes/is converted to a narrowband (e.g., TDM) communication and is submitted as narrowband communication 1135 to the narrowband node 1140. The narrowband node 1140 forwards the incoming narrowband communication 1135 as an outgoing narrowband (e.g., TDM) communication 1145 to a local exchange 1150 (e.g., which may correspond to, for example, an access node 322, etc. of FIG. 3 et seq.), which connects to the destination terminal 1155 (e.g., which may correspond to, for example, a terminal 324, etc. of FIG. 3 et seq.).

Figure 12:
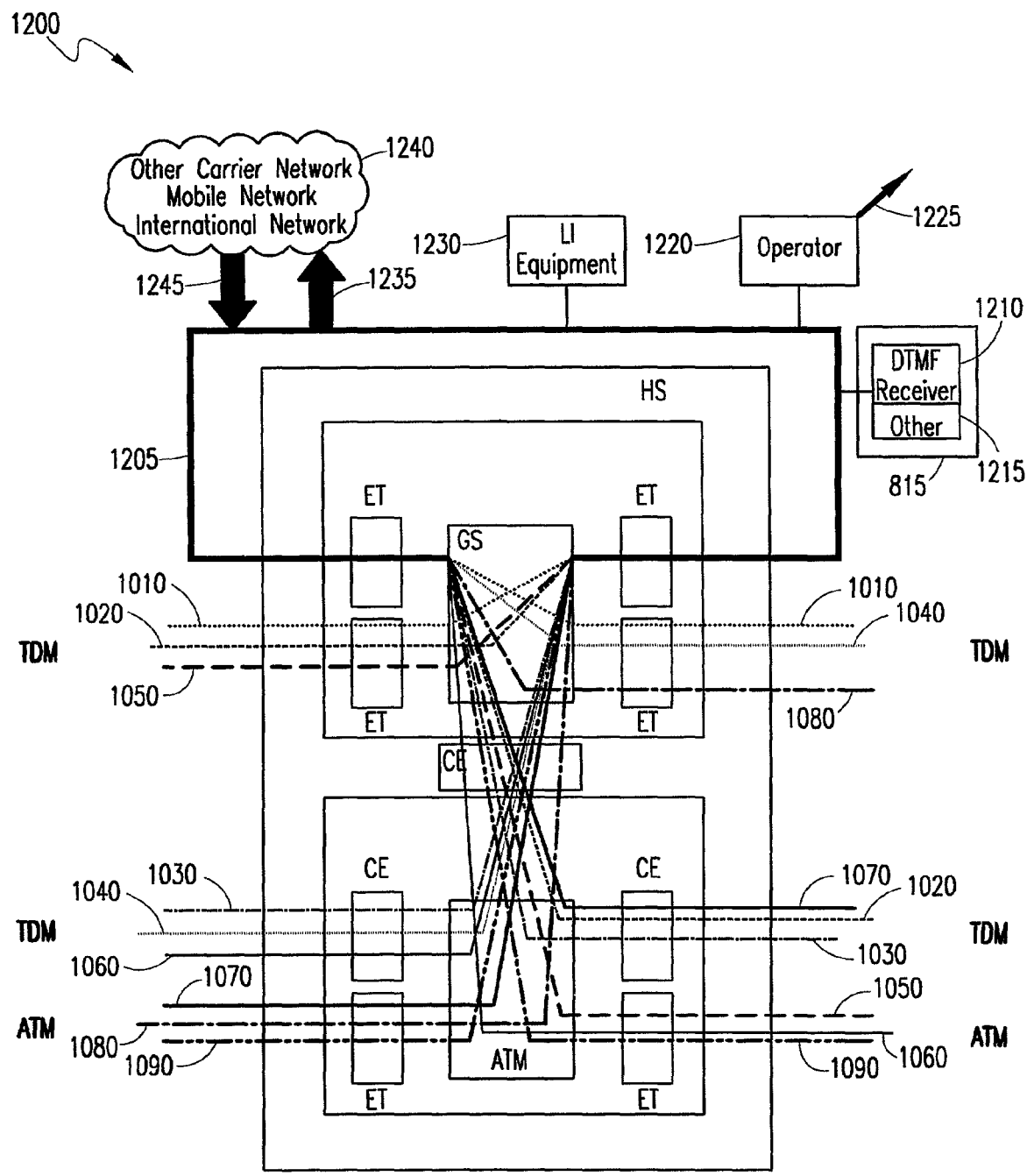
FIG. 12 illustrates exemplary interactions between a hybrid switch and other telecommunications technology in accordance with the present invention.

Referring now to FIG. 12, exemplary interactions between a hybrid switch and other telecommunications technology in accordance with the present invention are illustrated generally at 1200. The hybrid switch 420 of 1200 illustrates the traffic scenarios or communication portions

1010–1090 of communication 1000 (of FIGS. 10A–10K). Communication 1205 (illustrated generally as a line or loop) enables a communication 1010–1090 according to any of the various traffic scenarios to access telecommunications technology using TDM communication and a STM switch (e.g., a GS 615). For example, one or more IN nodes 815 of an IN (not explicitly shown in FIG. 12) may be accessed via the communication 1205. Many telecommunications services and features may be utilized by accessing the IN. A DTMF receiver 1210, for example, may be accessed for password and account number reception and for sending announcements from the IN. Generally, specialized resource function (SRF) and service control function (SCF) features are accessible via the IN node 815. These and other IN features are represented generally by the other block 1215. Access to the IN node 815 may be accomplished during the call establishment phase. Thereafter, routing of the communication 1000 may optionally be maintained through the narrowband portion of the hybrid switch 420. Regardless, the communication 1000 may be routed through the narrowband portion (e.g., the GS 615) during an active call phase in order to access IN features.

The communication 1205 may also enable access to the operator 1220 for the communication 1000 (of FIGS. 10A–10K). The operator 1220 may handle the telecommunications situation and thereafter route the connection further along communication 1205 to implement one of the illustrated traffic scenarios. Alternatively (e.g., depending on how the operator 1220 handles the telecommunications situation), the operator 1220 may independently forward the connection towards, e.g., another exchange as indicated by arrow 1225. The communication 1205 may also enable access to legal intercept (LI) equipment 1230. It should be noted that with respect to FIG. 12, as well as other FIGS. described herein, certain elements may be moved, changed in number, etc. without departing from the scope of the present invention. For example, with regard to the hybrid switch 420 of FIG. 12, only two ET equipments may be associated with the GS (instead of the four illustrated), and the CE equipment between the GS and the ATM switch may be more closely associated with the ATM switch than the GS (e.g., as illustrated in FIG. 11).

The hybrid nature of the hybrid switch 420, in addition to enabling a gradual migration from a narrowband-oriented network to a broadband-oriented network, also enables seamless integration with networks of other carriers, networks of mobile systems, and networks that are international (all of which are designated generally by the external networks 1240). The external networks 1240 currently operate in accordance with TDM principles (or at least they are designed to interface with other networks using TDM principles), and they may continue to do so for quite some time into the future. The hybrid switch 420, while providing the ability to transport communications on a broadband transport mechanism, also maintains the ability to utilize a narrowband transport mechanism and the ability to interface with external networks 1240 using traditional protocols. For example, communication 1205 enables outgoing connections (as represented by arrow 1235) and incoming connections (as represented by arrow 1245) between the hybrid switch 420 and the external networks 1240.

Figure 13:
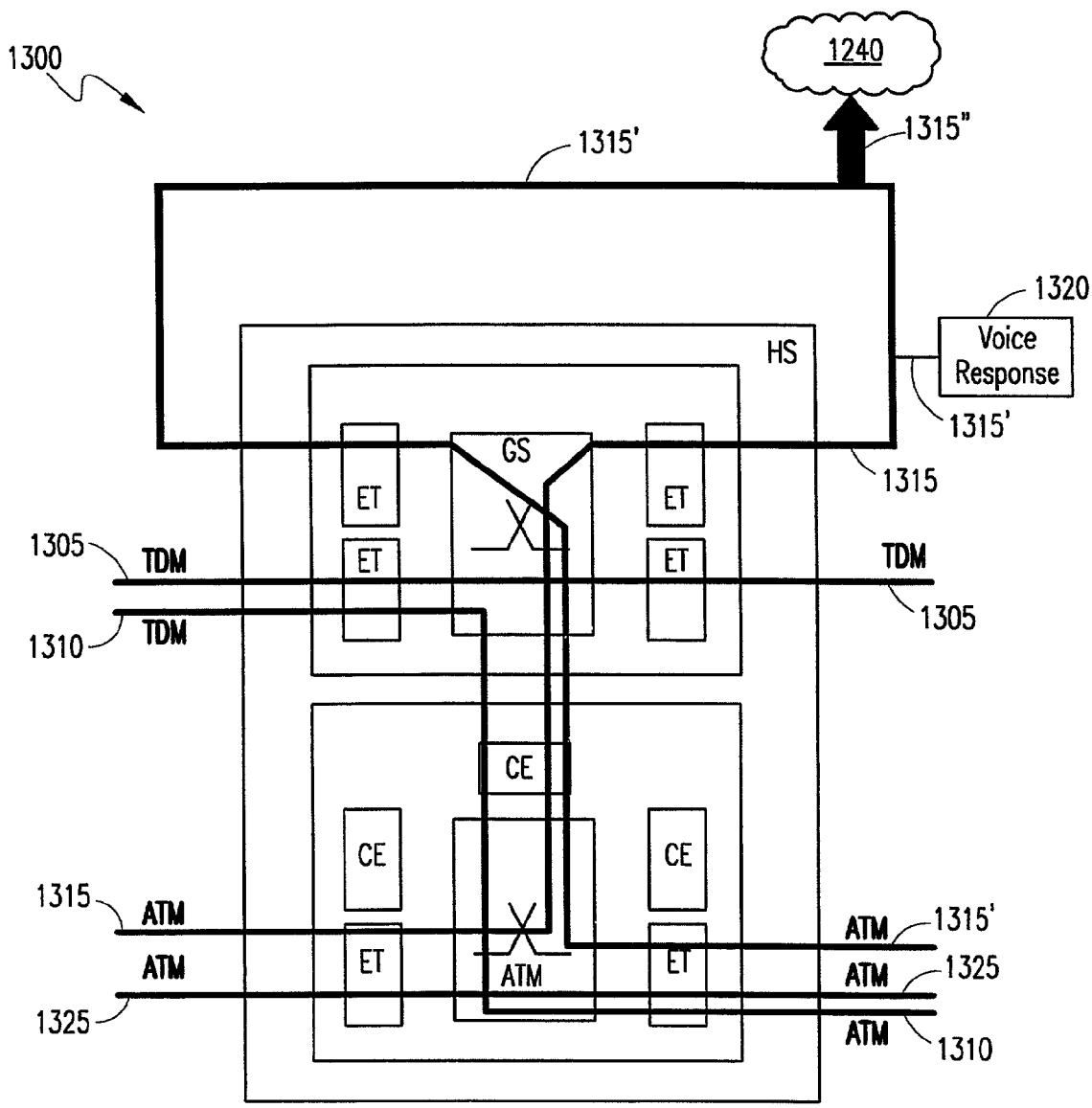
FIG. 13 illustrates an exemplary traffic scenario migration for a hybrid switch in accordance with the present invention.

Referring now to FIG. 13, an exemplary traffic scenario migration for a hybrid switch in accordance with the present invention is illustrated generally at 1300. The hybrid switch 420 may be "installed" in an existing network that utilizes, at least primarily, a narrowband transport mechanism. The hybrid switch 420 may be "installed", for example, by augmenting an existing TDM switch with ATM switching fabric. When the hybrid switch 420 is initially installed, especially if it is one of the first such switches installed, the hybrid switch may be activated or set up to operate entirely or predominantly within a first exemplary mode. Such a first exemplary mode may entail receiving a communication 1305 (e.g., as incoming TDM) and forwarding the communication 1305 (e.g., as outgoing TDM) using the switching fabric (e.g., a GS 615) of the existing narrowband switch. Gradually, as additional broadband-enabled nodes are "brought on-line", the hybrid switch 420 may enter a second exemplary mode. Such a second exemplary mode may entail receiving a communication 1310 (e.g., as incoming TDM) and forwarding the communication 1310 (e.g., as outgoing ATM) using the switching fabric of the existing narrowband switch as well as the switching fabric (e.g., an ATM switch 630) of the broadband switch.

As the hybrid switch 420 of 1300 begins to receive incoming communications that use a broadband transport mechanism such as ATM, the hybrid switch 420 may enter a third exemplary mode. Such a third exemplary mode may entail receiving a communication 1315 (e.g., as incoming ATM) and forwarding the communication 1315 through the switching fabric of the broadband switch and the switching fabric of the narrowband switch to be handled by narrowband telecommunications technology and/or telecommunications technology with narrowband interface(s). For example, the communication 1315 may be forwarded from the narrowband switch as communication 1315' to a voice response unit 1320 to provide voice response service to the communication 1315 that originally arrived at the hybrid switch 420 using a broadband transport mechanism. Alternatively, the communication 1315 may be forwarded from the narrowband switch as communication 1315" (as indicated by the arrow so labeled) to external network(s) 1240. If the communication 1315 is to continue within the network of the hybrid switch 420 (or otherwise forwarded as a broadband connection therefrom), the communication 1315' is returned to the narrowband switching fabric (e.g., after being serviced by the voice response unit 1320 or other such existing narrowband features) and forwarded to and through the broadband switching fabric as the communication 1315' (e.g., as outgoing ATM).

Eventually, as the network becomes wholly or primarily a broadband transport mechanism network (optionally including broadband provision of IN-type services, etc.), the hybrid switch 420 of 1300 may enter a fourth exemplary mode. Such a fourth exemplary mode may entail receiving a communication 1325 (e.g., as incoming ATM) and forwarding the communication 1325 (e.g., as outgoing ATM) using the switching fabric of the broadband portion of the hybrid switch 420. It should be understood that the four modes illustrated and described herein with reference to FIG. 13 are exemplary only. Modes may be added, subtracted, or substituted for the four exemplary modes depending, for example, on the percentage of the network that has been upgraded to broadband. Furthermore, the modes may be activated in a different order depending, for example, on whether or not the hybrid switch in question is a "transit-type" node.

Figure 14:
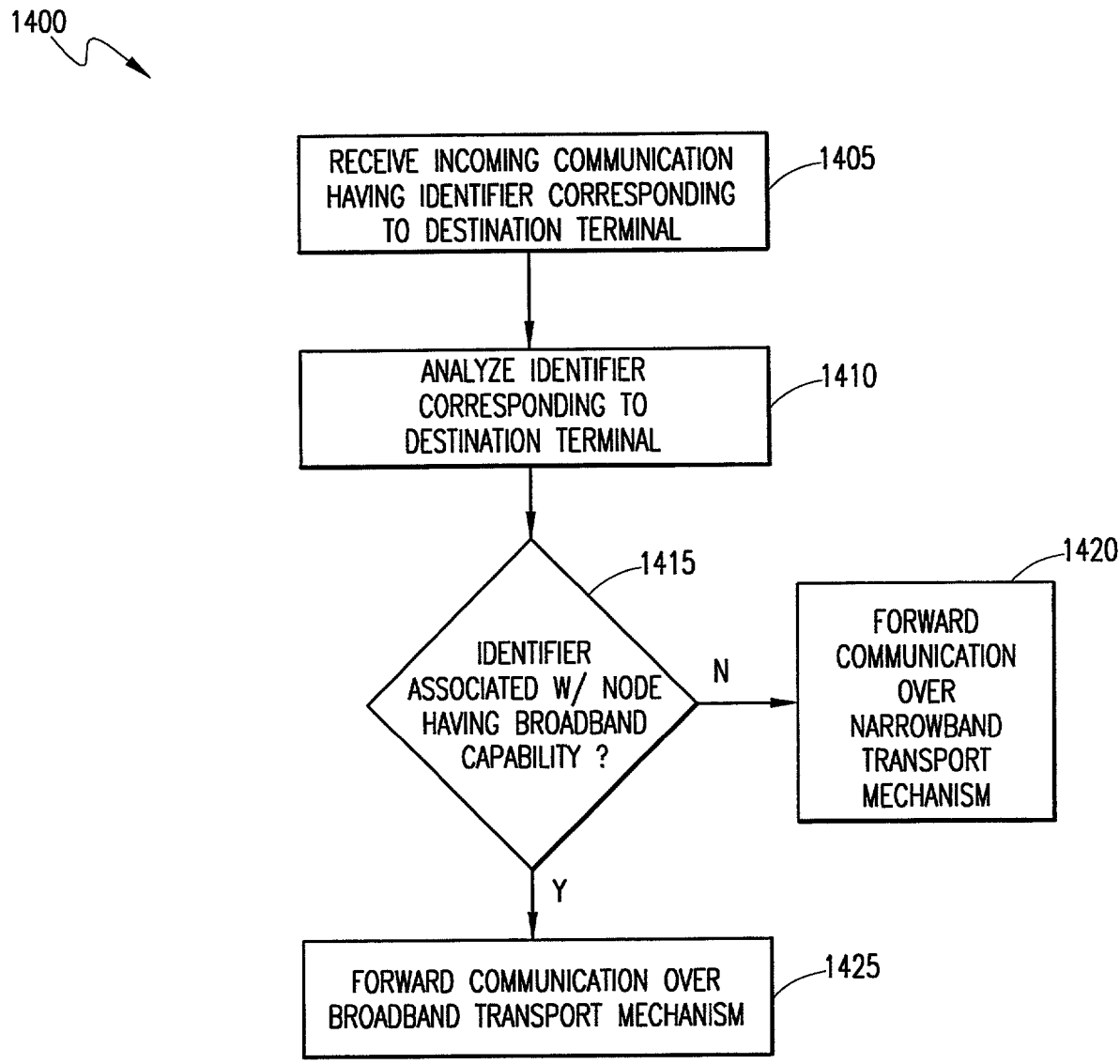
FIG. 14 illustrates an exemplary method in flowchart form for enabling a gradual migration from a primarily narrowband network to a primarily broadband network in accordance with the present invention.

Referring now to FIG. 14, an exemplary method in flowchart form for enabling a gradual migration from a primarily narrowband network to a primarily broadband network in accordance with the present invention is illustrated generally at 1400. Initially, a network node (e.g., a hybrid switch 420) receives an incoming communication that includes an identifier corresponding to a destination terminal (e.g., a destination terminal 1155 and 1170 (of FIG. 11)) (step 1405). The incoming communication may be transported, for example, on a broadband or narrowband mechanism. The identifier that corresponds to the destination terminal is analyzed (step 1410). The identifier may correspond to, for example, a B-number, and the identifier may be analyzed, for example, in a narrowband portion of the network node. The analysis may include a determination as to whether or not the identifier is associated with a node having broadband capability (step 1415). If not, then the communication may be forwarded over a narrowband transport mechanism (step 1420) and ultimately to the destination terminal.

If, on the other hand, it is determined that the identifier is associated with a node having broadband capability (at step 1415), then the communication may be forwarded over a broadband transport mechanism (step 1425) and ultimately to the destination terminal. The identifier may be associated with a node when, for example, the node is the most proximate node (or the most proximate non-local exchange and/or non-end office node) to the destination terminal. The identifier, in addition to or in the alternative, may be associated with a node when the node is somewhere between the analyzing node and the destination terminal, but the node is sufficiently far from the analyzing node and sufficiently close to the destination terminal so as to warrant diverting (if necessary) the communication onto a broadband transport mechanism. The analysis may involve accessing a table (or other data structure) (e.g., a table 1110), which may be gradually updated as nodes in the network are upgraded to provide broadband transport. In an alternative embodiment, a communication may only be forwarded using a broadband transport mechanism (e.g., in step 1425) if a node having broadband capability is also associated with an identifier that corresponds to an originating terminal and/or if the incoming communication "arrives" over a broadband transport mechanism. In yet another alternative, the broadband capability of a node associated with the identifier that corresponds to the originating terminal may be another factor to account for when analyzing the proximity of the node associated with the identifier of the destination terminal. A hybrid switch operated in accordance with certain principles of the present invention therefore enables a gradual migration from a narrowband-oriented network to a broadband transport mechanism-oriented network.

Figure 15:
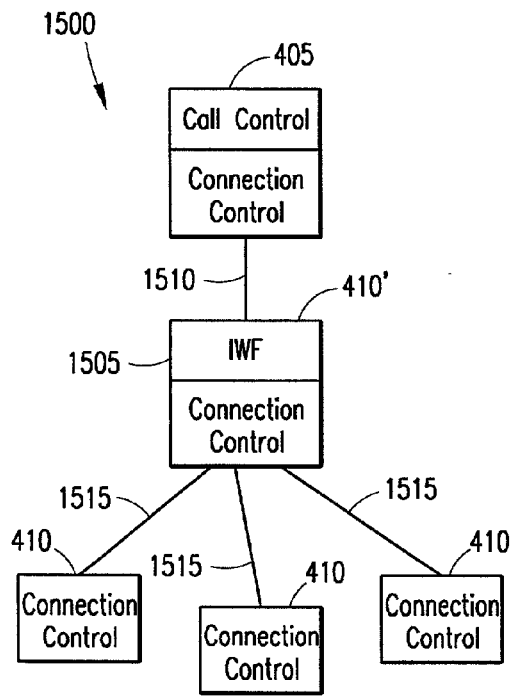
FIG. 15 illustrates an exemplary tri-level nodal environment in accordance with the present invention.

Referring now to FIG. 15, an exemplary tri-level nodal environment in accordance with the present invention is illustrated generally at 1500. A call/connection control node 405 (e.g., which may correspond to, for example, PSTN/ISDN nodes 330 of the embodiment(s) of FIGS. 3 et seq.) is illustrated connected to a modified connection control node 410' (e.g., which may correspond to, for example, ATM node 340$_{7-1}$ of the embodiment(s) of FIG. 3 et seq.) via line 1510 (e.g., which may correspond to, for example, interface 300*a* and/or interface 300*d* of the embodiment(s) of FIG. 3 et seq.). The modified connection control node 410', in the exemplary tri-level nodal environment 1500, includes an interworking function (IWF) 1505 (e.g., which may correspond to, for example, an IWF 344$_{7-1}$ of the embodiment(s) of FIG. 3 et seq.). The IWF 1505 may be composed of, for example, hardware, software, firmware, some combination thereof, etc.

The IWF 1505 may include emulation and mapping capabilities. For example, the IWF 1505 may include the ability to emulate a switch interface for the call/connection control node 405. Advantageously, this eliminates any absolute requirement to modify the call/connection control node 405 because the call/connection control node 405 is able to act and interact as if it is functioning within a traditional telecommunications network. The IWF 1505 may also include the ability to map/translate one network address into or to another network address. The modified connection control node 410' is illustrated connected to multiple connection control nodes 410 (e.g., which may correspond to, for example, ATM node 340$_{7-2}$, ATM node 340$_{7-3}$, etc. of the embodiment(s) of FIG. 3 et seq.) via lines 1515 (e.g., which may correspond to, for example, interfaces 300*a* and/or interfaces 398 of the embodiment(s) of FIGS. 3 et seq.). In the exemplary tri-level nodal environment 1500, the call/connection control node 405 may advantageously provide/share its switching intelligence with more than one connection control node 410. It should be understood that the various nodes may be physically co-located, physically separated, etc.

Figure 15A:
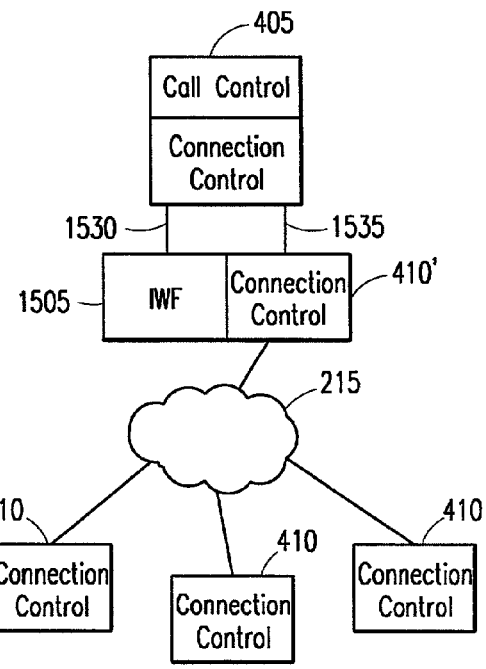
FIG. 15A illustrates a first exemplary tri-level nodal environment alternative in accordance with the present invention.

Referring now to FIG. 15A, a first exemplary tri-level nodal environment alternative in accordance with the present invention is illustrated generally at 1525. In the first exemplary tri-level nodal environment alternative 1525, the call/connection control node 405 is in communication with the modified connection control node 410' via a first line 1530 and a second line 1535. The first line 1530 and the second line 1535 may be used for communicating signaling information and data information, respectively, between the call/connection control node 405 and the modified connection control node 410', which has the IWF 1505. Also illustrated in the first exemplary tri-level nodal environment alternative 1525 is an ATM network 215 cloud interconnecting the modified connection control node 410' and the connection control nodes 410. In other words, the modified connection control node 410' need not employ direct and dedicated links to the individual connection control nodes 410. It should be understood that the ATM network 215 may alternatively be realized as any circuit-switched network.

Figure 15B:
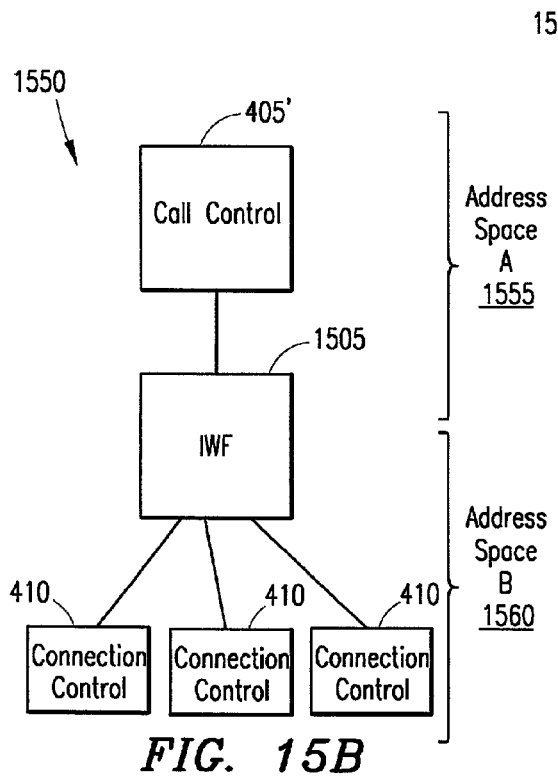
FIG. 15B illustrates a second exemplary tri-level nodal environment alternative in accordance with the present invention.

Referring now to FIG. 15B, a second exemplary tri-level nodal environment alternative in accordance with the present invention is illustrated generally at 1550. In the second exemplary tri-level nodal environment alternative 1550, a "combined" tri-level nodal environment is illustrated. The modified call control node 405' does not include connection control (e.g., it was designed and built without such connection control, it had its connection control removed or rendered inoperable, etc.), and no single connection control is directly associated with (or co-located with) the IWF (node) 1505. The switching intelligence of the modified call control node 405' operates in a first address space, which is designated address space A 1555. The switching fabric of the multiple connection control nodes 410, on the other hand, operate in a second address space, which is designated address space B 1560. The IWF 1505 maps/translates the addresses of the address space A 1555 to the addresses of the address space B 1560 so as to enable the switching intelligence of the modified call control node 405' to provide call control to the switching fabric of the multiple connection control nodes 410.

It should be understood that while the address spaces A 1555 and B 1560 are illustrated only in the second exemplary tri-level nodal environment alternative 1550, they are also applicable to the exemplary tri-level nodal environment 1500 as well as the first exemplary tri-level nodal environment alternative 1525. It should also be understood that the different aspects illustrated in the various embodiments of FIGS. 15, 15A, and 15B may be interchanged without departing from the present invention. For example, a circuit-switched network cloud (e.g., the ATM network 215) may interconnect the multiple connection control nodes 410 in any or all embodiments embraced by the present invention.

Figure 15C:
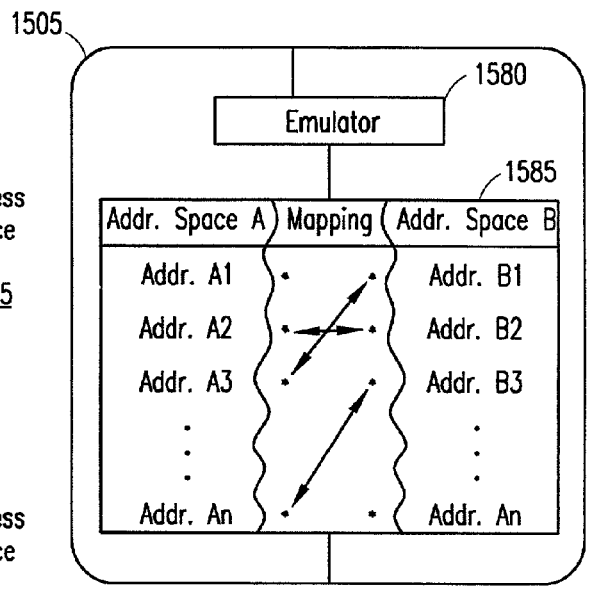
FIG. 15C illustrates an exemplary interworking function in accordance with the present invention.

Referring now to FIG. 15C, an exemplary interworking function in accordance with the present invention is illustrated at 1505. The IWF 1505 includes an emulator 1580 and a mapper (or translator) 1585. The emulator 1580 emulates an interface to which the call/connection control node 405 "expects" to be connected. In other words, the emulator 1580 may provide an interface that the call/connection control node 405 is already designed to utilize and/or interact with. Advantageously, this eliminates or minimizes or at least reduces the need to modify the call/connection control node 405. It should be noted that the interface may be equivalent to a GS input/output (I/O), E1/T1 trunk lines, etc. The mapper 1585 provides a mapping (or more generally a correspondence) between addresses of a first address space and addresses of a second address space.

The mapper may map (or more generally a correspondence may be established between) address space A 1555 (of FIG. 15B) to the address space B 1560. For example, one or more of the addresses A1 . . . An of the address space A 1555 may be mapped to one or more of the addresses B1 . . . Bn of the address space B 1560. As a specific instance, the address A3 may be mapped to the address B1. In exemplary embodiment(s), the address space A 1555 may include 10-digit B-numbers, and the address space B 1560 may include ATM identifiers such as VPIs and VCIs. Other exemplary address space realizations are also embraced by the present invention.

Figure 16:
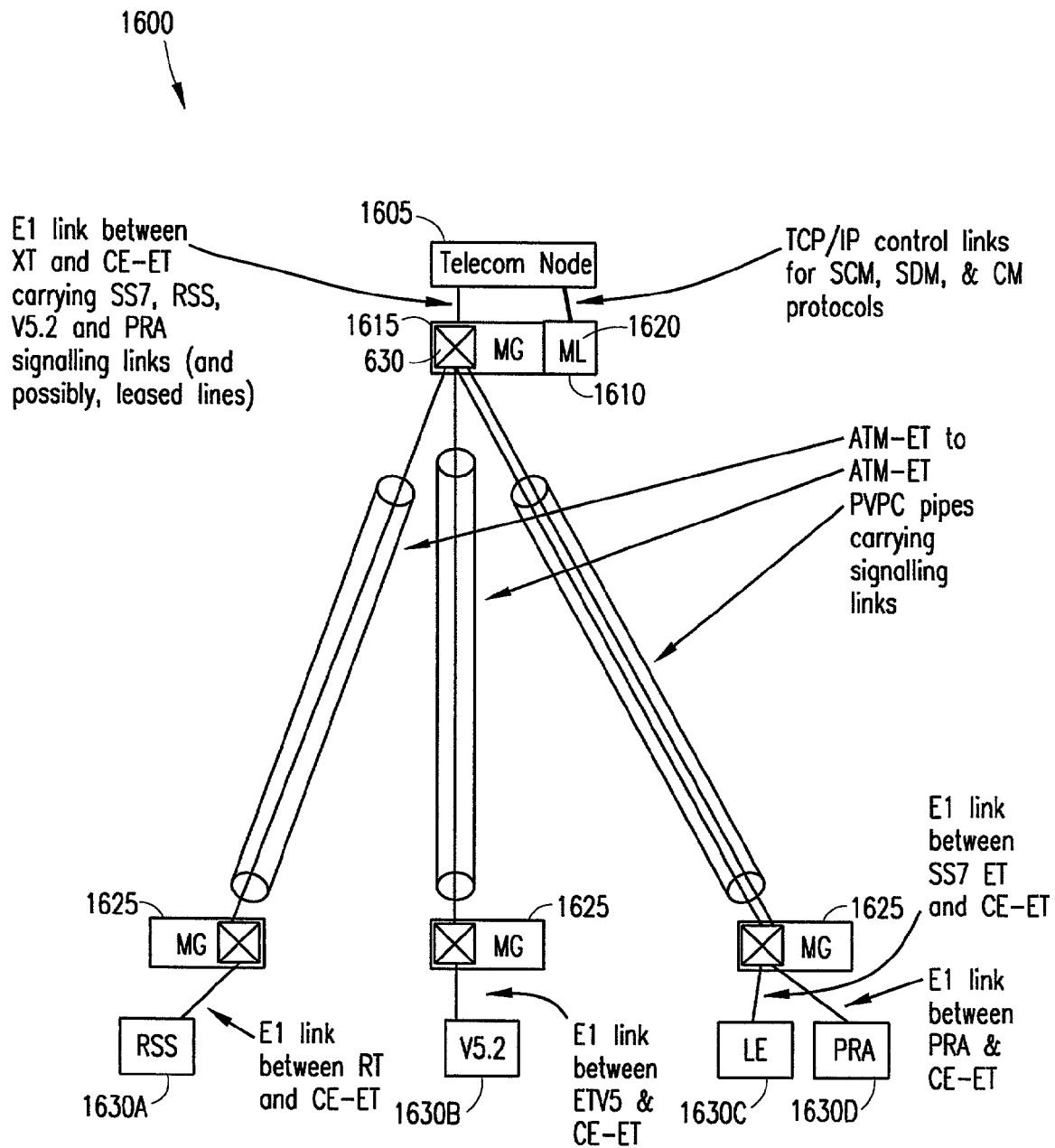
FIG. 16 illustrates an exemplary tri-level nodal environment implementation in accordance with the present invention.

Referring now to FIG. 16, an exemplary tri-level nodal environment implementation in accordance with the present invention is illustrated generally at 1600. A telecommunications node (TN) 1605 (e.g., which may correspond to, for example, a call/connection control node 405 of the embodiment(s) of FIGS. 15 et seq.) is shown connected to media gateway functionality 1615 (e.g., which may correspond to, for example, a modified connection control node 410' of the embodiment(s) of FIGS. 15 et seq.). The TN (a.k.a. legacy switch (LS)) 1605 may have a circuit switch such as a GS 615 (not explicitly shown in FIG. 16). The media gateway functionality 1610 may include a media gateway (MG) 1615, which may have a packet switch such as an ATM switch 630, and mediation logic (ML) 1620 (e.g., which may correspond to, for example, an IWF 1505 of the embodiment(s) of FIGS. 15 et seq.).

The media gateway functionality 1610 is illustrated as being connected to multiple MGs 1625 (e.g., which may correspond to, for example, the multiple connection control nodes 410 of the embodiment(s) of FIGS. 15 et seq.). Each of the MGs 1625 may be responsible for handling one or more different types of media. The media, and nodes corresponding thereto, may include, for example, a remote subscriber switch (RSS) node 1630A, a V5.2 interface access network (V5.2) node 1630B, a local exchange (LE) node 1630C, a primary rate access (PRA) node 1630D, etc. An MG 1625 (or an MG 1615) may convert media provided in one type of network to the format requirements of another type of network.

Exemplary and/or appropriate protocols for the links between the various illustrated nodes (including the gateways) are illustrated at the exemplary tri-level nodal environment implementation 1600. As an explanatory example, the connections between the media gateway functionality 1610 and the multiple MGs 1625 may be ATM-ET to ATM-ET PVPC pipes defined through an ATM network to carry signaling information. A PVPC is an ATM connection in which the switching is performed only on the VPI field of each cell. A PVPC is termed "permanent" because it is provisioned through a network management function and maintained (or left up) indefinitely. The signaling information between the media gateway functionality 1610 and any one or more of the MGs 1625 may be effectuated transparently over a PVPC pipe. Such a PVPC pipe is at least similar to one establishable through the switching fabric of a connection control node 410 for transparently piping signaling information to the switching intelligence of a call/connection control node 405 (as alluded to hereinabove with reference to FIG. 3 et seq.).

Figure 17A:
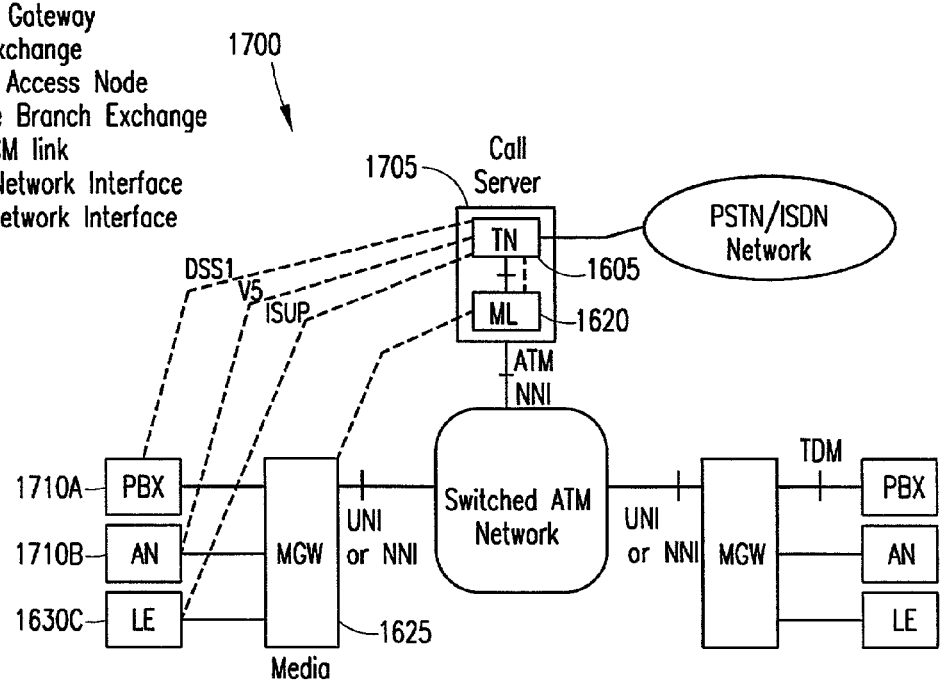
FIGS. 17A and 17B illustrate two other exemplary tri-level nodal environment implementations in accordance with the present invention.
Figure 17B:
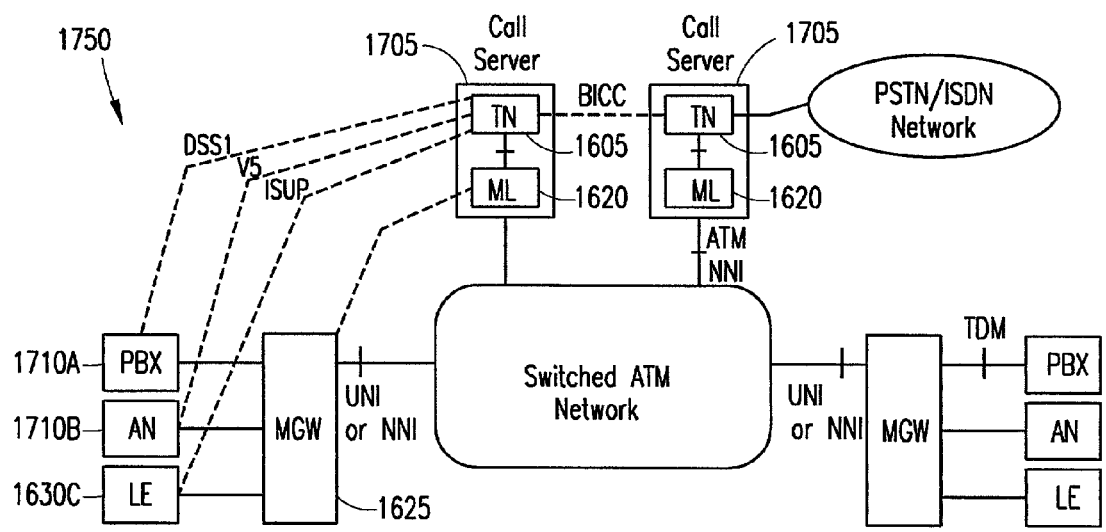

Referring now to FIGS. 17A and 17B, two other exemplary tri-level nodal environment implementations in accordance with the present invention are illustrated generally at 1700 and 1750, respectively. The exemplary tri-level nodal environment implementations 1700 and 1750 include call servers 1705. The call servers 1705 each include a TN 1605 and ML 1620. Each call server 1705 may control one or more MGs 1625 (denoted as "MGW" in FIGS. 17A and 17B) via the packet-switched network cloud, such as an ATM network 215. Each call server 1705, being based on pre-existing TNs 1605 in certain exemplary embodiment(s), may only handle a finite number of MGs 1625. Accordingly, a given tri-level nodal environment may need more than one call server 1705, as indicated by the two call servers 1705 illustrated in the exemplary tri-level nodal environment implementation 1750.

The bearer services for call data information are provided by the packet-switched broadband network (e.g., via encapsulation), and the telecommunications services/call control may be transported over this packet-switched (broadband) network in an un-modified format (e.g., transparently in pipes), as indicated by the dashed lines. For example, control communications to the private branch exchange (PBX) nodes 1710A are effectuated using DSS1, control communications to the generic access nodes (AN) 1710B are effectuated using V.5, and control communications to the LE nodes 1630C are effectuated using ISUP. Likewise or similarly, the two call servers 1705 may communicate therebetween using a bearer independent call control (BICC) protocol that may be transported over the packet-switched network. It should be emphasized that TDM as used herein, including the claims, encompasses and embraces time-division multiplexed protocols in general, and it is not limited to any particular TDM protocol, including the exemplary 2M PCM link definition of FIGS. 17A and 17B.

Figure 18A:
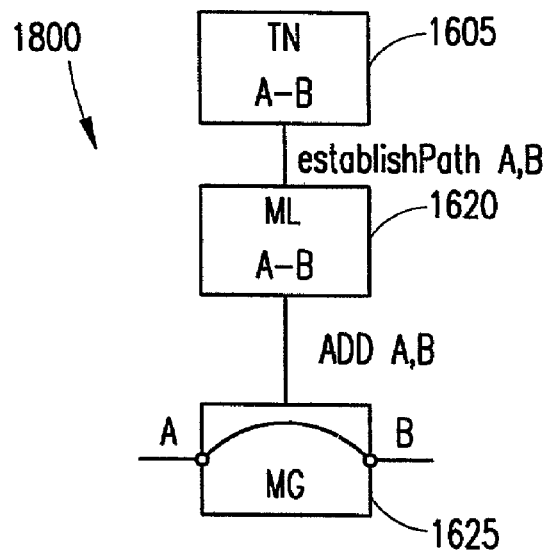
FIGS. 18A and 18B illustrate two exemplary call setups in an exemplary tri-level nodal environment implementation in accordance with the present invention.
Figure 18B:
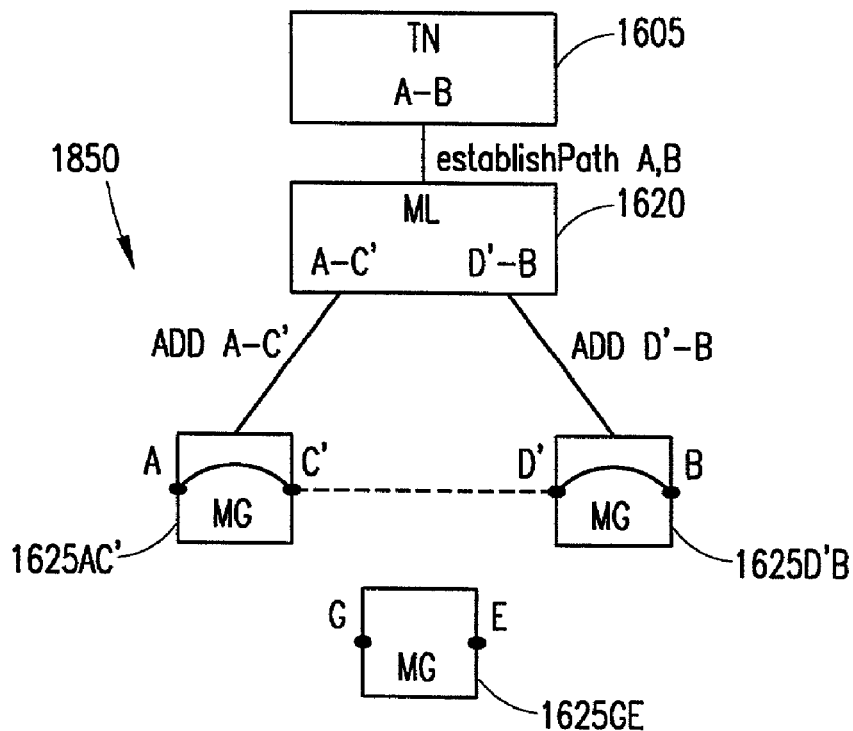

With reference now to FIGS. 18A and 18B, two exemplary call setups in an exemplary tri-level nodal environment implementation in accordance with the present invention are illustrated generally at 1800 and 1850, respectively. In the exemplary call setup 1800, a TN 1605 determines that a communication path between points A and B are needed for a call. The TN 1605 therefore instructs the ML 1620 to establish a path between the points A and B. The instruction may include direction(s) for establishing such a path in a TDM network. The ML 1620, applying the points A and B and/or the direction(s) to a mapping data structure for example, determines how to establish a communication path between points A and B. The ML 1620 then instructs/requires that such a communication path be established (e.g., added) in the broadband network of which the MG 1625 is a part. In the exemplary call setup 1800, an intra MG call setup case is illustrated, so the single MG 1625 that is illustrated is capable of establishing the communication path.

In the exemplary call setup 1850, on the other hand, a multi-MG (but intra domain) call setup case is illustrated, so more than a single MG 1625 is required to establish the communication path. Specifically, after the ML 1620 receives the instruction (and possibly the direction(s)) from the TN 1605, the ML 1620 determines that the communication path needs to extend between at least two MGs 1625. Namely, the MGs 1625 that include the points A and B need to be interconnected, optionally with no intervening MG(s) 1625. In the exemplary call setup 1850, the ML 1620 then instructs/requires that such an interconnection for the communication path be established (e.g., added) in the broadband network between the MG 1625AC' and the MG 1625D'B, as indicated by the dashed line. The MGs 1625AC' and 1625D'B also complete the communication path between point A and point B by establishing interconnections between points A and C' and points D' and B, respectively. By determining a communication path and/or instituting a routing of a communication path between point A and point B through a packet-switched (broadband) network, the ML 1620 effectively maps from one address space to another address space.

Figure 19:
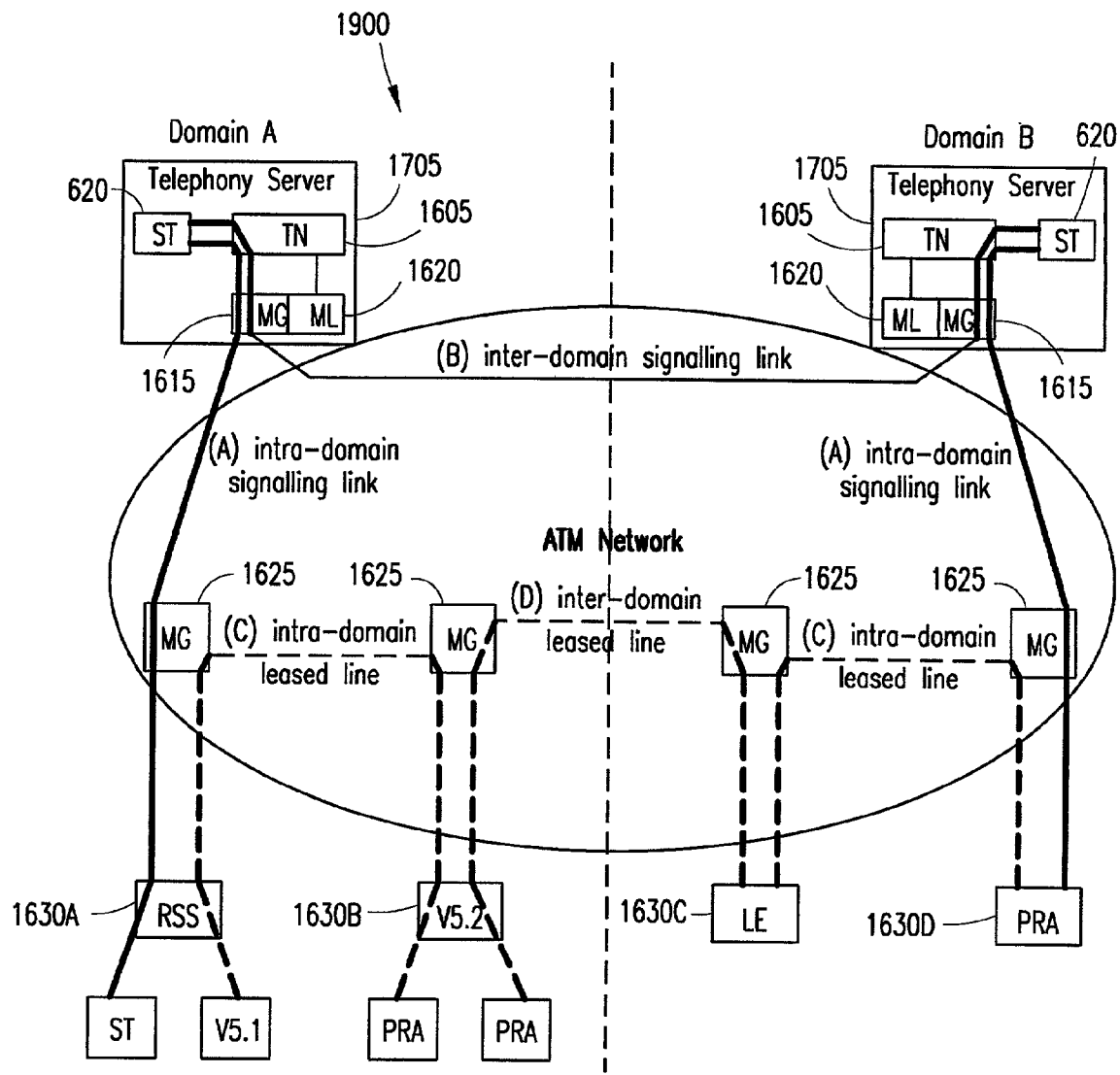
FIG. 19 illustrates exemplary communication path configuring in an exemplary tri-level nodal network in accordance with the present invention.

Referring now to FIG. 19, exemplary communication path configuring in an exemplary tri-level nodal network in accordance with the present invention is illustrated generally at 1900. The entities responsible for configuring various communication paths in the exemplary tri-level nodal network 1900 are indicated by the type of line (e.g., solid, dashed, thick, thin, etc.) illustrating/representing the particular communication path. The signaling link parts represented by the solid thick lines (also labeled "(A)") are configured by TN 1605 commands. The signaling link parts represented by the solid thin lines (also labeled "(B)") are configured by ATM management system commands. The leased line parts represented by the dashed thick lines are configured by TN 1605 commands. The leased line parts represented by the dashed thin lines (also labeled "(C)" and "(D)") are configured by ATM management system commands. The parts labeled "(A)" and "(C)" pertain to intra-domain segments while the parts labeled "(B)" and "(D)" pertain to inter-domain segments. It should be noted that segments within the ATM network are configured by the ATM management system commands while segments extending beyond the ATM network are configured by TN 1605 commands in the exemplary communication path configuring of the exemplary tri-level nodal network 1900.

Figure 20A:
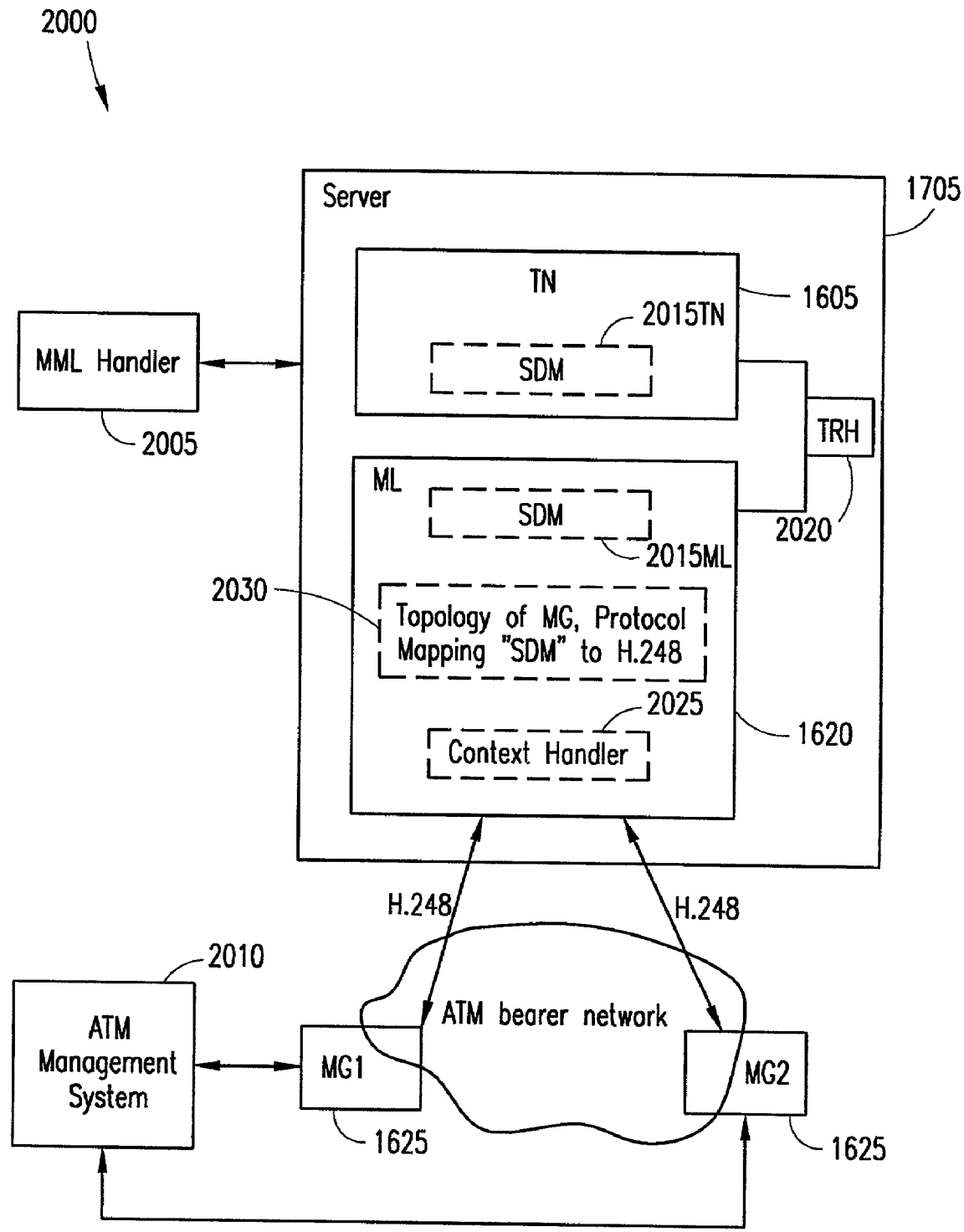
FIGS. 20A and 20B illustrate exemplary mapping embodiments in an exemplary tri-level nodal environment implementation in accordance with the present invention.
Figure 20B:
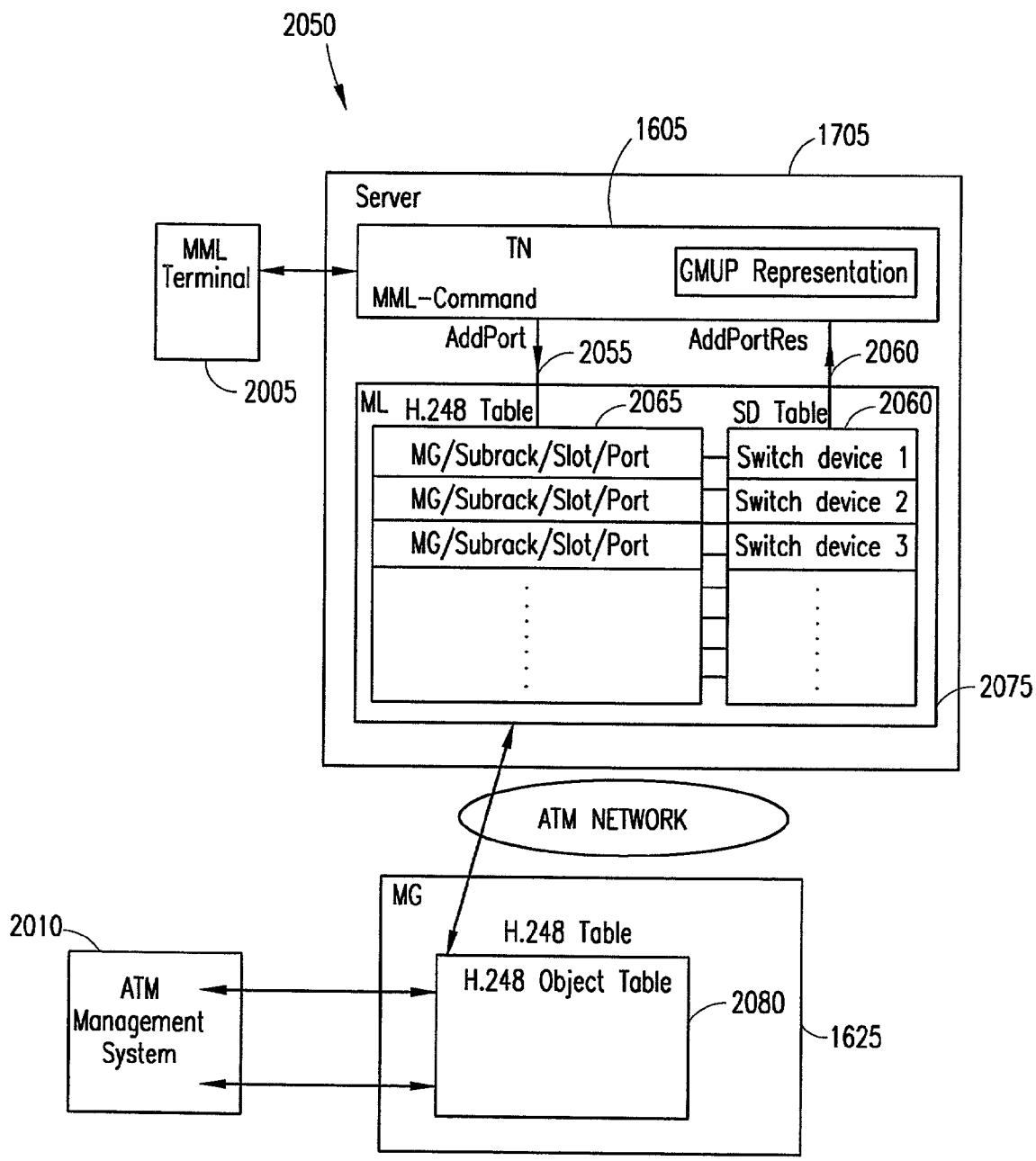

Referring now to FIGS. 20A and 20B, exemplary mapping embodiments in an exemplary tri-level nodal environment implementation in accordance with the present invention are illustrated generally at 2000 and 2050, respectively. The exemplary mapping as illustrated at 2000 includes a man machine line (MML) handler 2005 and an ATM management system 2010 that enable the general management of the illustrated tri-level nodal environment implementation. Specifically, the MML handler 2005 enables the configuring of the TN 1605 portion, and the ATM management system 2010 enables the configuring of the ML 1620 and MG 1625 portions. Switch device management (SDM) parts 2015TN and 2015ML enable communication between the TN 1605 and the ML 1620, along with the transport handler (TRH) 2020. In exemplary embodiment(s), a switch device (SD) may correspond to a logical device that terminates a 31 channel logical E1 line. A context handler 2025 controls the connections and connection topology of the domain.

In exemplary embodiment(s), an H.248 protocol may be employed for communication over the ATM network. A mapping part portion 2030 stores the topology of one or more MGs 1625 as well as a protocol mapping of the SDM part(s) (e.g., of the circuit-switched address space) to the H.248 (e.g., of the packet-switched address space). The exemplary mapping as illustrated at 2050 includes indications of an add port instruction 2055 and an add port response instruction 2060 exchanged between the TN 1605 and the ML 1620. These instructions, which may originate at the MML terminal 2005, configure the mapping providing by the H.248 table 2065 and the SD table 2075. The H.248 table 2065 and the SD table 2075 together provide a mapping between H.248 addresses (e.g., termination addresses: "MG/Subrack/Slot/Port" (H.248 addresses)) and SD addresses (e.g., and "SD1" address).

It should be noted that the H.248 addresses may have an unrestricted and/or unstructured format that differs from and may be more flexible than the "MG/Subrack/Slot/Port" as illustrated in FIG. 20B. In fact, an operator may be empowered to select such names. The MG 1625 includes an H.248 object table 2080, which may be configured at least in part by the ATM management system 2010, for establishing communication paths through the MG 1625. The tri-level approach described hereinabove in various embodiments enables pre-existing narrowband technology to be used with broadband technology. Moreover, the tri-level approach multiplies the ability to reuse a pre-existing narrowband switch by enabling a single narrowband switch to provide switching intelligence to multiple broadband switches.

Figure 21:
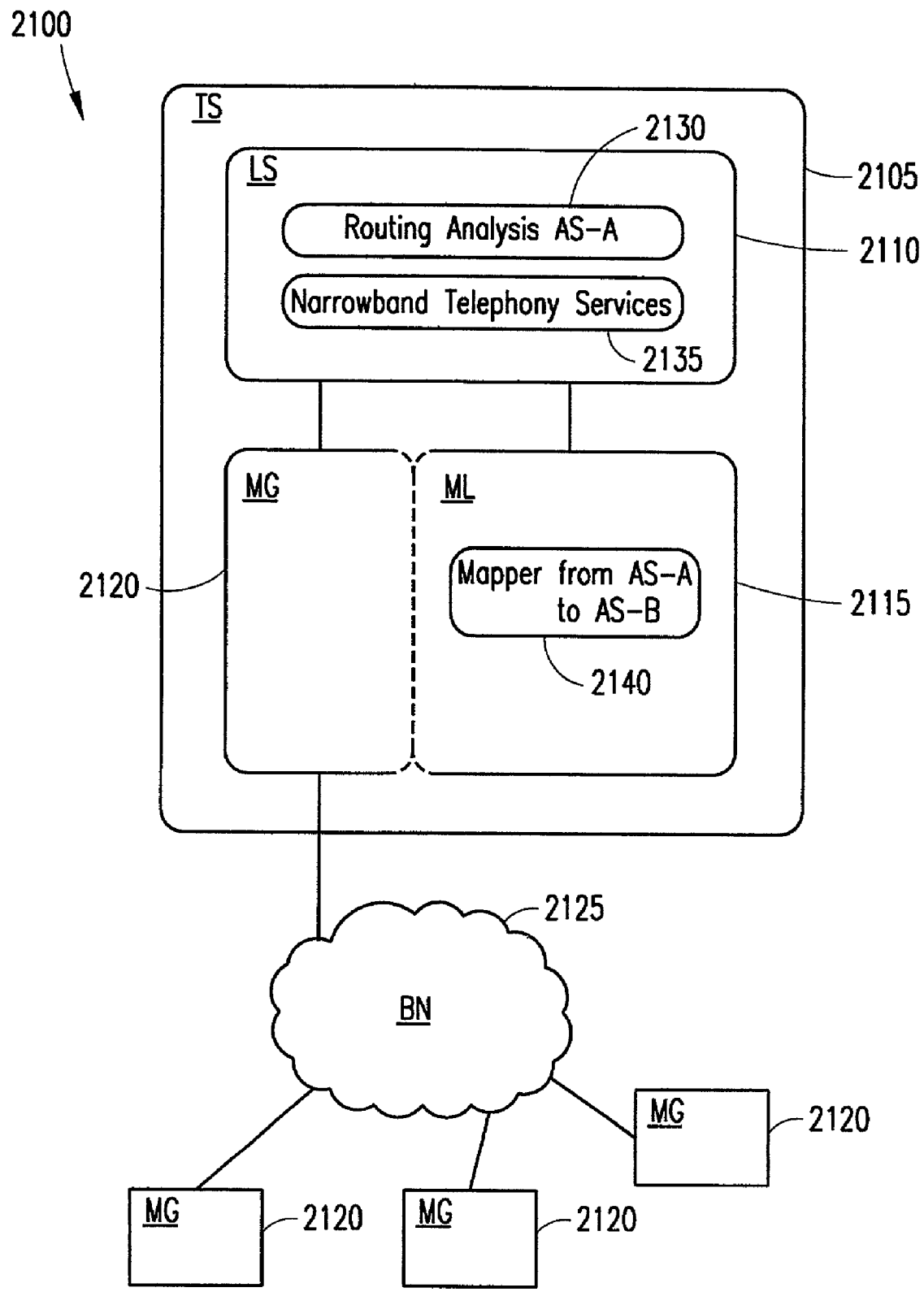
FIG. 21 illustrates an exemplary tri-level nodal environment with exemplary functionality in accordance with the present invention.

Referring now to FIG. 21, an exemplary tri-level nodal environment with exemplary functionality in accordance with the present invention is illustrated generally at 2100. The exemplary tri-level nodal environment 2100 may include a telephony server (TS) 2105 (e.g., which may correspond to, for example, the call server/telephony server 1705 of the embodiment(s) of FIGS. 17A and 17B et seq.). The TS 2105 may include a legacy switch (LS) 2110 (e.g., which may correspond to, for example, the TN 1605 of the embodiment(s) of FIG. 16 et seq.) and mediation logic (ML) 2115 (e.g., which may correspond to, for example, the ML 1620 of the embodiment(s) of FIG. 16 et seq.). The TS 2105 may also include a media gateway (MG) 2120 (e.g., which may correspond to, for example, the MG 1615 of the embodiment(s) of FIG. 16 et seq.). It should be noted that the ML 2115 and the LS 2110 may be jointly referred to as a media gateway controller (MGC).

The MG 2120 of the TS 2105 may be connected to a broadband network (BN) 2125 (e.g., which may correspond to, for example, the ATM network 215 of the embodiment(s) of FIG. 4 et seq.). The BN 2125 provides a medium for the MG 2120 of the TS 2105 to be in communication with the other illustrated MGs 2120 (e.g., which may correspond to, for example, the MGs 1625 of the embodiment(s) of FIG. 16 et seq.). It should be understood that the architecture illustrated in the exemplary tri-level nodal environment 2100 may be modified, rearranged, etc., especially in accordance with the other illustrated and described embodiments and teachings from FIGS. 15–15C, as well as those of FIGS. 16–20B. For example, a TS 2105 may omit a co-located MG 2120 without departing from the spirit and scope of the present invention.

Exemplary functionality is also illustrated in the exemplary tri-level nodal environment 2100. For example, the LS 2110 may include routing analysis in address space-A functionality 2130 (e.g., which may correspond to, for example, B-number analysis, etc. as described hereinabove with reference to the embodiment(s) of FIGS. 3–3I et seq.). The LS 2110 may also include narrowband telephony services functionality 2135 (e.g., which may correspond to, for example, those services provided internally by the LS 2110 as well as those services provided externally via the LS 2110 as described hereinabove with reference to the embodiment(s) of FIGS. 3–3I et seq., including those described by the text related to FIG. 12). Another exemplary functionality illustrated in the exemplary tri-level nodal environment 2100 is mapping from address space-A to address space-B functionality 2140 of the ML 2115. The mapping from address space-A to address space-B functionality 2140 (e.g., which may correspond to, for example, the mapper 1585 of the embodiment(s) of FIGS. 15–15C et seq., the mapping part portion 2030 of the embodiment(s) of FIG. 20A, the tables 2065 and 2075 of the embodiment(s) of FIG. 20B, etc.) enables a conversion from, for example, a narrowband network (e.g., for which the LS 2110 may have originally been designed) to a broadband network (e.g., such as the BN 2125 in which the MGs 2120 may be operating).

Figure 22:
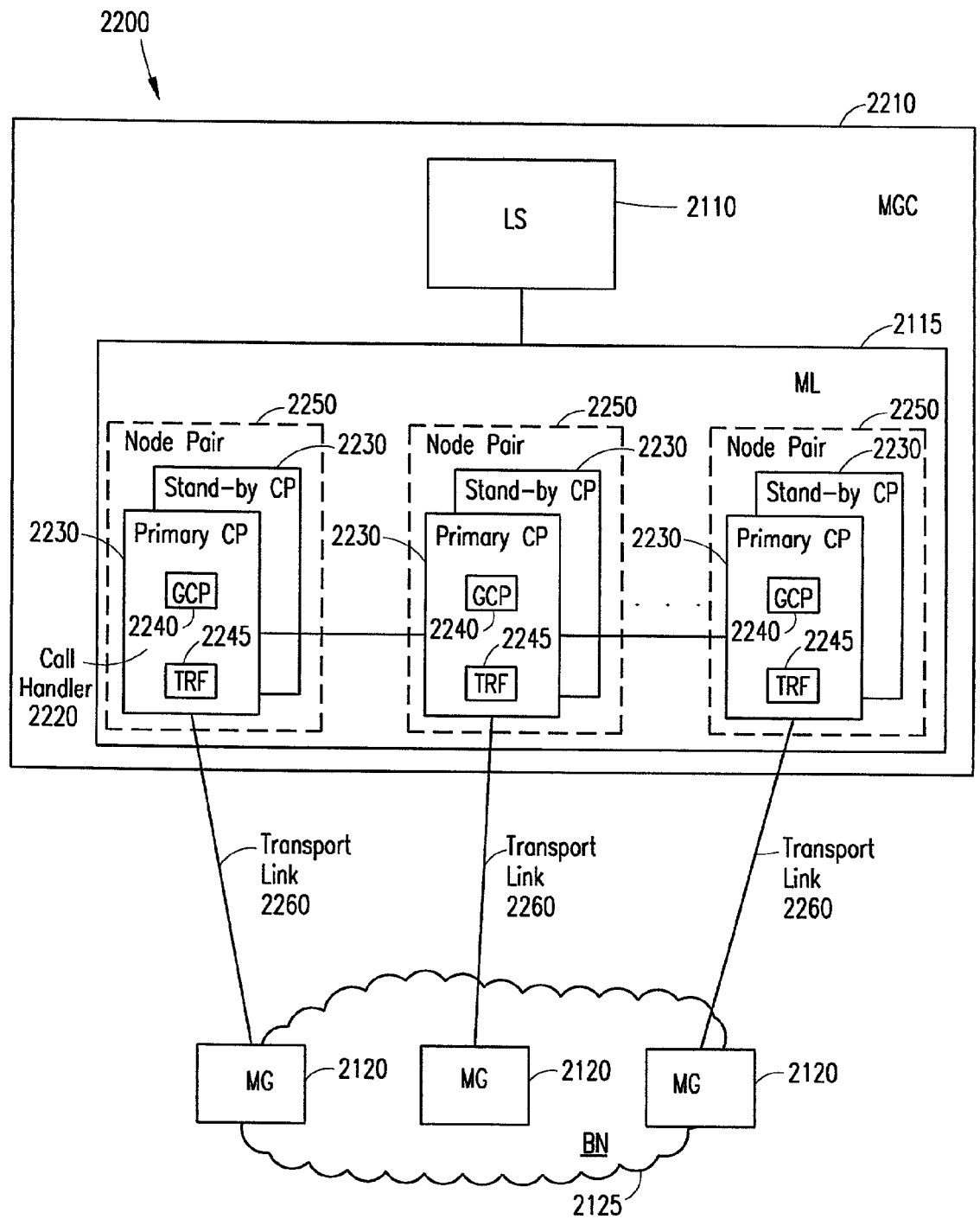
FIG. 22 illustrates an exemplary load distribution embodiment in an exemplary tri-level nodal environment implementation in accordance with the present invention.

FIG. 22 illustrates an exemplary load distribution embodiment in a tri-level nodal environment illustrated generally at 2200. The tri-level nodal environment 2200 shown in FIG. 22 is a portion of the tri-level nodal environment 2100 illustrated in FIG. 21. For example, in FIG. 22, only the media gateway controller (MGC) 2210 that includes the legacy switch (LS) 2110 and mediation logic (ML) 2115 is shown. However, it should be understood that the tri-level nodal environment 2200 of FIG. 22 can be extended to include the telephony server (TS) shown in FIG. 21.

Each call within the tri-level nodal environment 2200 is handled by a call processor 2230 within the ML 2115. The call processor 2230 implements a Gateway Control Protocol (GCP) 2240 that encodes and decodes messages according to the H.248 standard. The call processor 2230 further includes a transport handling function (TRF) 2245 for establishing and monitoring transport links 2260 between the call processor 2230 and the MGs 2120 and for sending and receiving of messages.

At least one call processor 2230 serves as an Operation and Maintenance (OM) call processor (not shown) that is responsible for maintaining the status of all of the transport links 2260 and call processors 2230. Each call processor 2230 is either a primary call processor or a stand-by call processor. A set of one primary call processor and one stand-by call processor is referred to as a node pair 2250. The primary call processor is referred to as a call handler (CH) 2220.

Within the ATM network, each transport link 2260 is a physical Signaling ATM Adaption Layer (SAAL) transport link that carries H.248 messages between the ML 2115 and the MGs 2120. The H.248 signaling protocol limits the number of active physical SAAL transport links 2260 to one per MG 2120. Therefore, each MG 2120 has only one physical SAAL transport link 2260 to the ML 2115. Each SAAL transport link 2260 terminates at one CH 2220 within the ML 2115. Therefore, there is only one CH 2220 within the ML 2115 that has a SAAL transport link 2260 to a particular MG 2120.

Figure 23:
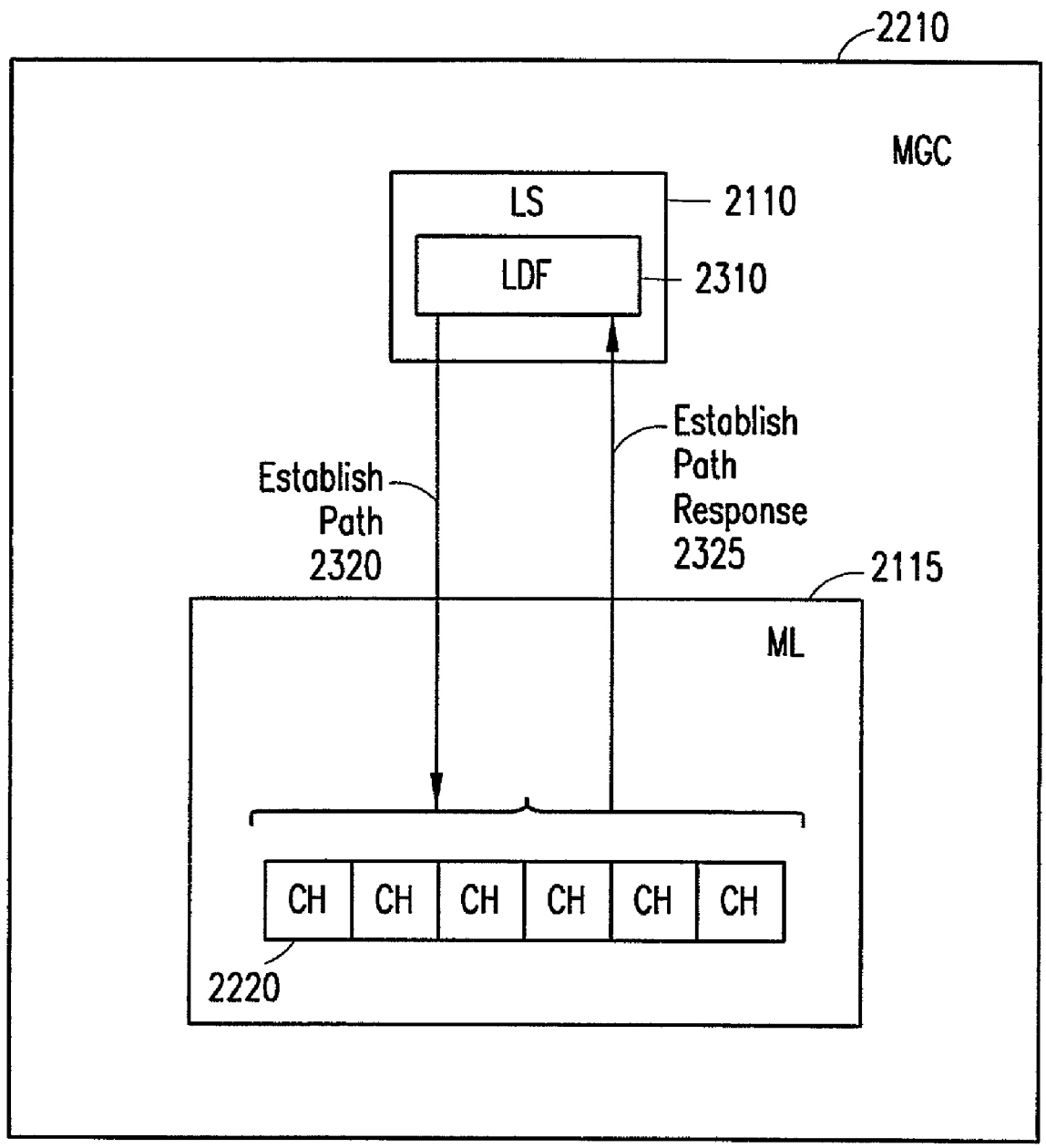
FIG. 23 illustrates an exemplary load assignment embodiment in an exemplary tri-level nodal environment implementation in accordance with the present invention.

Referring now to FIG. 23, instead of assigning all calls routed through a selected MG (2120 shown in FIG. 22) to the CH 2220 with the SAAL transport link (2260 shown in FIG. 22) to that selected MG, the LS 2110 can include a load distribution function (LDF) 2310 that assigns CH's 2220 on a load basis. The LDF 2310 distributes the load amongst the CH's 2220 to prevent overloading or under-use of any of the CH's 2220. A CH 2220 is assigned for a call by the LDF 2310 sending an Establish Path message 2320 from the LS 2110 to the particular CH 2220 in the ML 2115 using the Point Association (PA) of the CH 2220. Upon receipt and assignment by the particular CH 2220, the ML 2115 sends an Establish Path Response message 2325 to the LDF 2310 in the LS 2110. Thereafter, the PA is used to route message to the assigned CH 2220.

In one embodiment, the LDF 2310 assigns the CH's 2220 on a round-robin basis, in which the CH's 2220 are assigned in order from the first CH 2220 to the last CH 2220 and back to the first CH 2220. However, it should be understood that any type of load sharing method can be used to assign the CH's 2220. For example, the LDF 2310 may maintain load information on each of the CH's 2220, and select a particular CH 2220 based on the load information.

Figure 24:
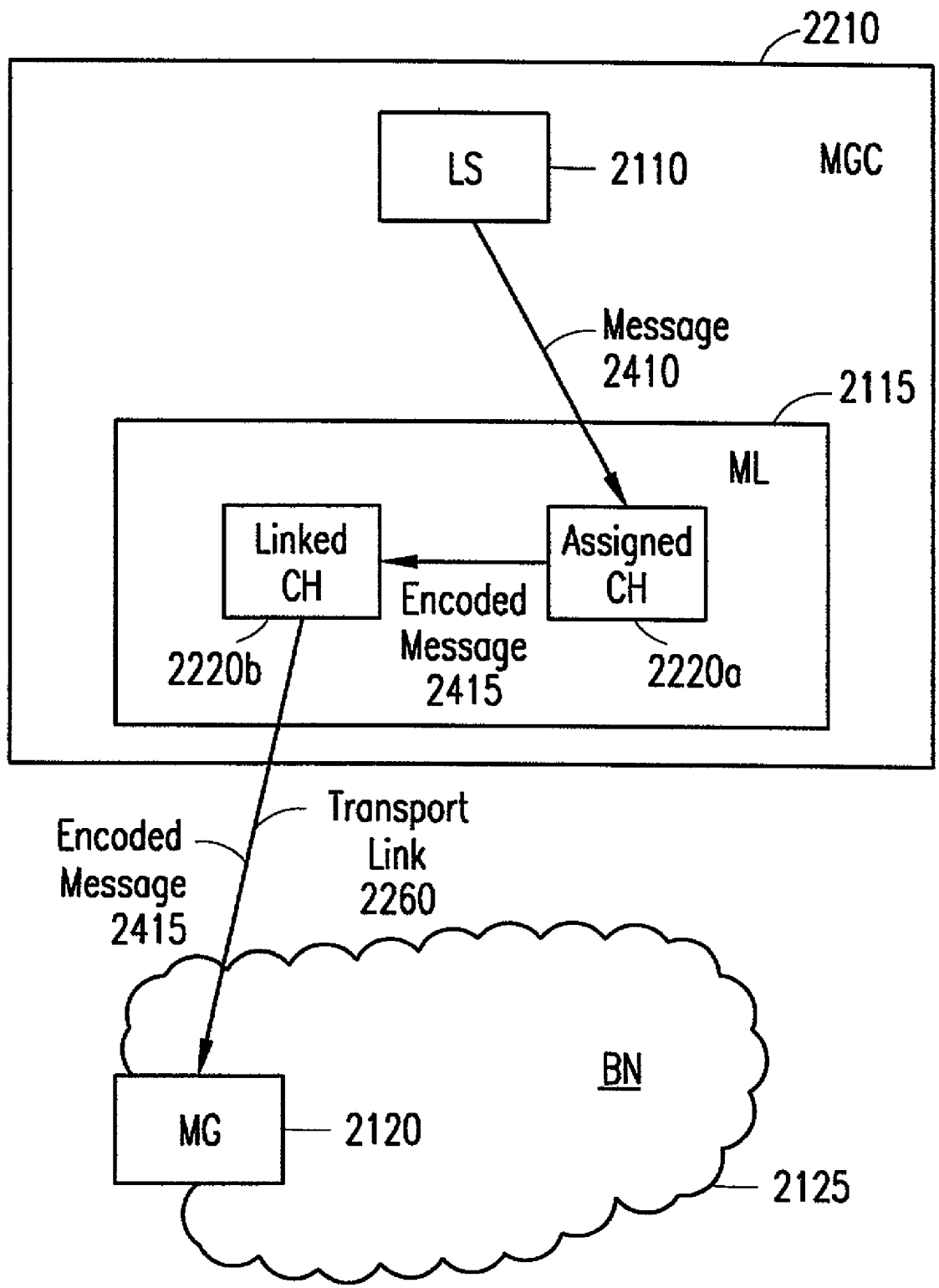
FIG. 24 illustrates an exemplary message encoding and transmission embodiment in an exemplary tri-level nodal environment implementation in accordance with the present invention.

FIG. 24 illustrates an exemplary message encoding and transmission embodiment in the tri-level nodal environment. After a CH 2220a has been assigned for the call, all messages 2410 transmitted from the LS 2110 to the selected MG 2120 for the call are routed to the assigned CH 2220a within the ML 2115. The assigned CH 2220a uses the GCP to encode the message 2410 (e.g., convert the message from an internal (Erlang) format into a format specified by the H.248 standards for transmission across the BN 2125 to the selected MG 2120. As mentioned above in connection with FIG. 22, within the ATM network, only one CH 2220 has a physical SAAL transport link 2260 to the selected MG 2120. Therefore, if the assigned CH 2220a does not have the SAAL transport link 2260 to the selected MG 2120, the assigned CH 2220a passes the encoded message 2415 to the linked CH 2220b for transmission to the selected MG 2120 over the SAAL transport link 2260.

Figure 25:
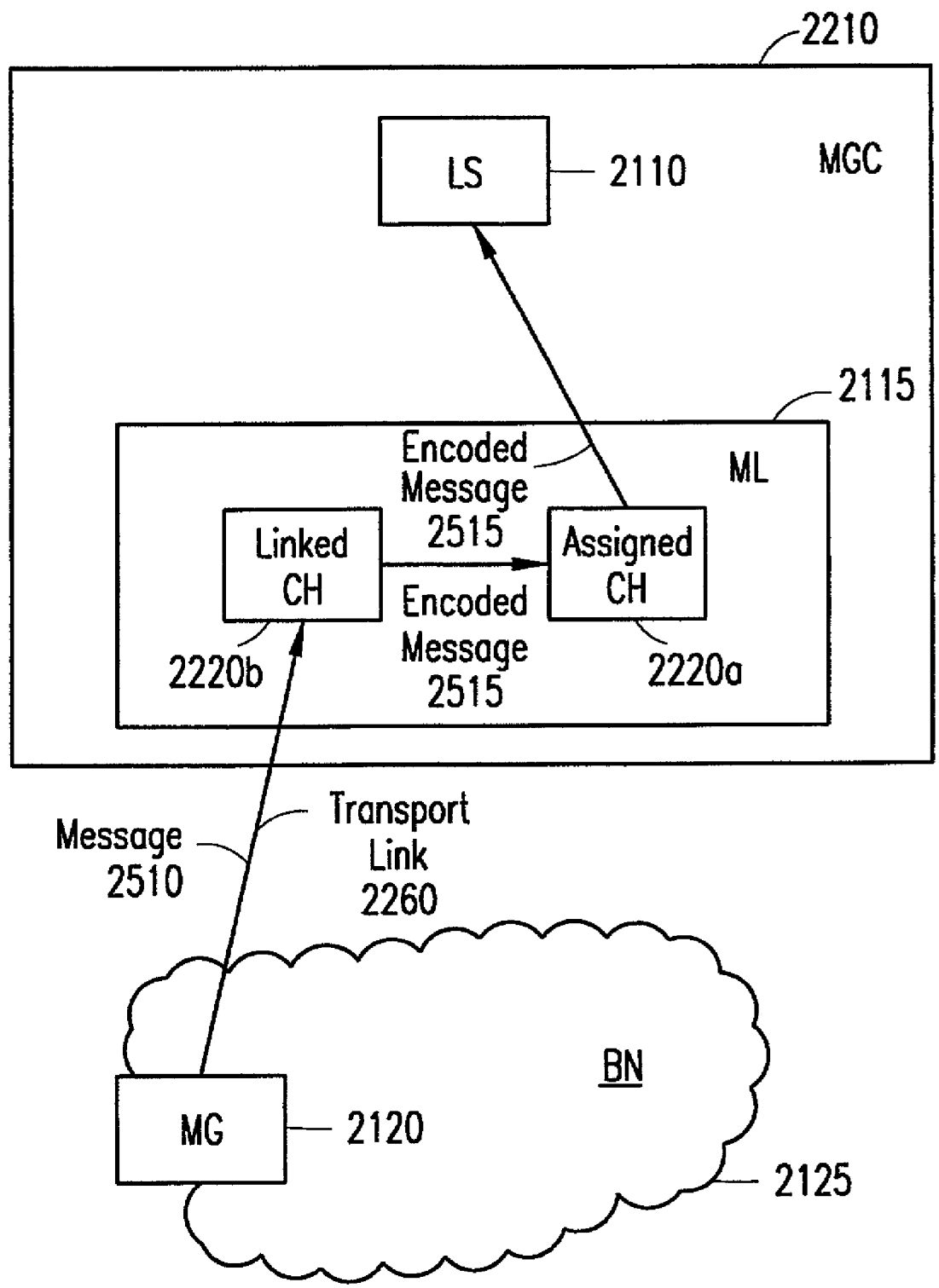
FIG. 25 illustrates an exemplary message decoding and transmission embodiment in an exemplary tri-level nodal environment implementation in accordance with the present invention.

FIG. 25 illustrates an exemplary message decoding and transmission embodiment in the tri-level nodal environment. All messages 2510 sent from the selected MG 2120 to the LS 2110 are received at the linked CH 2220b within the ML 2115 that has the physical SAAL link 2260 to the selected MG 2120. The linked CH 2220b decodes the message 2510 for transmission to the LS 2110. However, if the linked CH 2220b is not the assigned CH 2220a for the call, the linked CH 2220b passes the decoded message 2515 to the assigned CH 2220a for transmission to the LS 2110. Therefore, although load sharing for messages 2410 (shown in FIG. 24) sent from the LS 2110 to the ML 2115 is achieved by assigning CH's 2220 on round robin and CH load basis, load sharing for messages 2510 sent from the MG 2120 to the LS 2110 is not possible due to the H.248 signaling protocol requirement of a single active SAAL transport link 2260 to the MG 2120.

Figure 26A:
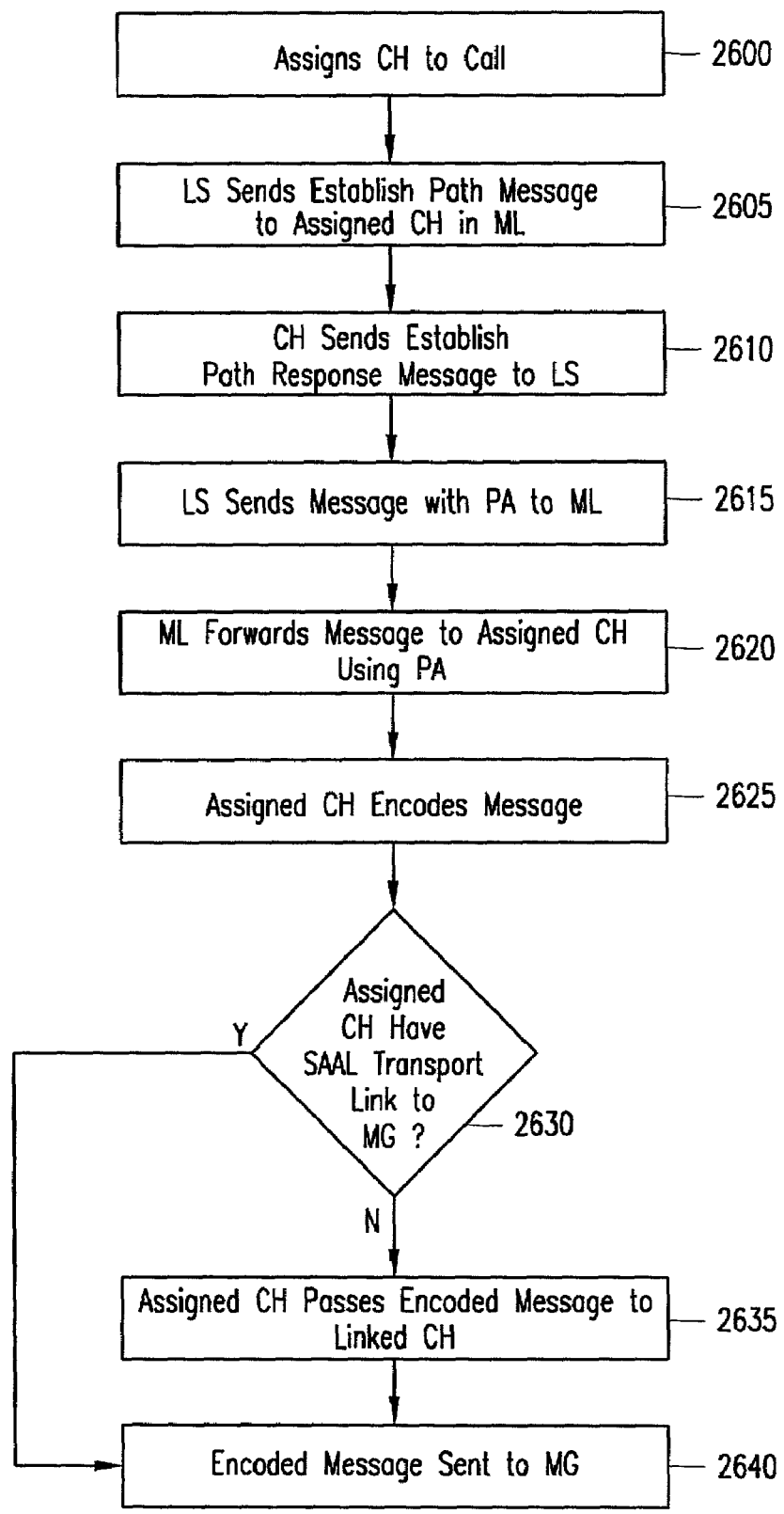
FIGS. 26A and 26B illustrate an exemplary method in flowchart form for transmitting messages between nodes within a tri-level nodal environment in accordance with the present invention.
Figure 26B:
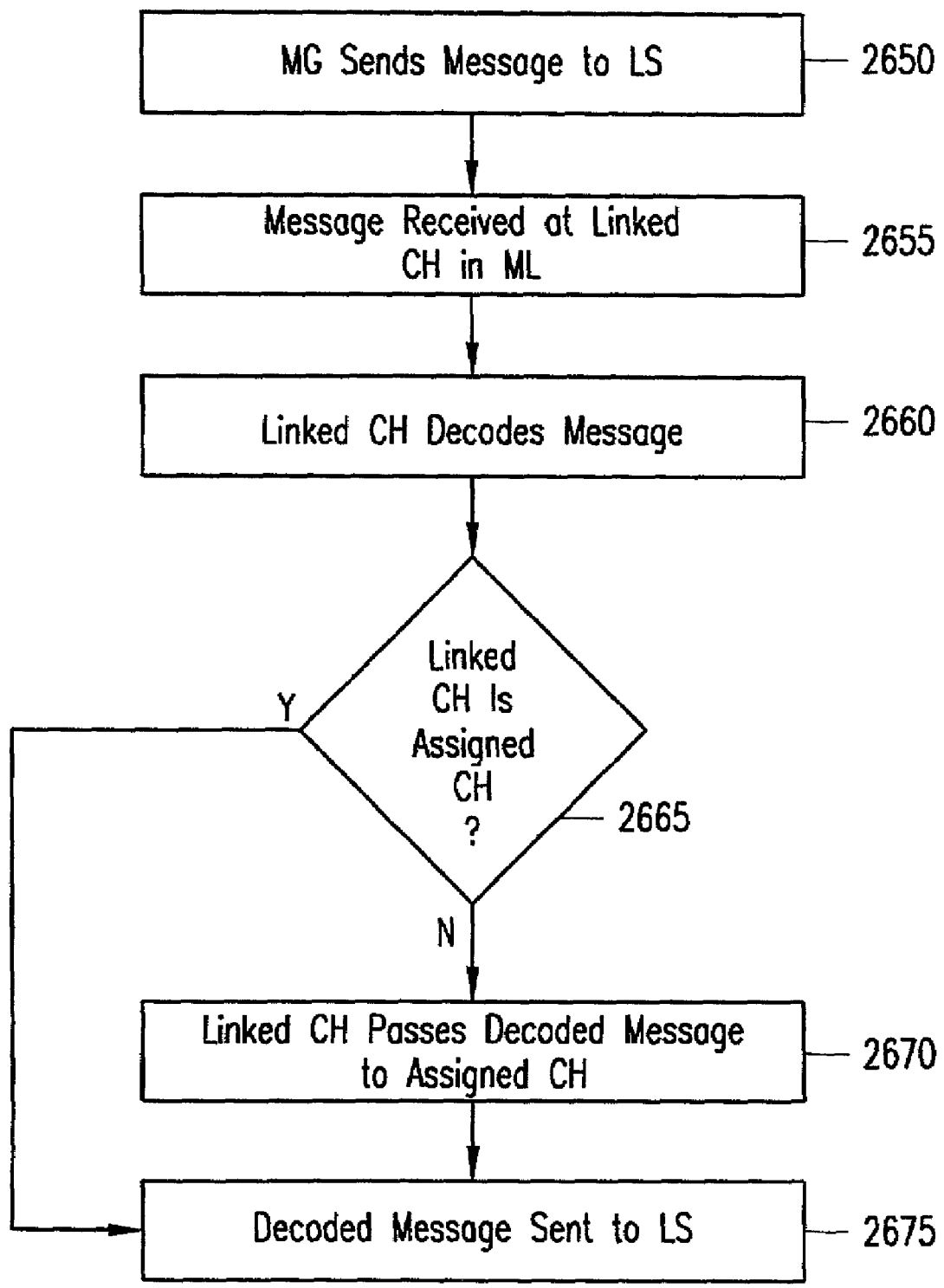

FIGS. 26A and 26B illustrate an exemplary method in flowchart form for transmitting messages between nodes within a tri-level nodal environment in accordance with the present invention. When the LS has assigned a certain CH for a particular new call (step 2600), the LS sends an Establish Path message for the call to the assigned CH in the ML using the PA of the assigned CH (step 2605). In response, the CH sends an Establish Path Response message back to the LS (step 2610). Thereafter, when the LS sends a message to the selected MG for the call (step 2615), the message includes the PA of the assigned CH, so that the ML can forward the message to the assigned CH (step 2620). The assigned CH encodes the message (step 2625) into the format suitable for transmission across the BN to the selected MG.

If the assigned CH does not have the SAAL transport link to the selected MG (step 2630), the assigned CH passes the encoded message to the linked CH that has the SAAL transport link to the selected MG (step 2635) for transmission of the encoded message to the selected MG (step 2640). However, if the assigned CH does have the SAAL transport link to the selected MG (step 2630), the assigned CH transmits the encoded message directly to the selected MG via the SAAL transport (step 2640).

Referring now to FIG. 26B, when the selected MG sends a message to the LS for the call (step 2650), the message is received at the linked CH having the SAAL transport link to the selected MG (step 2655). The linked CH decodes the message (step 2660) into a format suitable for transmission to the LS. If the linked CH is the assigned CH (step 2665), the linked CH transmits the decoded message directly to the LS (step 2675). However, if the linked CH is not the assigned CH (step 2665), the linked CH passes the decoded message to the assigned CH (step 2670) for transmission to the LS (step 2675).

Although embodiments of the methods, systems, and arrangements of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A system for combining narrowband and broadband transport mechanisms in a communications network, comprising:
    a call control node including switching intelligence and narrowband switching fabric;
    a plurality of connection control nodes each including broadband switching fabric; and
    an intermediate node operatively connectable to said call control node and said plurality of connection control nodes, said intermediate node including a plurality of call processors adapted to interwork for providing interworking between said call control node and said plurality of connection control nodes;
    wherein said call control node further includes a load distribution function adapted to distribute for distributing the load amongst said plurality of call processors;
    wherein said load distribution function is further adapted to assign further assigns one of said plurality of call processors to a call;
    wherein said assigned call processor is adapted to encode encodes a message sent from said call control node to a selected one of said connection control nodes for the call;
    wherein each of said plurality of connection control nodes has a transport link to a linked one of said plurality of call processors;
    wherein said assigned call processor is further adapted to pass passes said encoded message to said linked call processor associated with said selected connection control node for transmission of said encoded message to said selected connection control node.

2. The system of claim 1, wherein said plurality of connection control nodes comprise at least part of a broadband network.

3. The system of claim 1, wherein said load distribution function is further adapted to assign further assigns said assigned call processor on a round-robin basis.

4. The system of claim 1, wherein said load distribution function is further adapted to assign further assigns said assigned call processor using load information related to the load on each of said plurality of call processors.

5. The system of claim 1, wherein said assigned call processor is further adapted to decode further decodes a message sent from said selected connection control node to said call control node.

6. The system of claim 1, wherein said linked call processor associated with said selected connection control node is further adapted to receive further receives a message from said selected connection control node to said call control node and decode said message.

7. The system of claim 6, wherein said linked call processor associated with said selected connection control node is further adapted to pass further passes said decoded message to said assigned call processor for transmission of said decoded message to said call control node.

8. The system of claim 1, wherein said transport link is a signaling ATM adaptation layer transport link.

9. The system of claim 1, wherein said call control node is a legacy switch and said intermediate node is a mediation logic node, said legacy switch and said mediation logic node together forming a media gateway controller.

10. The system of claim 9, wherein said plurality of connection control nodes are media gateways within an ATM network.

11. A method for combining narrowband and broadband transport mechanisms in a communications network, comprising the steps of:
    providing a call control node including switching intelligence and narrowband switching fabric, a plurality of connection control nodes, each including broadband switching fabric, an intermediate node having a plurality of call processors for interworking between said call control node and said plurality of connection control nodes, and each of said plurality of connection control nodes has a transport link to a linked one of said plurality of call processors;
    distributing the load amongst said plurality of call processors by said call control node;
    assigning one of said plurality of call processors to a call;
    encoding a message sent from said call control node to a selected one of said connection control nodes for the call at said assigned call processor;
    passing said encoded message from said assigned call processor to said linked call processor associated with said selected connection control node; and
    transmitting said encoded message from said linked call processor associated with said selected connection control node to said selected connection control node.

12. The method of claim 11, wherein said step of assigning further comprises the step of:
    assigning said assigned call processor on a round-robin basis.

13. The method of claim 11, wherein said step of assigning further comprises the step of:
    assigning said assigned call processor using load information related to the load on each of said plurality of call processors.

14. The method of claim 11, further comprising the step of:
    decoding a message sent from said selected connection control node to said call control node at said assigned call processor.

15. The method of claim 11, further comprising the steps of:
    receiving a message from said selected connection control node to said call control node at said linked call processor associated with said selected connection control node; and
    decoding said message at said linked call processor associated with said selected connection control node.

16. The method of claim 15, further comprising the steps of:

passing said decoded message from said linked call processor associated with said selected connection control node to said assigned call processor; and transmitting said decoded message from said assigned call processor to said call control node.

17. A method for using a plurality of call processors within an intermediate node for a call being handled by a call control node including switching intelligence and narrowband switching fabric and a selected one of a plurality of connection control nodes including broadband switching fabric, said plurality of call processors for interworking between said call control node and said selected connection control node, said method comprising the steps of:

providing a load distribution function within said call control node for distributing the load amongst said plurality of call processors; and assigning one of said plurality of call processors to the call using said load distribution function;

encoding a message sent from said call control node to said selected connection control node at said assigned call processor; and wherein each of said plurality of connection control nodes has a transport link to a linked one of said plurality of call processors, and further comprising the steps of:

passing said encoded message from said assigned call processor to said linked call processor associated with said selected connection control node; and transmitting said encoded message from said linked call processor associated with said selected connection control node to said selected connection control node.

18. The method of claim 17, wherein said step of assigning further comprises the step of:

assigning said assigned call processor on a round-robin basis.

19. The method of claim 17, wherein said step of assigning further comprises the step of:

assigning said assigned call processor using load information related to the load on each of said plurality of call processors.

20. The method of claim 19, further comprising the step of:

decoding a message sent from said selected connection control node to said call control node at said assigned call processor.

21. The method of claim 17, further comprising the steps of:

receiving a message from said selected connection control node to said call control node at said linked call processor associated with said selected connection control node; and decoding said message at said linked call processor associated with said selected connection control node.

22. The method of 21, further comprising the steps of:

passing said decoded message from said linked call processor associated with said selected connection control node to said assigned call processor; and transmitting said decoded message from said assigned call processor to said call control node.

* * * * *

UNITED STATES PATENT AND TRADEMARK OFFICE
CERTIFICATE OF CORRECTION

| | | |
|---|---|---|
| PATENT NO. | : 7,212,519 B2 | Page 1 of 1 |
| APPLICATION NO. | : 10/029361 | |
| DATED | : May 1, 2007 | |
| INVENTOR(S) | : Johnson et al. | |

It is certified that error appears in the above-identified patent and that said Letters Patent is hereby corrected as shown below:

In Column 42, Line 22, in Claim 22, delete "21" and insert -- claim 21 --, therefor.

Signed and Sealed this

Twenty-fifth Day of March, 2008

JON W. DUDAS
*Director of the United States Patent and Trademark Office*